United States Patent [19]
Mehta

[11] Patent Number: 4,975,845
[45] Date of Patent: Dec. 4, 1990

[54] METHOD OF OPERATING AN ELECTRONIC AUTOMATIC TRANSMISSION SYSTEM

[75] Inventor: Hemang S. Mehta, Sterling Heights, Mich.

[73] Assignee: Chrysler Corporation, Highland Park, Mich.

[21] Appl. No.: 187,704

[22] Filed: Apr. 29, 1988

[51] Int. Cl.$^5$ .............................................. B60K 41/22
[52] U.S. Cl. .................................... 364/424.1; 74/866; 192/3.31
[58] Field of Search ...................... 364/424.1; 74/866; 192/3.3, 3.29, 3.28, 3.31

[56] References Cited

U.S. PATENT DOCUMENTS

| | | | |
|---|---|---|---|
| 3,876,028 | 4/1975 | Asano et al. | 74/866 |
| 3,881,368 | 5/1975 | Furuhashi et al. | 74/866 |
| 3,882,740 | 5/1975 | Forster et al. | 74/866 |
| 3,895,541 | 7/1975 | Nohira et al. | 74/866 |
| 3,942,393 | 3/1976 | Forster et al. | 74/866 |
| 4,030,380 | 6/1977 | Mutter | 74/866 |
| 4,044,634 | 8/1977 | Florus et al. | 74/866 |
| 4,073,204 | 2/1978 | Dick | 74/866 |
| 4,082,013 | 4/1978 | Dornfeld et al. | 74/866 |
| 4,131,036 | 12/1978 | Ivey et al. | 74/866 |
| 4,148,230 | 4/1979 | Kodama et al. | 74/859 |
| 4,155,277 | 5/1979 | Minami et al. | 74/866 |
| 4,174,645 | 11/1979 | Ohmae et al. | 74/866 |
| 4,208,925 | 6/1980 | Miller et al. | 74/866 |
| 4,220,058 | 9/1980 | Petzold | 364/424.1 |
| 4,224,842 | 9/1980 | Rabus et al. | 74/866 |
| 4,244,244 | 1/1981 | Rembold et al. | 74/866 |
| 4,258,591 | 3/1981 | Eckert et al. | 74/866 |
| 4,259,882 | 4/1981 | Miller | 74/866 |
| 4,283,970 | 8/1981 | Vukovich | 74/866 |
| 4,285,252 | 8/1981 | Yamaki et al. | 74/866 |
| 4,290,322 | 9/1981 | Huitema | 475/128 |
| 4,345,489 | 8/1982 | Muller et al. | 74/866 |
| 4,368,649 | 1/1983 | Vahratian et al. | 475/66 |
| 4,380,048 | 4/1983 | Kishi et al. | 364/424.1 |
| 4,452,099 | 6/1984 | Croswhite | 475/66 |
| 4,456,107 | 6/1984 | Ito et al. | 74/866 |
| 4,468,988 | 9/1984 | Hiramatsu | 74/868 |
| 4,468,989 | 9/1984 | Rosen | 74/869 |
| 4,485,443 | 11/1984 | Knodler et al. | 364/424.1 |
| 4,495,576 | 1/1985 | Ito | 74/866 |
| 4,499,979 | 2/1985 | Suzuki et al. | 192/3.31 |
| 4,503,734 | 3/1985 | Acker | 74/866 |
| 4,527,448 | 7/1985 | Person et al. | 74/869 |
| 4,527,678 | 7/1985 | Pierce et al. | 74/866 |
| 4,535,412 | 8/1985 | Cederquist | 364/424.1 |
| 4,541,308 | 9/1985 | Person et al. | 74/868 |
| 4,560,047 | 12/1985 | McCarthy et al. | 192/52 |
| 4,584,906 | 4/1986 | Nagaoka et al. | 74/866 |
| 4,586,401 | 5/1986 | Nogle | 475/60 |
| 4,637,281 | 1/1987 | Vanselous | 74/869 |
| 4,640,394 | 2/1987 | Higashi et al. | 192/3.29 |
| 4,658,929 | 4/1987 | Katou et al. | 74/868 |
| 4,660,672 | 4/1987 | Katou | 74/868 |
| 4,667,540 | 5/1987 | Yagi | 74/866 |
| 4,680,988 | 7/1987 | Mori | 74/866 |
| 4,693,142 | 9/1987 | Kurihara et al. | 74/866 |
| 4,707,789 | 11/1987 | Downs et al. | 364/424.1 |
| 4,711,138 | 12/1987 | Miura et al. | 475/143 |
| 4,724,723 | 2/1988 | Lockhart et al. | 74/854 |

OTHER PUBLICATIONS

Takeo Hiramatsu et al., "Control Technology of Minimal Slip-Type Torque Converter Clutch," SAE Technical Paper 850460 (1985).

M. Suga et al., "The Control of the Lockup Clutch Used in the Microprocessor Controlled Automatic Transmission", 1 Mech. E. (1985).

*Primary Examiner*—Parshotam S. Lall
*Assistant Examiner*—V. N. Trans
*Attorney, Agent, or Firm*—Mark P. Calcaterra

[57] ABSTRACT

The present invention is a method of controlling the overall operation of an automatic transmission with an electronic controller. The method includes determining the gear the transmission should be operating in by the controller and comparing the determined gear to the gear the transmission is presently operating in by the controller to determine whether a gear change is required. The method further includes identifying and executing the proper gear change by the controller if a gear change is required.

3 Claims, 48 Drawing Sheets

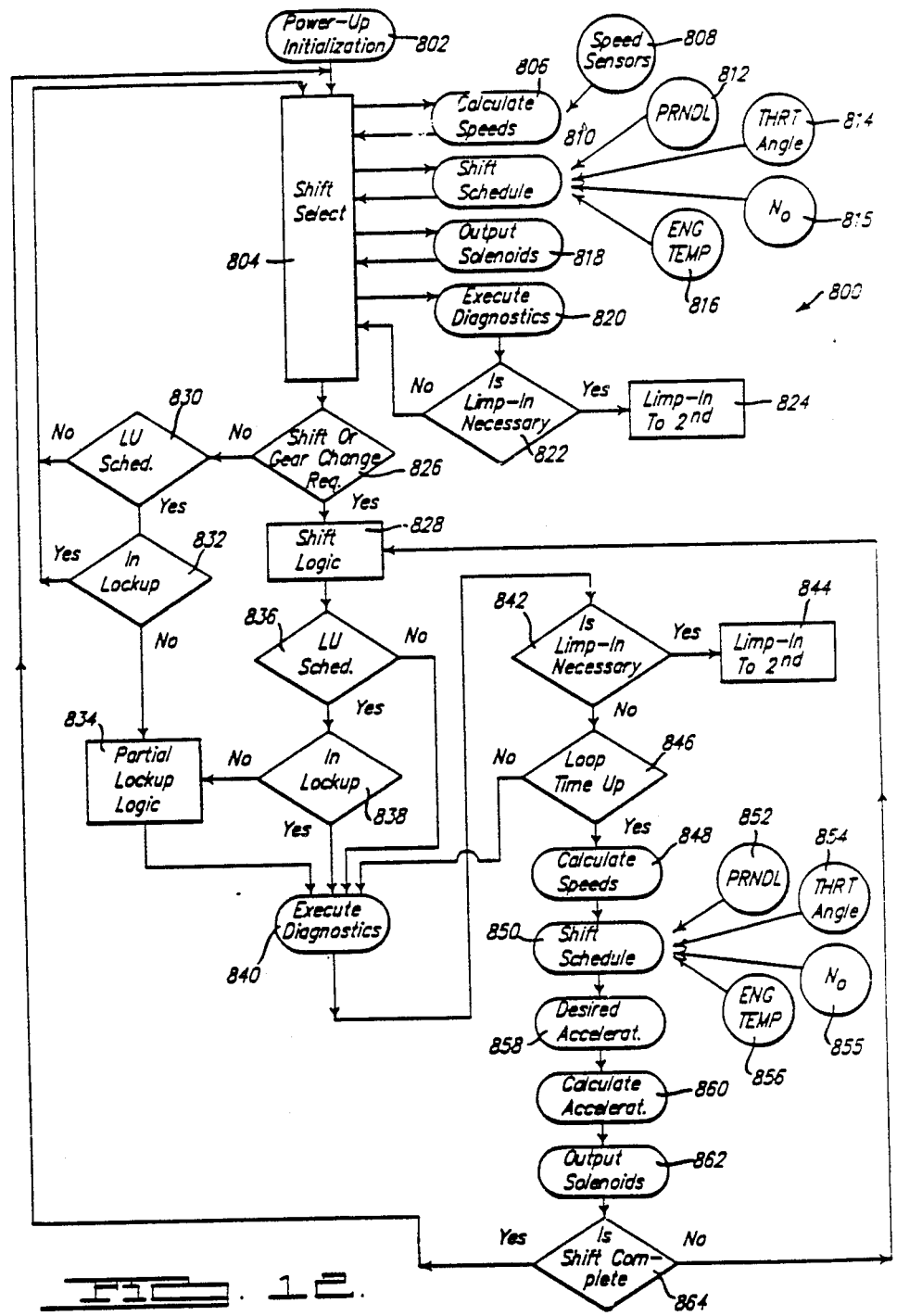

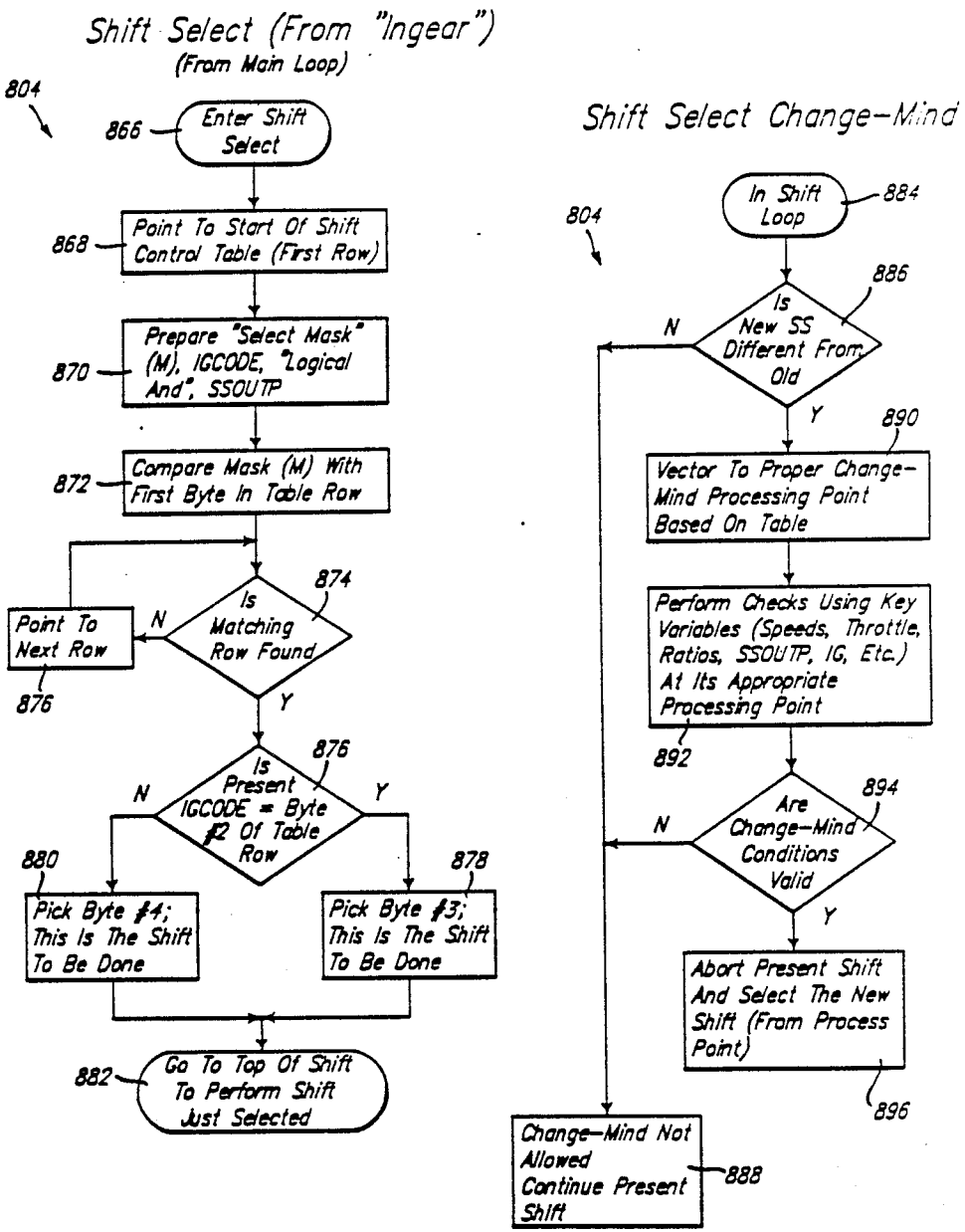

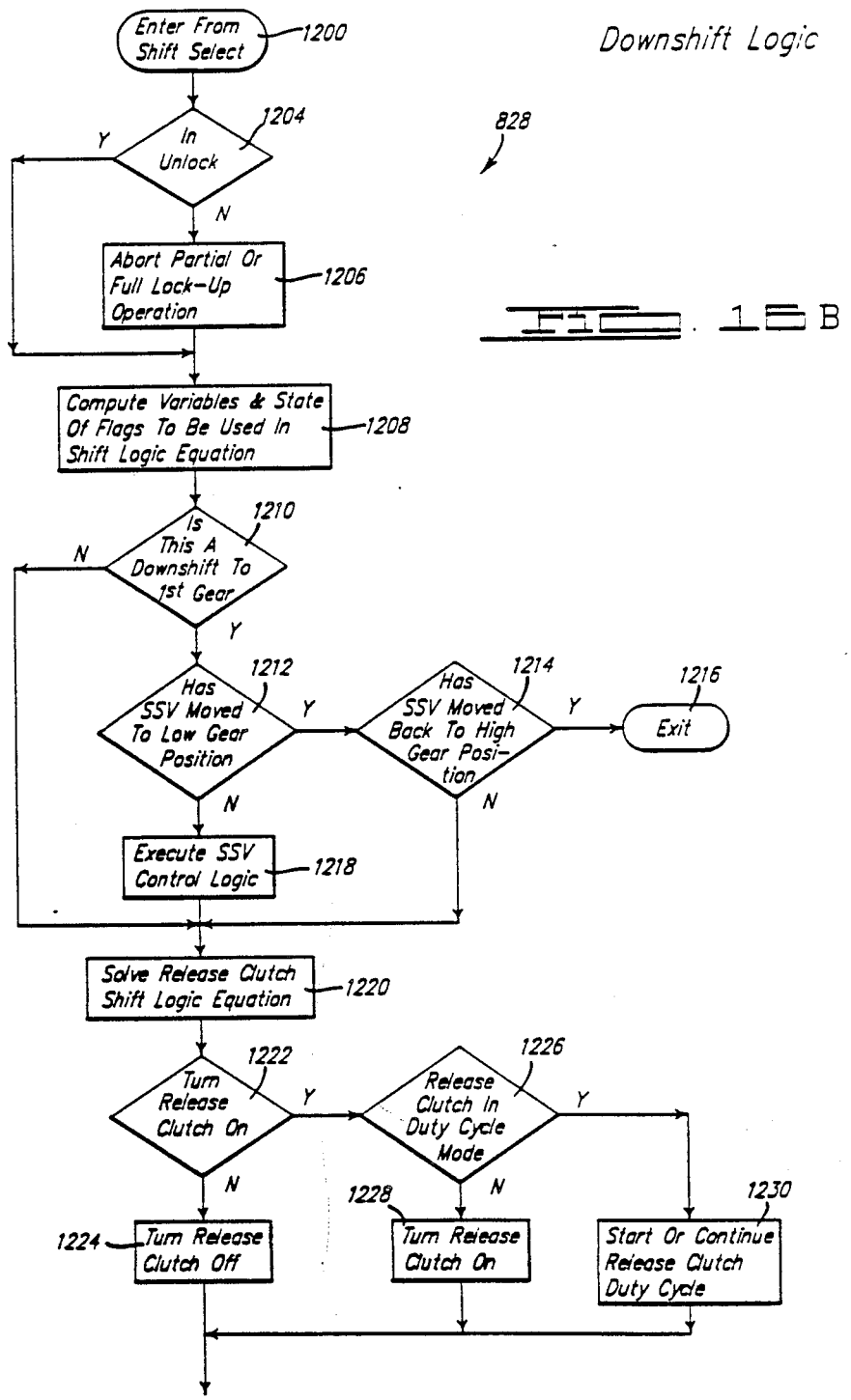

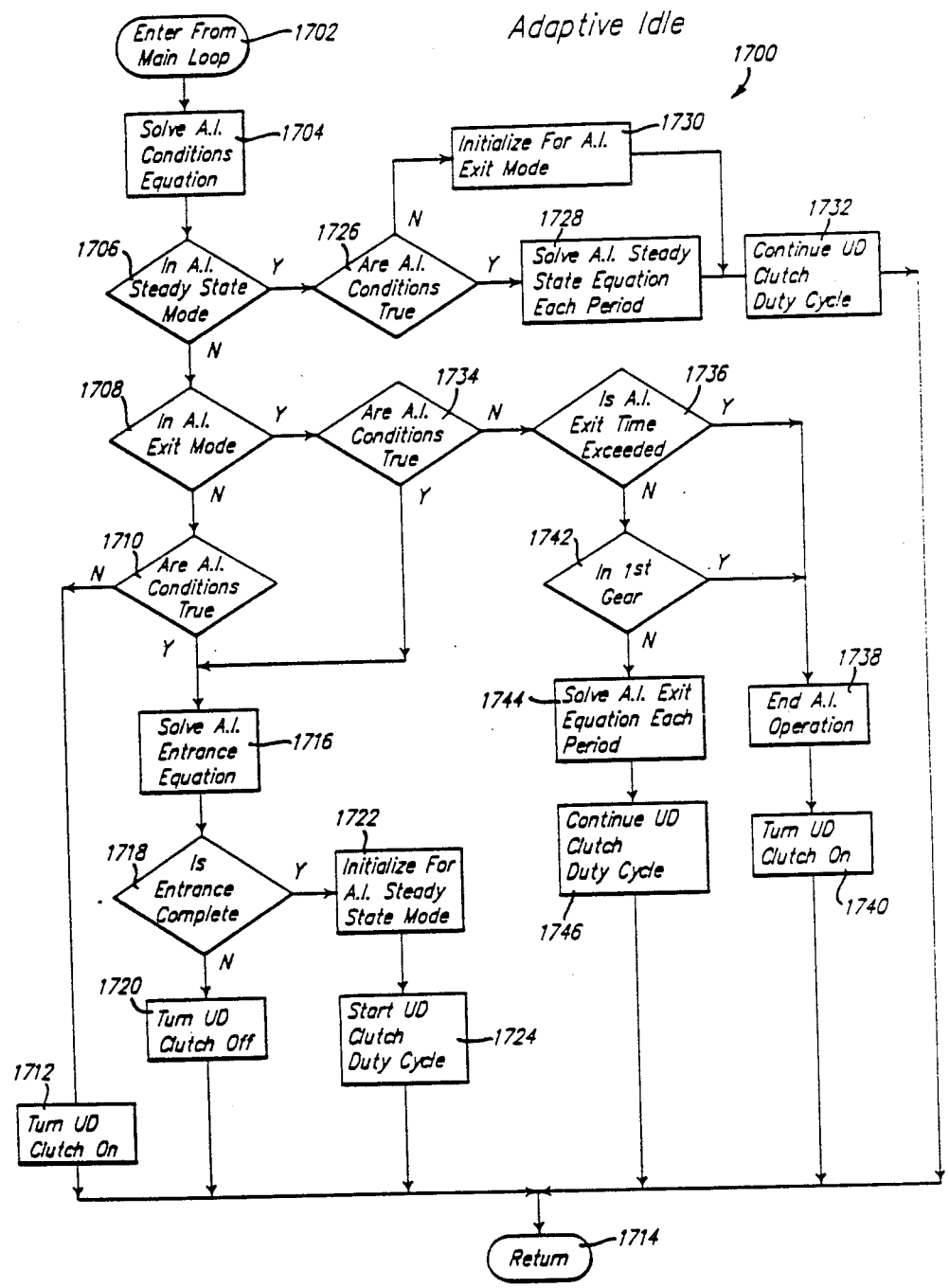

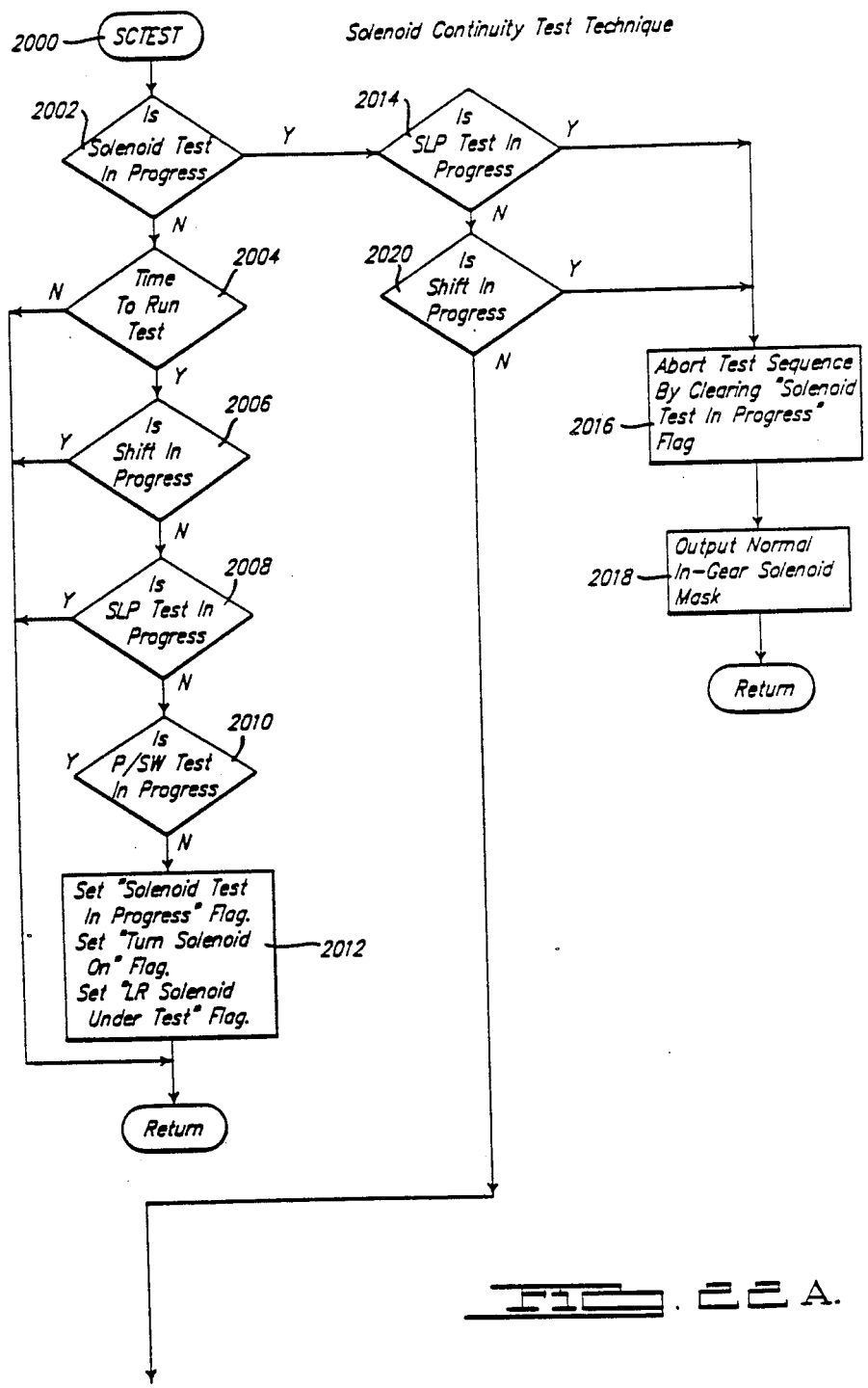

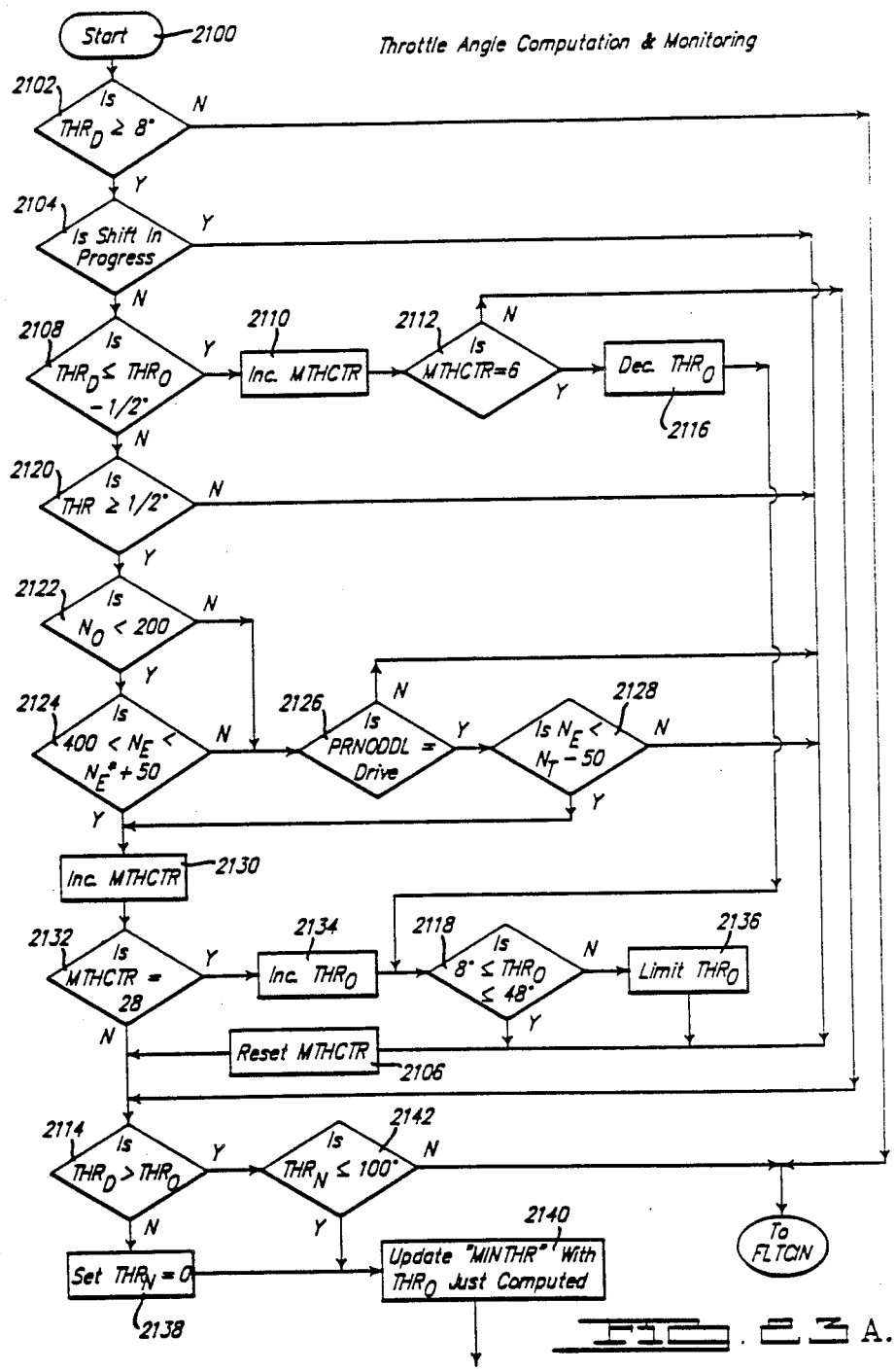

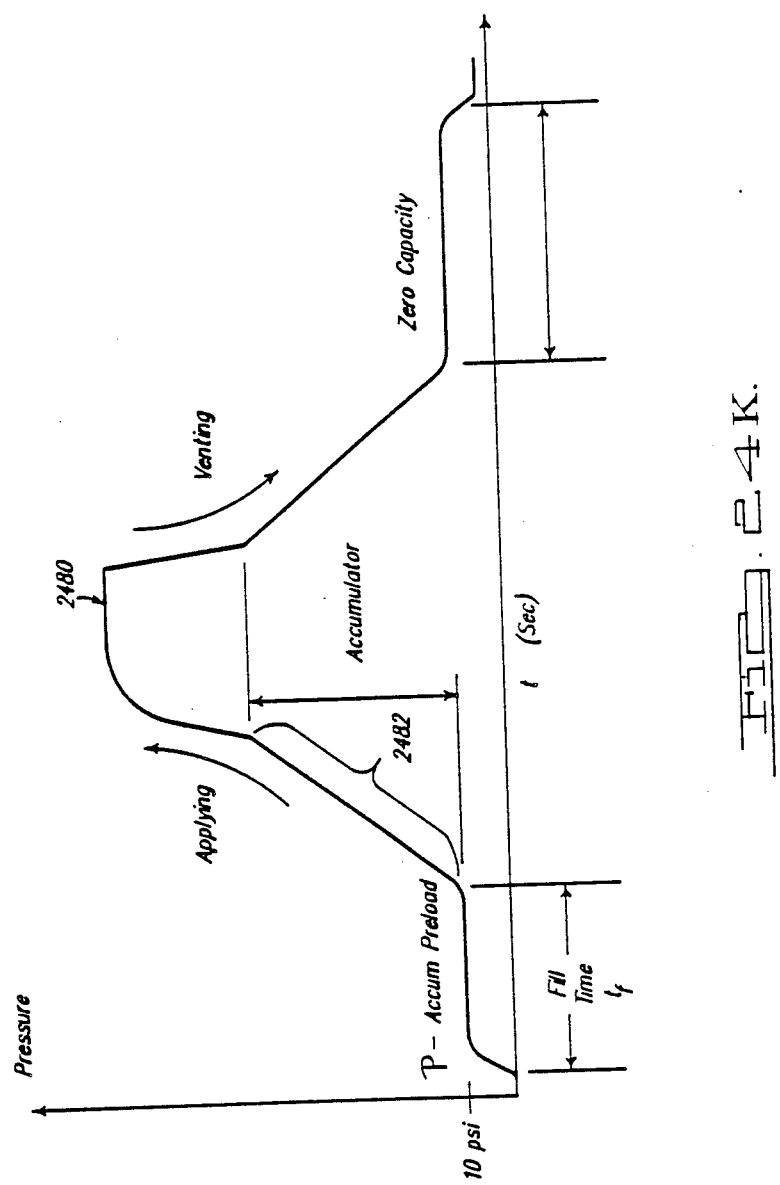

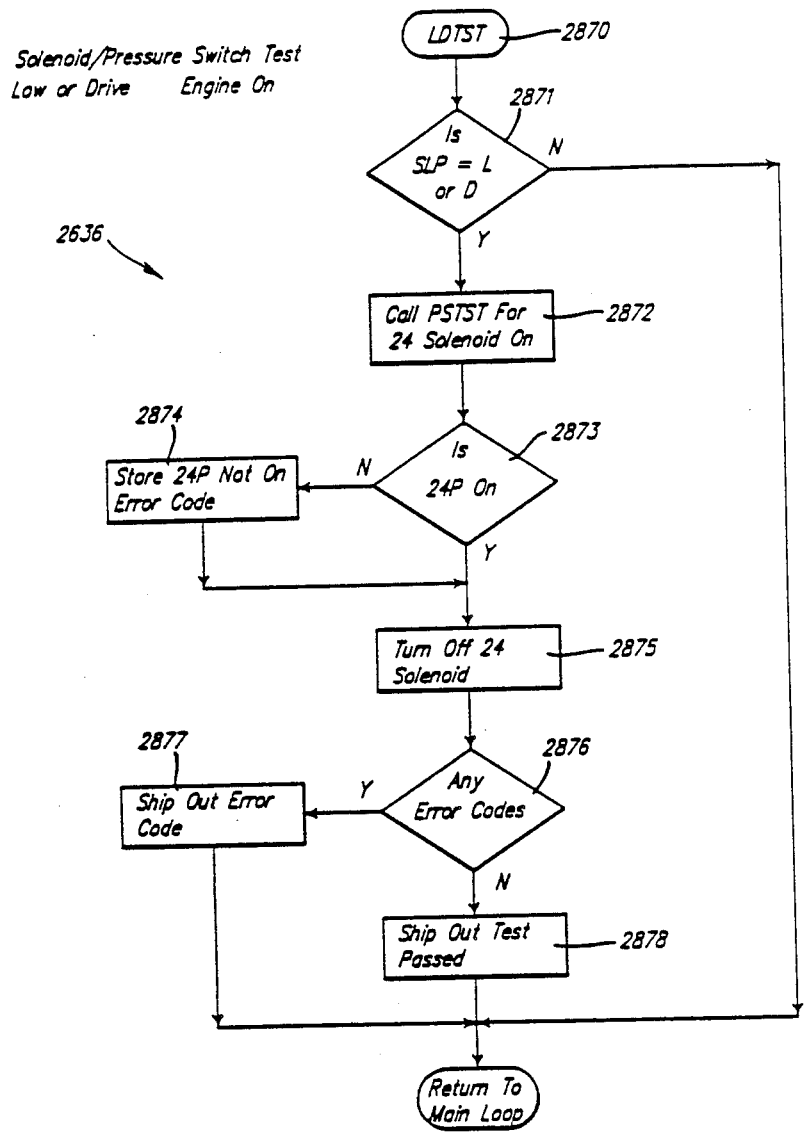

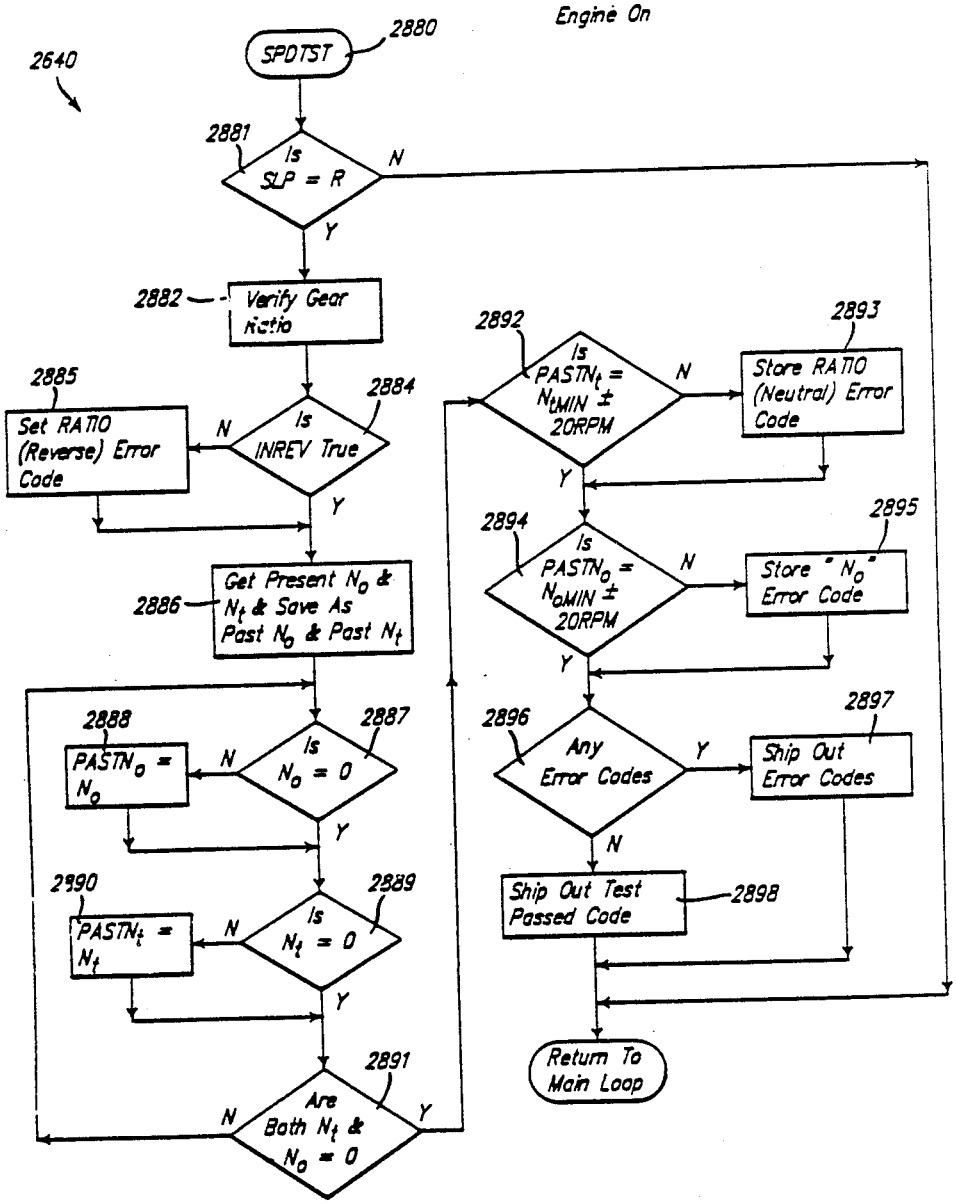

METHOD OF OPERATING AN ELECTRONIC AUTOMATIC TRANSMISSION SYSTEM

BACKGROUND OF THE INVENTION

1. Field Of The Invention

The present invention relates to an automatic transmission primarily intended for motor vehicle use, and more particularly, to a method of operating a transmission that is controlled electrically and hydraulically.

2. Description Of Related Art

Generally speaking, land vehicles require three basic components. These components comprise a power plant (such as an internal combustion engine) a power train and wheels. The internal combustion engine produces force by the conversion of the chemical energy in a liquid fuel into the mechanical energy of motion (kinetic energy). The function of the power train is to transmit this resultant force to the wheels to provide movement of the vehicle.

The power train's main component is typically referred to as the "transmission". Engine torque and speed are converted in the transmission in accordance with the tractive-power demand of the vehicle. The vehicle's transmission is also capable of controlling the direction of rotating being applied to the wheels, so that the vehicle may be driven both forward and backward.

A conventional transmission includes a hydrodynamic torque converter to transfer engine torque from the engine crankshaft to a rotatable input member of the transmission through fluid-flow forces. The transmission also includes frictional units which couple the rotating input member to one or more members of a planetary gearset. Other frictional units, typically referred to as brakes, hold members of the planetary gearset stationary during flow of power. These frictional units are usually brake clutch assemblies or band brakes. The drive clutch assemblies can couple the rotating input member of the transmission to the desired elements of the planetary gearsets, while the brakes hold elements of these gearsets stationary. Such transmission systems also typically provide for one or more planetary gearsets in order to provide various ratios of torque and to ensure that the available torque and the respective tractive power demand are matched to each other.

Transmissions are generally referred to as manually actuated or automatic transmissions. Manual transmissions generally include mechanical mechanisms for coupling rotating gears to produce different ratio outputs to the drive wheels.

Automatic transmissions are designed to take automatic control of the frictional units, gear ratio selection and gear shifting. A thorough description of general automatic transmission design principals may be found in "Fundamentals of Automatic Transmissions and Transaxles", Chrysler Corporation Training Manual No. TM-508A. Additional descriptions of automatic transmissions may be found in U.S. Pat. No. 3,631,744, entitled "Hydromatic Transmission," issued Jan. 4, 1972 to Blomquist, et al., and U.S. Pat. No. 4,289,048, entitled "Lock-up System for Torque Converter," issued on Sept. 15, 1981 to Mikel, et al. Each of these patents is hereby incorporated by reference.

In general, the major components featured in such an automatic transmission are: a torque converter as above-mentioned; fluid pressure-operated multi-plate drive or brake clutches and/or brake bands which are connected to the individual elements of the planetary gearsets in order to perform gear shifts without interrupting the tractive power; one-way clutches in conjunction with the frictional units for optimization of power shifts; and transmission controls such as valves for applying and releasing elements to shift the gears (instant of shifting), for enabling power shifting, and for choosing the proper gear (shift point control), dependent on shift-program selection by the driver (selector lever), accelerator position, the engine condition and vehicle speed.

The control system of the automatic transmission is typically hydraulically operated through the use of several valves to direct and regulate the supply of pressure. This hydraulic pressure control will cause either the actuation or deactuation of the respective frictional units for effecting gear changes in the transmission. The valves used in the hydraulic control circuit typically comprise spring-biased spool valves, spring-biased accumulators and ball check valves. Since many of these valves rely upon springs to provide a predetermined amount of force, it will be appreciated that each transmission design represents a finely tuned arrangement of interdependent valve components. While this type of transmission control system has worked well over the years, it does have its limitations. For example, such hydraulically controlled transmissions are generally limited to one or a very small number of engines and vehicle designs. Therefore, considerable cost is incurred by an automobile manufacturer to design, test, built, inventory and repair several different transmission units in order to provide an acceptable broad model line for consumers.

Additionally, it should be appreciated that such hydraulically controlled transmission systems cannot readily adjust themselves in the field to compensate for varying conditions such as normal wear on the components, temperature swings and changes in engine performance over time. While each transmission is designed to operate most efficiently within certain specific tolerances, typical hydraulic control systems are incapable of taking self-corrective action on their own to maintain operation of the transmission at peak efficiency.

However, in recent years, a more advanced form of transmission control system has been proposed, which would offer the possibility of enabling the transmission to adapt itself to changing conditions. In this regard, U.S. Pat. No. 3,956,947, issued on May 18, 1976 to Leising, et al., which is hereby incorporated by reference, sets forth a fundamental development in this field. Specifically, this patent discloses an automatic transmission design which features an "adaptive" control system that includes electrically operated solenoid-actuated valves for controlling certain fluid pressures. In accordance with this electric/hydraulic control system, the automatic transmission would be "responsive" to an acceleration factor for controlling the output torque of the transmission during a shift from one ratio of rotation (between the input and output shafts of the transmission) to another. Specifically, the operation of the solenoid-actuated valves would cause a rotational speed versus time curve of a sensed rotational component of the transmission to substantially follow along a predetermined path during shifting.

3. Objects Of The Present Invention

In a vehicle having an engine and a transmission including an input member, a torque converter assembly for transmitting torque between the engine and the input member, an output member, a gear assembly for changing the ratio of torque between the input member and output member, a plurality of friction elements for shifting the gear assembly, a fluid actuating device being movable to engage and disengage at least one friction element, at least one solenoid-actuated valve being movable in response to the presence or absence of electrical power for injecting fluid-flow between the fluid source and the fluid actuation device; a plurality of input sensors providing input signals indicative of predetermined conditions; a controller having memory for processing and storing the input signals and predetermined values and providing output signals to control the actuation of the solenoid-actuated valve.

It is a more specific object of the present invention to provide a method of controlling the operation of an automatic transmission with a controller.

This application is one of several applications filed on the same date, all commonly assigned and having similar Specification and Drawings, these applications being identified below.

| U.S. Ser. No. | Title |
|---|---|
| 187,772 | AN ELECTRONICALLY-CONTROLLED, ADAPTIVE AUTOMATIC TRANSMISSION SYSTEM |
| 187,751 | AUTOMATIC FOUR-SPEED TRANSMISSION |
| 187,493 | PUSH/PULL CLUTCH APPLY PISTON OF AN AUTOMATIC TRANSMISSION |
| 187,781 | SHARED REACTION PLATES BETWEEN CLUTCH ASSEMBLIES IN AN AUTOMATIC TRANSMISSION |
| 189,492 | CLUTCH REACTION AND PRESSURE PLATES IN AN AUTOMATIC TRANSMISSION |
| 188,602 | BLEEDER BALL CHECK VALVES IN AN AUTOMATIC TRANSMISSION |
| 188,610 | PRESSURE BALANCED PISTONS IN AN AUTOMATIC TRANSMISSION |
| 189,494 | DOUBLE-ACTING SPRING IN AN AUTOMATIC TRANSMISSION |
| 188,613 | PARK LOCKING MECHANISM FOR AN AUTOMATIC TRANSMISSION |
| 187,770 | SOLENOID-ACTUATED VALVE ARRANGEMENT OF AN AUTOMATIC TRANSMISSION SYSTEM |
| 187,796 | RECIPROCATING VALVES IN A FLUID SYSTEM OF AN AUTOMATIC TRANSMISSION |
| 187,705 | VENT RESERVOIR IN A FLUID SYSTEM OF AN AUTOMATIC TRANSMISSION |
| 188,592 | FLUID ACTUATED SWITCH VALVE IN AN AUTOMATIC TRANSMISSION |
| 188,598 | DIRECT-ACTING, NON-CLOSE CLEARANCE SOLENOID-ACTUATED VALVES |
| 188,618 | NOISE CONTROL DEVICE FOR A SOLENOID-ACTUATED VALVE |
| 188,605 | FLUID ACTUATED PRESSURE SWITCH FOR AN AUTOMATIC TRANSMISSION |
| 187,210 | METHOD OF APPLYING REVERSE GEAR OF AN AUTOMATIC TRANSMISSION |
| 187,672 | TORQUE CONVERTER CONTROL VALVE IN A FLUID SYSTEM OF AN AUTOMATIC TRANSMISSION |
| 187,120 | CAM-CONTROLLED MANUAL VALVE IN AN AUTOMATIC TRANSMISSION |
| 187,181 | FLUID SWITCHING MANUALLY BETWEEN VALVES IN AN AUTOMATIC TRANSMISSION |
| 188,020 | METHOD OF SHIFT SELECTION IN AN ELECTRONIC AUTOMATIC TRANSMISSION SYSTEM |
| 187,991 | METHOD OF UNIVERSALLY ORGANIZING SHIFTS FOR AN ELECTRONIC AUTOMATIC TRANSMISSION SYSTEM |
| 188,603 | METHOD OF DETERMINING AND CONTROLLING THE LOCK-UP OF A TORQUE CONVERTER IN AN ELECTRONIC AUTOMATIC TRANSMISSION SYSTEM |
| 188,617 | METHOD OF ADAPTIVELY IDLING AN ELECTRONIC AUTOMATIC TRANSMISSION SYSTEM |
| 189,553 | METHOD OF DETERMINING THE DRIVER SELECTED OPERATING MODE OF AN AUTOMATIC TRANSMISSION SYSTEM |
| 188,615 | METHOD OF DETERMINING THE SHIFT LEVER POSITION OF AN ELECTRONIC AUTOMATIC TRANSMISSION SYSTEM |
| 188,594 | METHOD OF DETERMINING THE ACCELERATION OF A TURBINE IN AN AUTOMATIC TRANSMISSION |
| 187,771 | METHOD OF DETERMINING THE FLUID TEMPERATURE OF AN ELECTRONIC AUTOMATIC TRANSMISSION SYSTEM |
| 188,607 | METHOD OF DETERMINING THE CONTINUITY OF SOLENOIDS IN AN ELECTRONIC AUTOMATIC TRANSMISSION SYSTEM |
| 189,579 | METHOD OF DETERMINING THE THROTTLE ANGLE POSITION FOR AN ELECTRONIC AUTOMATIC TRANSMISSION SYSTEM |
| 188,604 | METHOD OF CONTROLLING THE SPEED CHANGE OF A KICKDOWN SHIFT FOR AN ELECTRONIC AUTOMATIC TRANSMISSION SYSTEM |
| 188,591 | METHOD OF CONTROLLING THE APPLY ELEMENT DURING A KICKDOWN SHIFT FOR ELECTRONIC AUTOMATIC TRANSMISSION SYSTEM |
| 188,608 | METHOD OF CALCULATING TORQUE FOR AN ELECTRONIC AUTOMATIC TRANSMISSION SYSTEM |
| 187,150 | METHOD OF LEARNING FOR ADAPTIVELY CONTROLLING AN ELECTRONIC AUTOMATIC TRANSMISSION SYSTEM |
| 188,595 | METHOD OF ACCUMULATOR CONTROL FOR A FRICTION ELEMENT IN AN ELECTRONIC AUTOMATIC TRANSMISSION SYSTEM |
| 188,599 | METHOD OF ADAPTIVELY SCHEDULING A SHIFT FOR AN ELECTRONIC AUTOMATIC TRANSMISSION SYSTEM |
| 188,601 | METHOD OF SHIFT CONTROL DURING A COASTDOWN SHIFT FOR AN ELECTRONIC AUTOMATIC TRANSMISSION SYSTEM |
| 188,620 | METHOD OF TORQUE PHASE SHIFT CONTROL FOR AN ELECTRONIC AUTOMATIC TRANSMISSION |
| 188,596 | METHOD OF DIAGNOSTIC PROTECTION FOR AN ELECTRONIC AUTOMATIC TRANSMISSION SYSTEM |
| 188,597 | METHOD OF STALL TORQUE MANAGEMENT FOR AN ELECTRONIC AUTOMATIC TRANSMISSION SYSTEM |
| 188,606 | METHOD OF SHIFT TORQUE MANAGEMENT FOR AN ELECTRONIC AUTOMATIC TRANSMISSION SYSTEM |
| 188,616 | ELECTRONIC CONTROLLER FOR AN AUTOMATIC TRANSMISSION |
| 188,600 | DUAL REGULATOR FOR REDUCING SYSTEM CURRENT DURING AT LEAST ONE MODE OF OPERATION |
| 188,619 | UTILIZATION OF A RESET OUTPUT OF A REGULATOR AS A SYSTEM LOW-VOLTAGE INHIBIT |
| 188,593 | THE USE OF DIODES IN AN INPUT CIRCUIT TO TAKE ADVANTAGE OF AN ACTIVE PULL-DOWN NETWORK PROVIDED IN A DUAL REGULATOR |
| 188,609 | SHUTDOWN RELAY DRIVER CIRCUIT |
| 188,614 | CIRCUIT FOR DETERMINING THE CRANK POSITION OF AN IGNITION SWITCH BY SENSING THE VOLTAGE ACROSS THE STARTER RELAY CONTROL AND HOLDING AN ELECTRONIC DEVICE IN A RESET CONDITION IN RESPONSE THERETO |
| 188,612 | THROTTLE POSITION SENSOR DATA SHARED BETWEEN CONTROLLER WITH DISSIMILAR GROUNDS |
| 188,611 | NEUTRAL START SWITCH TO SENSE SHIFT LEVER POSITION |

-continued

| U.S. Ser. No. | Title |
|---|---|
| 188,981 | OPEN LOOP CONTROL OF SOLENOID COIL DRIVER |

Commonly assigned application Serial No. 07/187,772, filed Apr. 29, 1988, now U.S. Pat. No. 4,875,391 has been printed in its entirety. The Figures and the entire Specification of that patent are specifically incorporated by reference. For a description of the above copending applications, reference is made to the above mentioned U.S. Pat. No. 4,875,391.

SUMMARY OF THE INVENTION

To achieve the foregoing objects, the present invention provides a comprehensive four-speed automatic transmission system. While this transmission system particularly features a fully adaptive electronic control system, numerous other important advances are incorporated into this unique transmission system, as will be described below in detail.

In addition to the advantages offered by the adaptive control system, the present invention achieves the combination of this control system with a unique four-speed transaxle structure which requires fewer components and is smaller than previous four-speed transmission systems. For example, the four-speed transmission system according to the present invention is capable of fitting into the space made available for a conventional three-speed transmission system.

Additionally, the four-speed transmission system features a controller for the transmission which is programmed to control the overall operation of the transmission.

BRIEF DESCRIPTION OF THE DRAWINGS

Other objects, features and advantages of the present invention will become more fully apparent from the following detailed description of the preferred embodiment, the appended claims and in the accompanying drawings in which:

FIG. 12 is a flow chart of the overall operational methodology of the transmission controller according to the present invention;

FIGS. 13A-13C are flow charts of the shift select methodology of FIG. 12 according to the present invention;

FIG. 14A is a flow chart of the shift schedule methodology of FIG. 12; and FIGS. 14B14D are shift schedule graphs;

FIG. 15A is a flow chart of the PSLOPE methodology of FIGS. 14; and FIG. 15B is a graph of the method used in FIG. 15A;

FIGS. 16A-16D are flow charts of the shift methodology of FIG. 12 according to the present invention; FIG. 16A is a flow chart of the upshift methodology; FIGS. 16B and 16C are flow charts of the downshift methodology; and FIG. 16D is a flow chart of the garage shift methodology;

FIGS. 18A-18C illustrate the adaptive idle methodology according to the present invention; FIG. 18A is a flow chart of the adaptive idle methodology; FIG. 18B is a graph of the cycle time of one solenoid-actuated valve; and FIG. 18C is a graph of speed versus time for the turbine of the torque converter;

FIG. 19 is a schematic diagram of the PRNODDL methodology of FIG. 12 according to the present invention;

FIGS. 21A and 21C are flow charts of the pressure switch test and transmission temperature methodology; FIG. 21D is a graph of a predicted transmission temperature methodology;

FIGS. 22A-22E illustrate the solenoid continuity test methodology according to the present invention; FIGS. 22A-22D are flow charts of the solenoid continuity test methodology; and FIG. 22E is a graph of solenoid driver logic;

FIGS. 23A-23C illustrate the throttle angle computation methodology according to the present invention; FIGS. 23A and 23B are flow charts of the throttle angle computation methodology; and FIG. 23C is a plot of variables used for the throttle angle computation methodology;

FIGS. 24A-24L illustrate the shift methodology according to the present invention; FIG. 24A is a shift graph tape for a third to first gear kickdown shift; FIG. 24B is a graph of torque converter characteristics for the turbine torque methodology; FIG. 24C is a partial shift tape graph of the learn methodology for kickdown shifts; FIG. 24D is a shift tape graph for a first to second gear upshift; FIG. 24E is a flow chart of the learn methodology; FIG. 24F is a graph for the adaptive scheduling methodology for a fourth to third gear coastdown shift; FIG. 24G is a phase plane graph for a second to first gear coastdown shift; FIG. 24H is a partial shift tape graph for a second to first gear coastdown shift; FIG. 24I is a flow chart of the release element logic for a kickdown or coastdown shift; FIG. 24J is a flow chart of the apply element logic for a kickdown or coastdown shift; FIG. 24K is a graph of pressure versus time for an element; and FIG. 24L is a shift tape graph for a neutral to reverse gear garage shift;

FIGS. 25A-25K are flow charts of the on-board diagnostics according to the present invention.

TRANSMISSION CONTROL METHOD

Figure 13B:
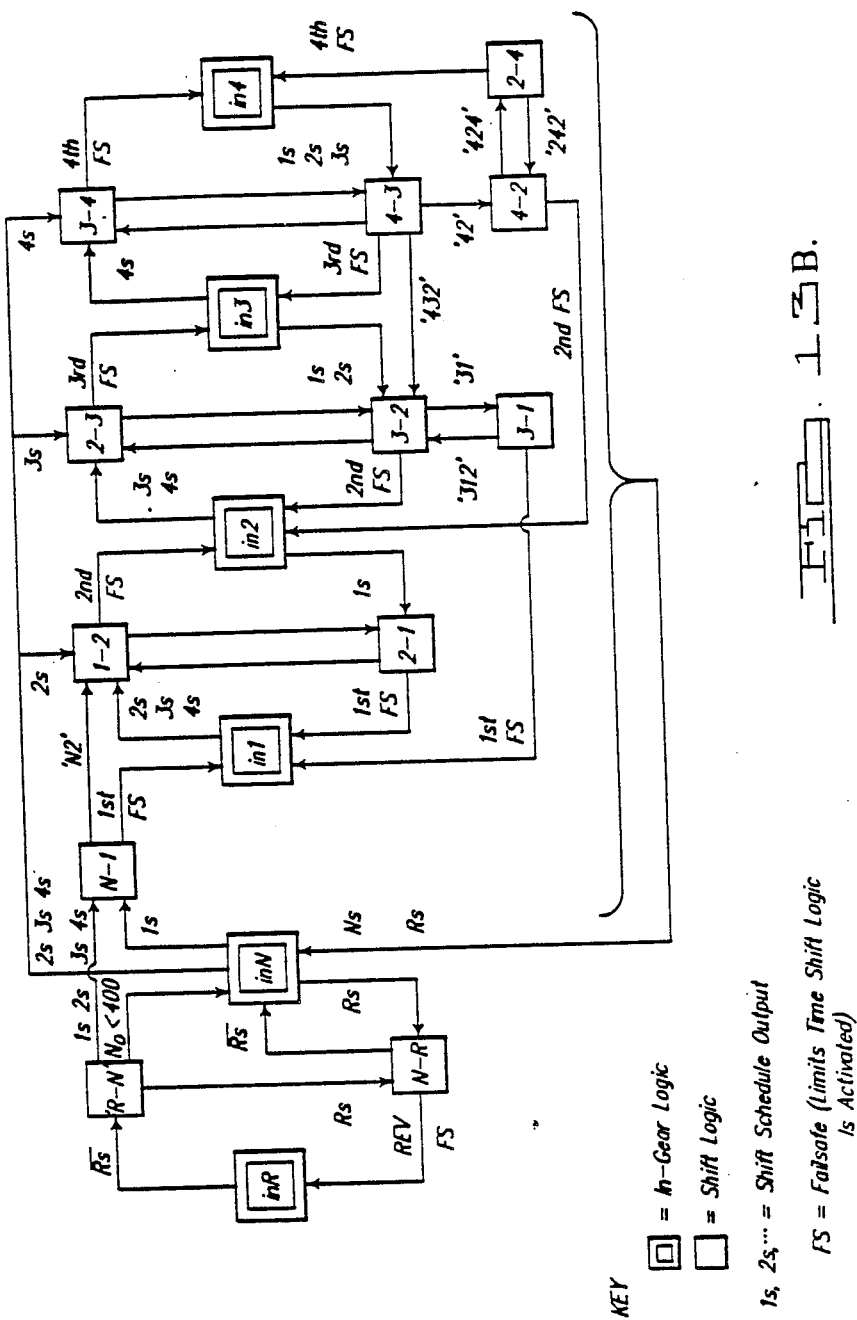

Referring to FIG. 12, the logic or methodology of the transmission controller 3010 is shown at 800. When the key of the vehicle is turned on, power-up of the transmission controller 3010 occurs in bubble 802. Next, the transmission controller 3010 performs or enters a seven millisecond (7 ms.) main program or control loop. At the beginning of the main control loop, the methodology advances to block 804 called shift select to "orchestrate" various methods used to determine the operating mode or gear, i.e. first gear, the transmission 100 is presently in and which gear the transmission 100 should be in next, and comparing the two to each other to determine if a shift is required. The methodology advances to bubble 806 to calculate the speed and acceleration of the turbine 128, output gear 534 and engine crankshaft 114. The transmission controller 3010 receives input data from the turbine speed sensor 320 (turbine speed $N_t$), output speed sensor 546 (output speed $N_o$) and engine speed sensor (not shown)(engine speed $N_e$) in circle 808. In bubble 806, the engine speed $N_e$, turbine speed $N_t$ and output speed $N_o$ are calculated from the input data. The methodology advances to bubble 810 called the shift schedule to be described under section heading "SHIFT SCHEDULE METHOD". The shift schedule bubble 810 reads or determines the shift lever position 606, PRNODDL, of the manual lever 578 by contact switch sensors ($NS_1$, $NS_2$) (See FIG. 4B) in circle 812. The shift schedule bubble 810 also determines the throttle angle THRT ANGLE of the engine, to be described under section heading "THROTTLE ANGLE COMPUTATION AND FAILURE DETECTION", by an input of a potentiometer (not shown) connected to the throttle (not shown) in circle 814. The shift schedule bubble 810 further determines the engine temperature, to be described under section heading "PRESSURE SWITCH TEST AND TRANSMISSION TEMPERATURE DETERMINATION METHOD" in circle 816. The shift schedule bubble 810 uses the data items such as output speed $N_o$ in circle 815 (generated by bubble 806), PRNODDL (generated by circle 812) and throttle angle (generated by circle 814) to determine the appropriate gear the transmission 100 should be placed.

The methodology advances to bubble 818 which outputs the appropriate command signals to the solenoid-actuated valves 630, 632, 634 and 636 and properly energizes or de-energizes them based on which gear the transmission 100 is in, as determined by circle 812. The methodology advances to bubble 820 to execute diagnostic or monitoring routines. In diagnostic bubble 820, the transmission controller 3010 determines if the proper pressure switches 646, 648 and 650, previously described, are pressurized by either looking for signals from a specific pressure switch combination for the present in-gear condition of the transmission 100 or from a specific pressure switch to a non-controlling clutch during a pressure switch test to be described. The transmission controller 3010 also determines if the wires in the control system are not shorted or open by looking for a flyback voltage or EMF spike during a solenoid continuity test to be described under section "SOLENOID CONTINUITY TEST METHOD". The methodology then advances to diamond 822 and determines whether a failure has occurred. If a failure has occurred, the methodology advances to block 824 in which the transmission controller 3010 de-energizes the solenoid-actuated valves 630, 632, 634 and 636 which assume their normal positions to allow the transmission 100 to operate in second gear in the drive mode, i.e. limp-home mode previously described. If a failure has not occurred, the methodology advances to the shift select block 804. Based on the calculated speeds and shift schedule output (SSOUTP), the methodology determines if a shift is required. This process is done every 7 ms.

Since the shift select block 804 compares the gear the transmission 100 is presently in, to the SSOUTP, the methodology advances to diamond 826 and determines if a shift or gear change is required. If a shift is required, the methodology advances to block 828 called the shift logic to be described herein. Otherwise, if a shift is not required, the methodology advances to diamond 830 and looks at the lock-up schedules, i.e. a plot of THRT ANGLE verses $N_t$, etc., to determine if lock-up of the torque converter 110 is required. If lock-up is not required, the methodology returns to the beginning of the shift select block 804 again for another 7 ms. loop. Otherwise, if lock-up is required, the methodology advances to diamond 832 and determines if the torque converter 110 is presently locked-up by looking for a flag that has previously been set during full lock-up of the torque converter 110. If the torque converter 110 is presently locked-up, the methodology returns to the shift select block 804. Otherwise, the methodology advances to block 834 called partial lock-up logic or methodology, to be described under section heading "TORQUE CONVERTER LOCK-UP METHOD", for the torque converter 110.

If a shift or gear change is needed or required, the shift logic block 828 uses one of twelve unique programs or routines. The shift routines are 1-2, 2-3, 2-4, 3-4 (upshifts); 4-3, 4-2, 3-2, 3-1, 2-1, (downshifts); and N-1, R-N, N-R (garage shifts) to be described herein. The shift logic block 828 has to identify the proper shift logic routine, and then execute it. The shift logic block 828 controls the solenoid-actuated valves 630, 632, 634 and 636 to shift the transmission 100 from its present gear to the next gear in a smooth manner.

After the shift logic block 828, the methodology advances to diamond 836 and determines if lock-up of the torque converter 110 is required as previously described. If lock-up is required, the methodology advances to diamond 838 and determines whether the torque converter 110 is already locked-up as previously described. If the torque converter 110 is not already locked-up, the transmission controller 3010 executes the partial lock-up block 834, to be described herein.

The partial lock-up block 834 is used to reduce slip of the torque converter 110. Slip equals $N_e$ minus $N_t$. The partial lock-up block 834 instructs or causes the transmission 100 to fully lock, partially lock or fully unlock the torque converter 110. If unlock is desired, the transmission controller 3010 will hold the solenoid-actuated valve 636 in the de-energized or normally vented mode to move the LU switch valve 614 and allow fluid pressure to disengage the lock-up clutch 186. If partial lock is desired, the transmission controller 3010 will reduce slip to a low or predetermined desired value, but not completely eliminate it. The transmission controller 3010 calculates the slip by $N_e$ minus $N_t$ based on the input from sensors previously described. The transmission controller 3010 compares this to a predetermined desired value of slip, e.g. 60 r.p.m., and thus, determines if the torque converter 110 is slipping too much or too little. If too much slip occurs, the transmission controller 3010 will increase the duty cycle ("ON" time) of the low/reverse clutch solenoid-actuated valve 636 and the LU switch valve 614, which will increase the pressure differential across the lock-up clutch assembly 186 and thus, decrease the slip. This technique is called "pulse-width modulation".

If full lock-up is desired, the transmission controller 3010 will gradually increase the fluid pressure to lock-up clutch 186, adding more "ON" cycle time to the solenoid-actuated valve 636 thereby increasing the "ON" cycle time at the LU switch valve 614 until maximum, resulting in zero slip.

Returning to diamond 836, if the transmission controller 3010 determines that lock-up of the torque converter 110 is not required, the methodology advances to bubble 840 to execute diagnostic or monitoring routines as previously described. Similarly, if the transmission controller 3010 determines that the torque converter 110 is already locked-up in diamond 838, the methodology advances to bubble 840 to execute diagnostic or monitoring routines as previously described. Further, once the partial lock-up block 834 is completed, the methodology advances to bubble 840 to execute diagnostic or monitoring routines as previously described.

From diagnostic bubble 840, the methodology advances to diamond 842 and determines whether a failure has occurred as previously described. If a failure has occurred, the methodology advances to block 844 and causes the transmission 100 to default to or operate in second gear. Otherwise, if no failure occurs in diamond 842, the methodology advances to diamond 846 and determines if the time period for the diagnostic loop has expired by any suitable method such as looking at a counter. If the time has not expired, the methodology advances to bubble 840 to execute the diagnostic routines again until the time period has expired. If the time period has expired, the methodology advances to bubble 848 to calculate speeds $N_e$, $N_t$ and $N_o$ as previously described. The methodology then advances to bubble 850 to perform another shift schedule as previously described using PRNODDL circle 852, output speed $N_o$ circle 855, THRT ANGLE circle 854, and engine temperature circle 856.

To perform the shift in a smooth manner, the transmission controller 3010 slips the clutches of the multi-clutch assembly 300. The transmission controller 3010 has to control the pressure on applying clutches and releasing clutches in an orchestrated manner. To do this, the methodology advances from the shift schedule bubble 850 to bubble 858 and determines the appropriate rate of acceleration, called the "desired acceleration" (alpha$_{desired}$ or $\alpha^*$) to control the turbine 128. The desired acceleration may be predetermined by an equation, point/slope interpolation or any other suitable method. The methodology advances to bubble 860 and calculates the present acceleration (alpha$_t$ or $\alpha_t$) of the turbine 128 based on turbine speed $N_t$ which tells the transmission controller 3010 how quickly the shift is happening. The transmission controller 3010 indirectly compares the value of desired acceleration with the calculated acceleration. This may be accomplished by placing the above values into an equation to decide the duty cycle for proportional control to be described. The methodology advances to bubble 862 to output the appropriate command signals to either actuate and/or deactuate (turn logically either "ON" or "OFF") the solenoid-actuated valves 630, 632, 634 and 636 for the engaging (apply) or disengaging (release) of the clutches.

For upshifts, if the turbine 128 is decelerating too fast, the transmission controller 3010 reduces the pressure on the applying clutch by either actuating and/or deactuating the solenoid-actuated valves 630, 632, 634 and 636 in bubble 862. For downshifts, if the turbine 128 is accelerating too rapidly, the transmission controller 3010 increases the pressure on the applying clutch by either actuating and/or deactuating the solenoid-actuated valves 630, 632, 634 and 636 in bubble 862. If the turbine assembly 128 is accelerating at the desired acceleration level, the solenoid-actuated valves 630, 632, 634 and 636 are either actuated and/or deactuated to obtain the shift or gear change. At the end of 7 ms. loop, the methodology advances to diamond 864. The transmission controller 3010 tallies the ratios of $N_t$ to $N_o$ again to determine if the shift or gear change is complete. If $N_o$ and $N_t$ are at proper values, i.e. ratio $\times N_o = N_t$ for a predetermined time period which is different for each shift, the transmission controller 3010 determines that the shift or gear change is complete. The methodology returns to the beginning of the control loop to the shift select block 804. If the shift or gear change is not complete, the methodology returns to the shift logic block 828 to repeat the method as previously described.

SHIFT SELECTION METHOD

The shift "select" routine or method in block 804 of FIG. 12 falls in the main loop immediately after system start-up in bubble 802 of FIG. 12. The shift schedule routine of bubble 810 is called before shift selection analysis is performed. All other key variables such as output speed $N_o$, turbine speed $N_t$, acceleration, etc. are also updated prior to shift selection analysis. The shift schedule routine of bubble 810 determines the appropriate gear the transmission 100 of the vehicle should be placed in (See FIG. 13B) as described subsequently herein. This information is conveyed by setting the bits of "shift schedule output" (SSOUTP). The shift selection block 804 compares the gear related bits of the in-gear code (IGCODE) as defined by circle 812 and SSOUTP. If they are equal, no shift is required. In this case, the methodology will decode what gear the transmission 100 is in and will revalidate the proper "clutch" and "solenoid" states (i.e. either logically "ON" or "OFF") of the valves 630, 632, 634 and 636 (FIGS. 5A-L).

The shift selection method (FIG. 13B) has enormous complexity. In order to minimize the size of the method to a manageable level and to derive RAM and ROM efficacy, a technique using a shift "control table" is employed. Each row of the shift control table has four bytes. The shift control table format is defined as follows:

| MASK | IGCODE | SHCODE IF IGCODE TRUE | COMPLEMENT SHCODE |
|------|--------|------------------------|---------------------|
| (1)  | (2)    | (3)                    | (4)                 |

The SHCODE is the "shift code", i.e. from first to second gear. IGCODE is the in-gear code, i.e. present operating gear of the transmission 100. MASK is the eight bit binary code for the result of a logical operation.

As illustrated in FIG. 13A, the shift select block 804 is generally shown for a shift selection while the transmission 100 is operating "in gear", i.e. the transmission 100 is presently in first gear for example. After power-up in bubble 802 of FIG. 12, the methodology enters the shift select through bubble 866. The methodology advances to block 868 and points to the beginning or start of the shift control table (first row), previously described, which is stored in memory. The methodology advances to block 870 and prepares a "select mask" (M) from which the IGCODE and SSOUTP are "logically AND-ed". The methodology advances to block 872 and compares mask (M) with the first byte in the shift control table row. The methodology advances to diamond 874 and determines whether a matching row was found. If a matching row was found, the methodology advances to block 876 and points to the next row in the shift control table. The methodology then loops back to diamond 874 previously described.

If a matching row was found at diamond 874, the methodology advances to diamond 876 and deters whether the present IGCODE equals the second byte of the shift control table row. If the present IGCODE equals the second byte, the methodology advances to block 878 and picks the third byte containing the shift to be performed, i.e. first to second gear. If the present IGCODE does not equal the second byte, the methodology advances to block 880 and picks the fourth byte containing the shift to be performed. The methodology advances from blocks 878 and 880 to bubble 882. At bubble 882, the methodology returns or goes to top of shift in shift logic block 828 of FIG. 12 to perform the shift just selected. The shift select block 804 is shown schematically in FIG. 13B.

If the present shift is to be abandoned for a new shift, i.e. a shift selection while the transmission 100 is presently performing a shift, a selection process called "change-mind" analysis is used as illustrated in FIG. 13C. During the shift loop, the methodology enters the change-mind portion of the shift selection block 804 through bubble 884. The methodology then advances to diamond 886 and determines whether a new shift schedule is different from the present shift schedule by looking at the shift schedule output (SSOUTP) which may be a coded register. If not, the methodology advances to bubble 888 and determines that change-mind analysis is not allowed and continues the present shift. If the new shift schedule (SSOUTP) is different from the present shift schedule, the methodology advances to block 890 and vectors to the proper change-mind processing point based on a change mind table stored in memory which is similar to the shift control table. In other words, the methodology uses a vector table oriented method for analysis of each "present shift" and jumps to the proper process point. The methodology then advances to block 892 and performs checks using key variables (i.e. speeds, throttle angle, speed ratios, SSOUTP, IGCODE, etc.) at its appropriate processing point. The methodology advances to diamond 894 and determines whether change-mind conditions are valid by the old SSOUTP not matching the new or recent SSOUTP. If the conditions are not valid, the methodology advances to bubble 888 previously described to continue the present shift. If the change-mind conditions are valid, the methodology advances to bubble 896 and aborts the present shift and selects the new shift from the processing point.

SHIFT SCHEDULE METHOD

The shift schedule method determines the appropriate gear in which the transmission 100 should be placed. The shift schedule method first determines the present gear of the transmission 100 by the shift lever position 606 of the manual lever 578 in circle 812 of FIG. 12. Based on the shift lever position 606, the shift schedule method determines the appropriate gear in which the transmission 100 should be placed.

Figure 14A:
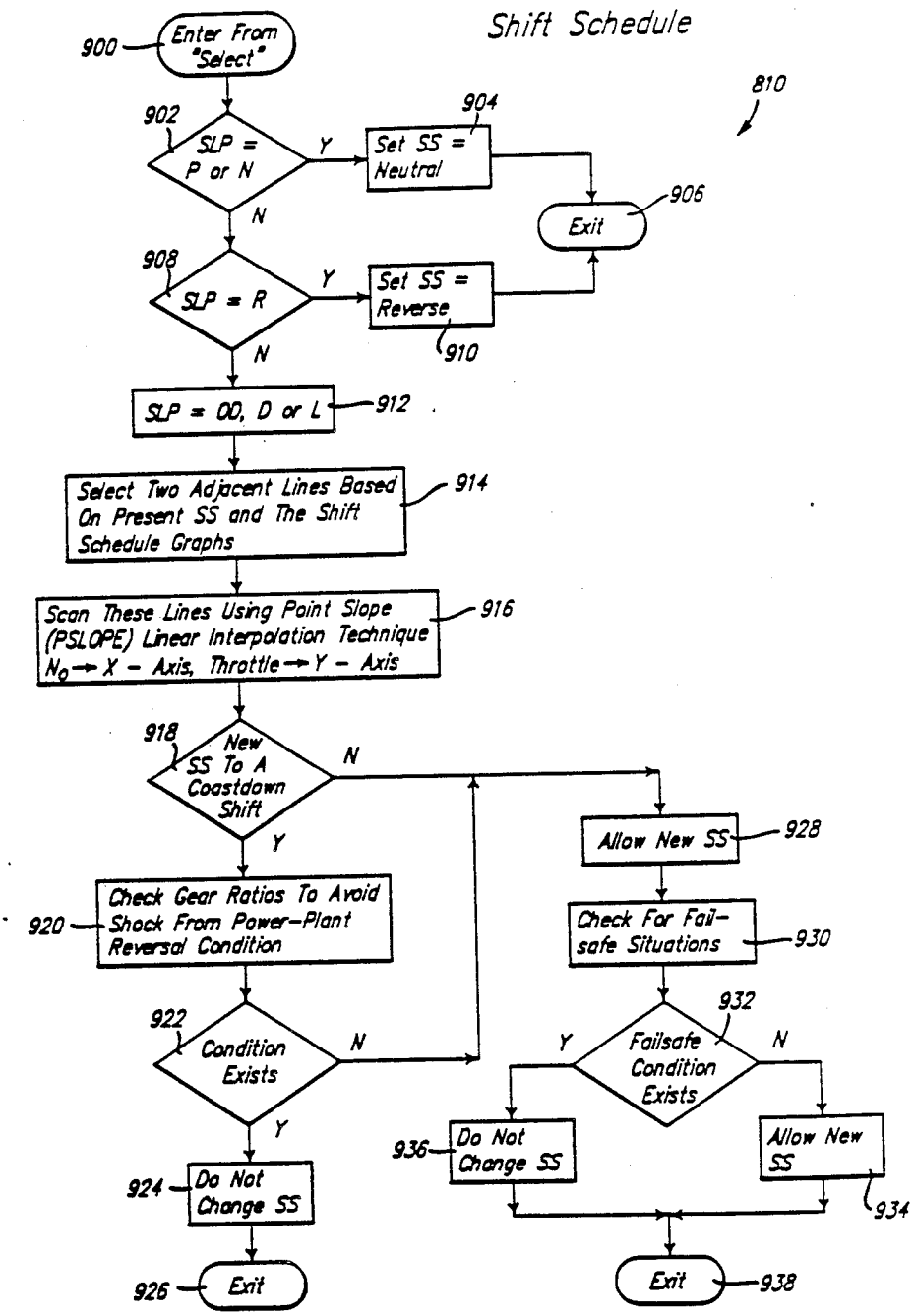
FIGS. 14A-14D illustrate the shift schedule methodology according to the present invention.

Referring to FIG. 14A, the bubble 810 of FIG. 12 for the shift schedule method is shown. The methodology enters from the shift select block 804 through bubble 900 and advances to diamond 902. At diamond 902, the methodology determines whether the shift lever position (SLP) 606 of the manual lever 578 is part P or neutral N by reading a coded signal from the sensors $NS_1$ and $NS_2$ (FIG. 4B) to be described. If SLP 606 is park or neutral, the methodology advances to block 904 and sets the new output (SSOUTP) of the shift schedule (SS) to neutral. The methodology then returns or exits through bubble 906.

At diamond 902, if SLP 606 is not park or neutral, the methodology advances to diamond 908 and determines whether SLP 606 is reverse R by the signal from the sensors $NS_1$ and $NS_2$. If SLP 606 is reverse, the methodology then advances to block 910 and sets shift schedule to reverse. The methodology then returns or exits through bubble 906.

Figure 14B:
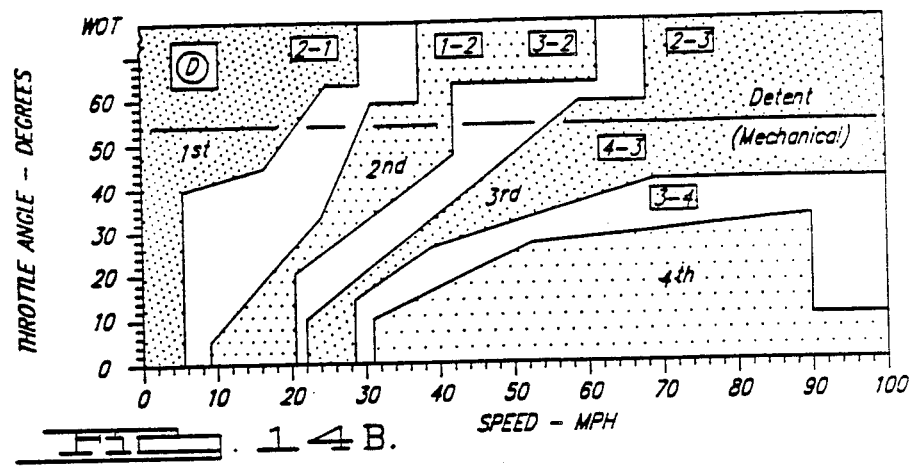
Figure 14C:
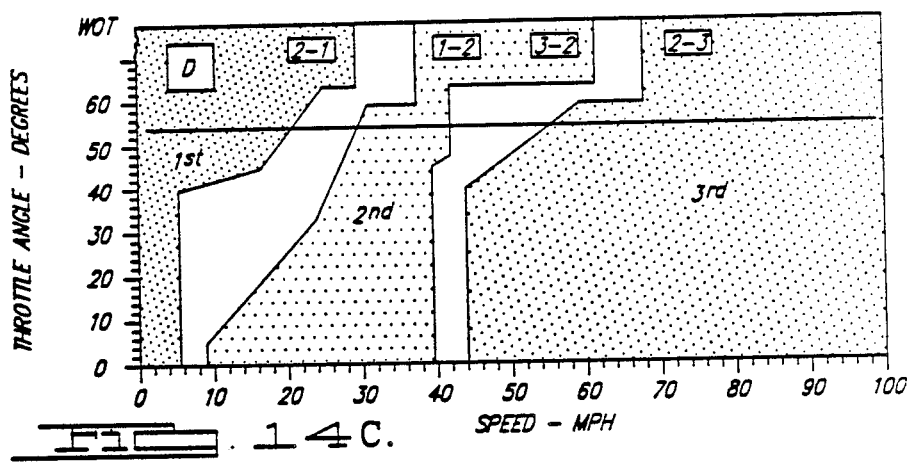
Figure 14D:
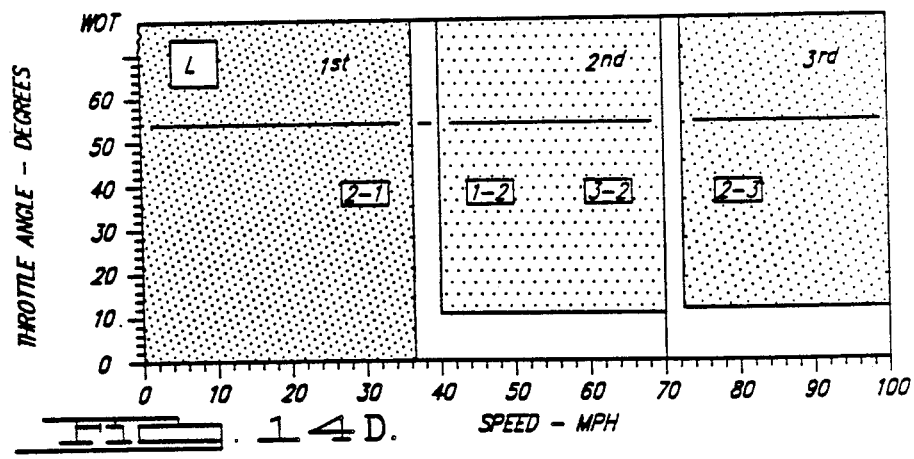

At diamond 908, if SLP 606 is not reverse, the methodology advances to block 912 concludes or determines that SLP 606 is equal to overdrive OD, drive D or low L. The methodology then advances to block 914 and selects two adjacent lines based on the present shift schedule and the shift schedule graphs shown in FIGS. 14B through 14D for a SLP 606 of overdrive OD, drive D or low L. The methodology advances to block 916 and scans these lines using a technique called "point slope" (PSLOPE), to be described under section heading "PSLOPE METHOD" (FIGS. 15A and 15B) which is a linear interpolation technique ($N_o$ on X-axis and throttle angle on Y-axis). The methodology advances to diamond 918 and determines whether there is a new shift schedule to a coastdown shift, i.e. second to first gear from the SSOUTP (for a downshift) and throttle angle (for coast versus kick). If there is a new shift schedule to a coastdown shift, the methodology advances to block 920 and checks the gear ratios of the gear assembly 500 by performing speed calculations to avoid a "shock" from a power-plant reversal situation. A power-plant reversal situation or condition exists when the wheels of the vehicle drive the engine through the transmission during deceleration rather than the engine driving the transmission, in turn, driving the wheels. The methodology advances to diamond 922 and determines whether a power-plant reversal situation or condition exists. If a power-plant reversal condition exists, the methodology advances to block 924 and does not change the shift schedule. The methodology returns or exits through bubble 926.

At diamond 918, if there is not a new shift schedule to a coastdown shift, the methodology advances to block 928. Also, if a power-plant reversal condition does not exist at diamond 922, the methodology advances to block 928. At block 928, the methodology allows for a new shift schedule. The methodology then advances to block 930 and checks for diagnostic situations or conditions as previously described in conjunction with FIG. 12. The methodology advances to diamond 932 and determines whether a diagnostic situation or condition exists. If a diagnostic condition does not exist, the methodology advances to block 934 and allows the shift schedule to proceed or be changed to the new shift schedule. If the diagnostic condition does exist, the methodology advances to block 936 and does not change the shift schedule. The methodology advances from blocks 934 and 936 to bubble 938 and exits or returns.

PSLOPE METHOD

Figure 15A:
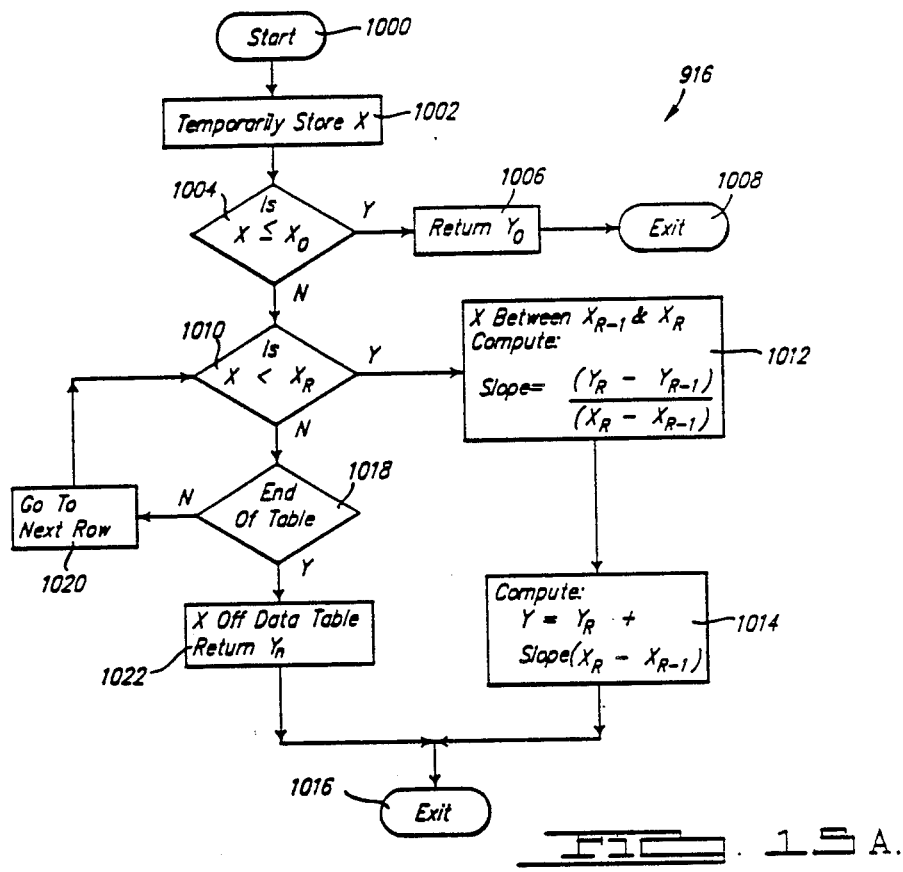
FIGS. 15A-15B illustrate the PSLOPE methodology according to the present invention.
Figure 15B:
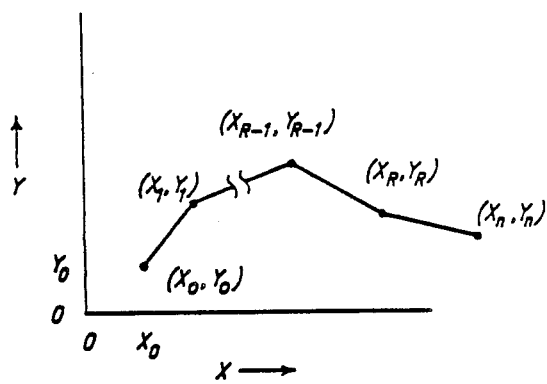

Referring to FIGS. 15A and 15B, the "point slope" (PSLOPE) routine of block 916 of FIG. 14A is shown. The PSLOPE method determines the throttle angle given output speed $N_o$ by scanning the shift lines in FIGS. 14B through 14D stored as a table in the memory of the transmission controller 3010. At the start of the PSLOPE routine in bubble 1000 of FIG. 15A, the methodology advances to block 1002 and temporarily stores the value for X in the memory of the transmission controller 3010. The methodology then advances to diamond 1004 and determines whether X is less than or equal to $X_o$ (FIG. 15B) which is a point on the shift line.

If X is less than or equal to $X_o$, the methodology advances to block 1006 and gets or obtains the value for $Y_o$ and returns or exits through bubble 1008. If X is greater than $X_o$, the methodology advances to diamond 1010 and determines whether X is less than $X_R$. If X is less than $X_R$, the methodology advances to block 1012 and computes the slope between the points $X_R$ and $X_{R-1}$. The methodology then advances to block 1014 and computes Y based on $Y_R$ plus slope. The methodology then returns or exits through bubble 1016.

At diamond 1010, if X is not less than $X_R$, the methodology advances to diamond 1018 and determines whether the method is at the end of a table of values for the shift schedule graphs (FIGS. 14B–D), i.e. $X_o$; $Y_o$; $X_R$; $Y_R$; $X_n$; $Y_n$. If the method is not at the end of the table, the methodology advances to block 1020 and goes to the next row of the table. The methodology then loops back to diamond 1010.

If the methodology is at the end of the table at diamond 1018, the methodology advances to block 1022 and concludes or determines that the value for X is not in the table but greater than $X_n$ (FIG. 15B), and gets the $Y_n$ value, i.e. the last value $Y_n$ from the data table based on the value for $X_n$. The methodology then returns or exits through bubble 1016.

SHIFT LOGIC METHOD

The shift logic block 828 contains twelve unique shift programs. The shift logic block 828 identifies the shift logic or routine to be executed. For example, if the transmission 100 is in first gear and the shift schedule output (SSOUTP) changes to call for second gear, the shift selection block 804 picks a SHCODE and shift logic block 828 identifies and executes the SHCODE for first to second (1-2) logic.

Each of the twelve different shifts involves extensive calculations and logical manipulations to determine the "ON" or "OFF" states of the solenoids of the solenoid-actuated valves 630, 632, 634 and 636 (FIGS. 5A–L) for engaging (applying) or disengaging (releasing) of the clutches for the shifts. These shifts are organized into three sets of shifts as follows: upshifts 1-2, 2-3, 3-4 and 2-4; downshifts 2-1, 3-1, 4-3, 4-2 and 3-2; and garage shifts N-1, N-R and R-N.

The methodology consists of three major routines, one for each of the above sets of shifts. To make this possible, a "Control Table" method is used. The key parametric entities are imbedded in a shift control table as follows:

| SHIFT CONTROL TABLE | |
|---|---|
| FORMAT | NUMBER OF BYTES |
| RELEASE ELEMENT BIT | (1) |
| APPLY ELEMENT BIT | (1) |
| ADDR. OF VF (APPLY) | (1) |
| ADDR. OF VF (REL.) | (1) |
| NI GEAR (initiating ratio) | (2) |
| NJ GEAR (destination ratio) | (2) |
| DESTINATION ELEMENT MASK | (1) |

All calibration variables are segregated into a separate table called a "Volume Table" for example, as follows:

| VOLUME TABLES | |
|---|---|
| CLUTCH IDENTIFIER | ELEMENT |
| 103 | QF CU. INCH/MS. |

| VOLUME TABLES -continued | |
|---|---|
| CLUTCH IDENTIFIER | ELEMENT |
| 54 | QV CU. INCH/MS. |
| 1802 | C CU. INCHES |
| 18514 | VA CU. INCHES |
| 17 | SLOPE QF |
| 74 | SLOPE QV |
| VFLRC | ADDR. OF "VF" |

Thus, during product development, the key flow-rate and volumetric parameters can be efficiently and manageably altered. As a result, each major shift routine (upshift, downshift or garage shift) can do one of its many shifts just by getting the necessary fixed parameters from the shift control table and the calibration (volumetric, flow rates, etc.) data from the volume tables.

Accordingly, this shift logic method provides the following advantages: efficient management of ROM and RAM resources of the transmission controller 3010; efficiency during product calibration cycle; and defect preventiveness during development due to the segregation by upshifts, downshifts and garage shifts and by fixed versus calibration parameters.

Referring to FIG. 16A, for upshifts of the shift logic block 828 of FIG. 12, the methodology enters the start or top of shift in the shift logic block 828 through bubble 1100. The methodology advances to diamond 1102 and determines whether the torque converter 110 is presently in the lock-up mode as previously described. If the torque converter 110 is presently locked, the methodology advances to block 1104 and instructs the transmission controller 3010 to unlock the torque converter 110 when slip from the present gear toward the target gear begins, i.e. from first to second gear. The methodology then advances to block 1106.

At diamond 1102, if the torque converter 110 is not in the lock-up mode, the methodology advances to block 1106. At block 1106, the transmission controller 3010 computes variables, such as $t_f$ (time remaining to nearly fill the apply clutch, $t_r$ (time to nearly release), $DC_t$ (torque phase duty cycle) etc., states/flags to be used in shift logic equations and intercepts/calculates variables used for "learning", to be described under section heading "LEARN METHODOLOGY" at the end of the shift. The methodology advances to block 1108 and solves a predetermined logic equation for the apply element such as a clutch. The methodology then advances to diamond 1110 and determines whether the solenoid for the apply element or oncoming clutch should be logically "ON" based on calculated speeds, throttle angle and SSOUTP.

It should be appreciated that the friction element (apply or release) such as a clutch is turned logically "ON or OFF" by either the energization or de-energization of the solenoid-actuated valve. It should also be appreciated that "ON" or "OFF" can be either "applying or venting" of the function element.

If the apply clutch should be ON, the methodology advances to diamond 1112 and determines whether the apply clutch is under duty cycle control, i.e. solenoid-actuated valve to the clutch is cycled "ON" and "OFF", by looking for a flag previously set. If the apply clutch is not under duty cycle control, the methodology advances to block 1114 and turns ON or applies the apply clutch by energizing or de-energizing the solenoid of the respective solenoid-actuated valve. If the apply clutch is under duty cycle control, the methodology advances to block 1116 and starts or continues the duty cycle.

At diamond 1110, if the apply clutch should not be ON, or applied the methodology advances to block 1118 and turns OFF or disengages the apply clutch. The methodology advances from blocks 1114, 1116 or 1118 to block 1120 and solves a predetermined the release clutch or off-going clutch logic equation. The methodology advances to diamond 1122 and determines whether the release clutch or off-going clutch should be ON based on calculated speeds, throttle angle and SSOUTP. If the release clutch should not be ON, the methodology advances to block 1124 and turns OFF or disengages the release clutch. The methodology then returns or exits through bubble 1126.

At diamond 1122, if the release clutch should be ON or applied, the methodology advances to diamond 1128 and determines whether the release clutch is under duty cycle control by looking for a flag as previously described. If the release clutch is not under duty cycle control, the methodology advances to block 1130 and turns ON or applies the release clutch. The methodology returns or exits through bubble 1126.

At diamond 1128, if the release clutch is under duty cycle control, the methodology advances to block 1132 and starts or continues the duty cycle. The methodology exits through bubble 1126.

Referring to FIGS. 16B and 16C, the downshift logic for the shift logic block 828 of FIG. 12 is shown. The methodology enters through bubble 1200. The methodology advances to diamond 1204 and determines whether the torque converter 110 is unlocked as previously described. If the torque converter 110 is not unlocked, the methodology advances to block 1206 and aborts partial or full lock-up operation. The methodology advances to block 1208.

At diamond 1204, if the torque converter 110 is unlocked, the methodology advances to block 1208. At block 1208, the transmission controller 3010 computes variables and states of flags to be used in similar shift logic equations of the upshift logic. The methodology advances to diamond 1210 and determines whether the present shift is a downshift to first gear by the SSOUTP. If the present shift is a downshift to first gear, the methodology advances to diamond 1212 and determines whether the solenoid switch valve 610 has moved to the low gear position (See FIG. 5E). The position of the solenoid switch valve 610 is determined by checking pressure switch data from the pressure switches 646, 648 and 650 within a predetermined time period. If the solenoid switch valve 610 has moved to the low gear position, the methodology advances to diamond 1214 and determines whether the solenoid switch valve 610 has moved back to the high gear or lock-up position (See FIG. 5F). If the solenoid switch valve 610 has moved back to the high gear position, the methodology returns or exits through bubble 1216.

At diamond 1212, if the solenoid switch valve 610 has not moved to the low gear position, the methodology advances to block 1218 and executes solenoid switch valve control logic (energizing and de-energizing the solenoid-actuated valves 634 and 636), previously described, to move the solenoid switch valve 610 to the low gear position. The methodology then advances to block 1220.

At diamond 1214, if the solenoid switch valve 610 has not moved back to the high gear position, the methodology advances to block 1220. At diamond 1210, if the present shift is not a downshift to first gear, the methodology advances to block 1220. At block 1220, the transmission controller 3010 solves the release clutch shift logic equation. The methodology advances to diamond 1222 and determines whether the release clutch should be turned ON or applied as previously described. If the release clutch should not be turned ON, the methodology advances to block 1224 and turns OFF or disengages the release clutch.

At diamond 1222, if the release clutch should be turned ON, the methodology advances to diamond 1226 and determines whether the release clutch is in the duty cycle mode as previously described. If the release clutch is not in the duty cycle mode, the methodology advances to block 1228 and turns ON or applies the release clutch. If the release clutch is in the duty cycle mode, the methodology advances to block 1230 and starts or continues the release clutch duty cycle. The methodology advances from blocks 1224, 1228 and 1230 to diamond 1232.

At diamond 1232, the transmission controller 3010 determines whether the present shift is a downshift to first gear as previously described. If the present shift is a downshift to first gear, the methodology advances to diamond 1234 and determines whether the solenoid switch valve 610 has moved to the low gear position as previously described. If the solenoid switch valve 610 has not moved to the low gear position, the methodology exits or returns through bubble 1236. If the solenoid switch valve 610 has moved to the low gear position, the methodology advances to block 1238. If the present shift is not a downshift to first gear at block 1232, the methodology advances to block 1238.

At block 1238, the transmission controller 3010 solves the shift logic equation for the apply clutch and intercepts/calculates the necessary data for "learning" at the end of the shift to be described subsequently. The methodology advances to diamond 1240 and determines whether to turn ON the apply clutch.

If the transmission controller 3010 determines not to turn ON the apply clutch, the methodology advances to block 1242 and turns OFF or disengages the apply clutch. If the transmission controller 3010 determines to turn ON the apply clutch, the methodology advances to diamond 1244 and determines whether the apply clutch is in the duty cycle mode as previously described. If the apply clutch is not in the duty cycle mode, the methodology advances to block 1246 and turns ON the apply clutch. If the apply clutch is in the duty cycle mode, the methodology advances to block 1248 and starts or continues the apply clutch duty cycle. The methodology advances from blocks 1242, 1246 and 1248 to block 1250.

At block 1250, the transmission controller 3010 solves a non-controlling clutch shift logic equation similar to the controlling shift logic equations needed for the shift to occur as previously described. A clutch other than one needed to make the shift or gear change is called the non-controlling clutch. This clutch is cycled ON and OFF by the appropriate solenoid-actuated valve to improve shift quality. The methodology advances from block 1250 to diamond 1252 and determines whether to turn ON or apply the non-controlling clutch based on calculated speeds, throttle angle and SSOUTP. If the transmission controller 3010 determines not to turn ON the non-controlling clutch, the methodology advances to block 1254 and turns OFF or disengages the non-controlling clutch. If the transmission controller 3010 determines to turn ON the non-controlling clutch, the methodology advances to block 1256 and turns ON the non-controlling clutch. The methodology returns or exits from blocks 1256 and 1256 through bubble 1258.

Referring to FIG. 16C, the garage shift methodology for the shift logic block 828 of FIG. 12 is shown. The methodology enters the shift logic block 828 through bubble 1300. The methodology advances to block 1302 and turns the non-controlling clutches either ON or OFF, i.e. engages or disengages the clutches not needed to perform the garage shifts. The methodology advances to diamond 1304 and determines whether the present shift is a garage shift to first gear by looking at SHCODE. If the present shift is a garage shift to first gear, the methodology advances to diamond 1306 and determines whether the solenoid switch valve 610 has moved to the first gear position (FIG. 5E) as previously described. If the solenoid switch valve 610 has not moved to the first gear position, the methodology advances to block 1308 and performs solenoid switch valve control logic as previously described. The methodology then exits or returns through bubble 1310.

At diamond 1304, if the shift is not a garage shift to first gear, the methodology advances to block 1312. At diamond 1306, if the solenoid switch valve 610 has moved to the first gear position, the methodology advances to block 1312. At block 1312, the transmission controller 3010 computes variables and states of flags to be used in a controlling shift logic equation similar to those in the upshift logic. The methodology advances to block 1314 and solves the controlling clutch shift logic equation. The methodology advances to diamond 1316 and determines whether to turn ON the controlling clutch as previously described. If the controlling clutch is not to be turned ON, the methodology advances to block 1318 and turns OFF the controlling clutch. If the controlling clutch is to be turned ON, the methodology advances to diamond 1320 and determines whether the controlling clutch is under duty cycle control as previously described. If the controlling clutch is not under duty cycle control, the methodology advances to block 1322 and turns ON the controlling clutch. If the controlling clutch is under duty cycle control, the methodology advances to block 1324 and starts or continues the apply clutch duty cycle. The methodology returns or exits from blocks 1318, 1322 and 1324 through bubble 1326.

TORQUE CONVERTER LOCK-UP METHOD

Partial lock-up (PLU) of the torque converter 110 is used in transition from unlock (UL) to full lock-up (FL). This occurs when the transmission 100 is operating in "top gear", i.e. the highest gear available according to the shift lever position 606 (PRNODDL). PLU is used for steady-state slight slippage operation. From either PLU or FL operation, a return to UL operation is effected upon any of the following conditions: throttle angle less than a predetermined angle, e.g., 2 degrees, turbine speed $N_t$ less than a predetermined speed, e.g., 1400 r.p.m. in fourth gear; start of a downshift; start of a speed change in an upshift or; application of the brakes of the vehicle.

In PLU, the methodology controls the initial application of the lock-up clutch assembly 186 and maintains a limited slip condition if FL is not used. The duty cycle (DC, %ON period) of the low/reverse clutch solenoid-actuated valve 636 is calculated according to the following:

$DC = DC(i-1) + \text{delta}DC$, where $\text{delta}DC = -0.8 \text{ delta}DC (i-1) + K(E_a - A)$.

The methodology attempts to control slip at a predetermined value, e.g. 80 r.p.m. In each 0.028 second cycle, the methodology finds the slip error, which is $N_e$ minus $N_t$ minus a predetermined value such as 80 r.p.m. This and three previous slip errors are used to calculate an anticipated slip error $E_a$. The difference between $E_a$ and an anticipated error modification term A is multiplied by a gain K to give a duty cycle increment term, i.e. either the "ON" or "OFF" time of the low/reverse clutch solenoid-actuated valve 636 to cycle the LU switch valve 614. In effect, this provides a proportional-/integral/differential control with some filtering included because of the poor quality of the $N_e$ data. The other duty cycle increment term consists of a constant, such as −0.8, times the previous duty cycle increment. This provides a lead/lag to improve system stability.

This basic operation is modified in a number of ways depending on conditions. The gain K is reduced by half in second gear in recognition of the higher plant gain due to higher line pressure. Also, the gain K is high at large errors in order to gain control more quickly, and low at small errors in order to improve stability. The "A" term provides the following features: for values of error above 30 r.p.m., it causes the logic to try to control the rate of error or slip reduction to about 300 r.p.m./sec., rather than controlling the error to zero as above, in order to provide a smooth pull-in; and for values of slip below 10 r.p.m., it backs the duty cycle out somewhat faster than it would otherwise, in order to reduce the exposure to FL torsionals at low $N_t$.

The initial duty cycle is 60% in third or fourth, and 55% in second because of the higher line pressure. This value is also the upper limit for the first five cycles. Otherwise, during tip-ins (operator backs off the accelerator pedal of the vehicle), the duty cycle would increment rapidly before the lock-up clutch 186 applies, causing a sharp pull-in.

For full lock-up, once PLU has brought the slip down to 80 r.p.m., the duty cycle simply increments by 1% per cycle in order to finish the pull-in smoothly. Once 90% is reached, the methodology goes to full ON. In order to prevent immediate FL during tip-ins before the lock-up clutch 186 is applied, 0.25 seconds of PLU is required.

Figure 17:
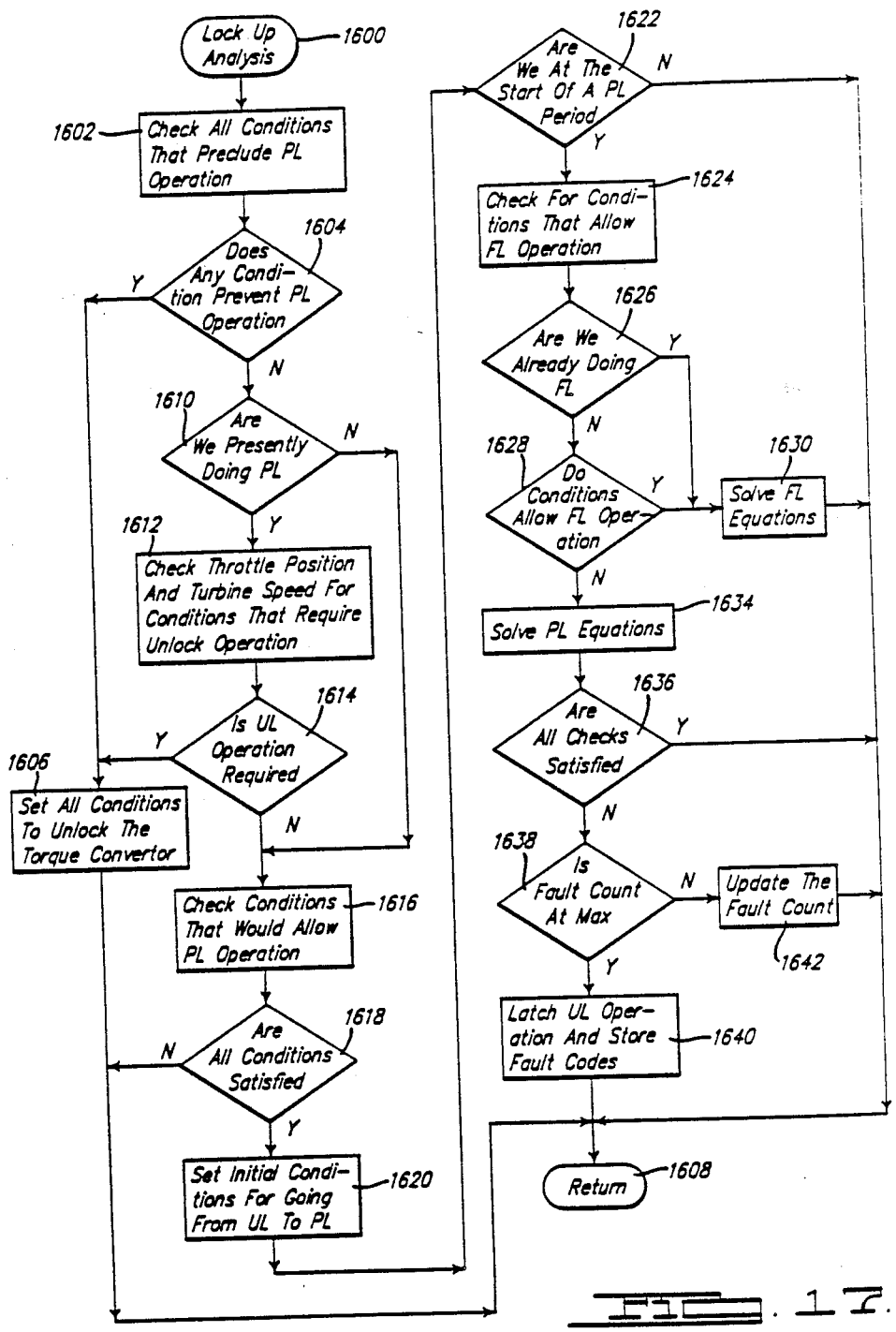
FIG. 17 is a flow chart of the lock-up methodology of FIG. 12 according to the present invention.
Figure 1B:
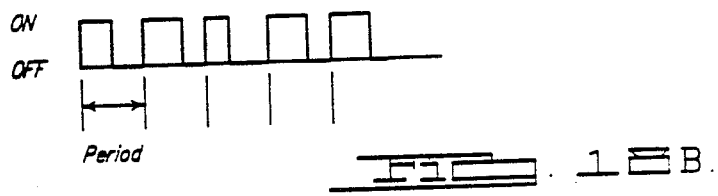
Figure 1C:
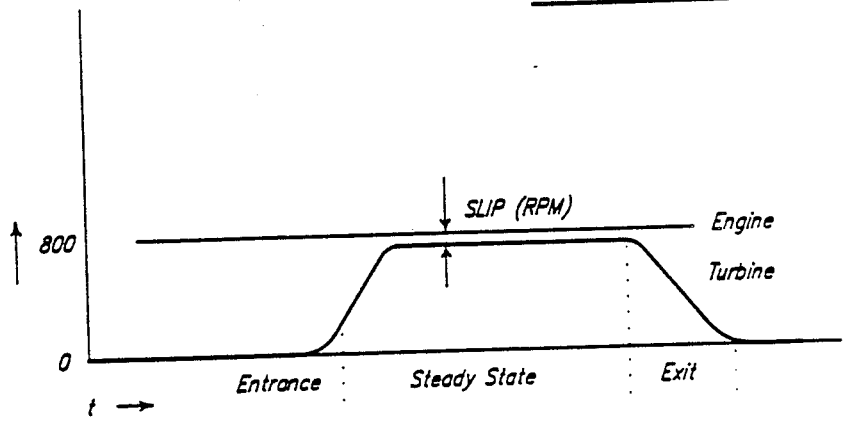
Figure 1D:
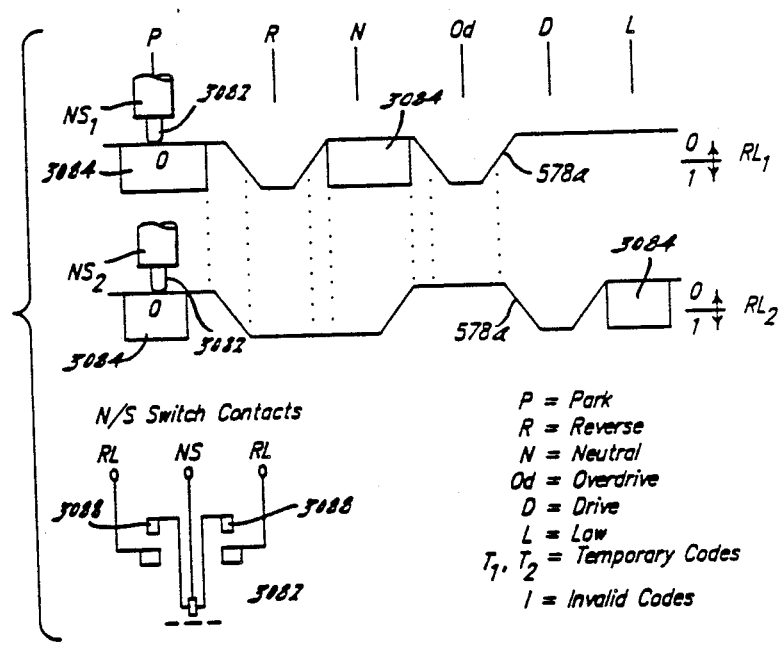

Referring to FIG. 17, the torque converter lock-up methodology for the partial lock-up block 834 of FIG. 12 is shown. At the start of the lock-up analysis in bubble 1600, the methodology advances to block 1602 and checks all conditions that may preclude partial lock-up operation as previously described (i.e. to unlock). The methodology advances to diamond 1604 and determines whether any of the conditions in block 1602 prevent partial lock-up operation. If any condition prevents partial lock-up operation, the methodology advances to block 1606 and sets all conditions (resets all bits in the transmission controller 3010 that were used during partial lock-up) to unlock the torque converter 110 of the transmission 100. The methodology then returns through bubble 1608.

At diamond 1604, if there are no conditions which prevent partial lock-up operation, the methodology advances to diamond 1610 and determines whether the transmission controller 3010 is presently partial locking the torque converter 110 by looking for the absence of a flag as previously described. If partial lock-up is presently happening, the methodology advances to block 1612 and checks the position of the throttle and turbine speed $N_t$ for conditions that require unlock operation as previously described. The methodology advances to diamond 1614 and determines whether unlock (UL) operation is required based on the check in block 1612. If unlock operation is required, the methodology advances to block 1606 previously described to set all conditions to unlock the torque converter 110.

If partial lock-up is not presently happening at diamond 1610 or unlock operation is not required at diamond 1614, the methodology advances to block 1616 and checks for conditions previously described that would allow partial lock-up operation (i.e. prevent unlock from occurring). The methodology advances to diamond 1618 and determines whether all the conditions in block 1616 were satisfied. If all the conditions were not satisfied, the methodology returns.

At diamond 1618, if all the conditions in block 1616 were satisfied, the methodology advances to block 1620 and sets the initial conditions (i.e. bits in the transmission controller 3010) for going from unlock to partial lock-up. The methodology advances to diamond 1622 and determines whether the methodology is at the start of a partial lock-up time period, i.e. the starting point of a time period for the duty cycle of valve 636. This is accomplished by looking at a counter in the transmission controller 3010 which cycles from zero to four (zero being the start of a time period). If the methodology is not at the start of a partial lock-up time period, the methodology returns.

If the methodology is at the start of a partial lock-up time period, the methodology advances to block 1624 and checks for conditions that allow full lock-up (FL) operation (i.e. prevent unlock from occurring). The methodology advances to diamond 1626 and determines whether full lock-up of the torque converter 110 is already occurring by looking for a flag as previously described. If full lock-up is not occurring, the methodology advances to diamond 1628 and determines whether all conditions checked in block 1624 allow full lock-up operation. If all conditions allow full lock-up operation or full lock-up is already occurring at diamond 1626, the methodology advances to block 1630 and solves the equations, previously described, for full lock-up. The methodology then returns.

At diamond 1628, if any of the conditions in block 1624 do not allow full lock-up operation, the methodology advances to block 1634 and solves the equations, previously described, for partial lock-up. The methodology then advances to diamond 1636 and determines whether all checks that preclude partial lock-up operation, as previously described, were satisfied. If all checks or conditions were not satisfied, the methodology advances to diamond 1638 and determines whether the fault count is at or exceeds a predetermined maximum value. If the fault count is at the predetermined maximum value, the methodology advances to block 1640 and performs unlock operation and stores the fault codes in memory of the transmission controller 3010. If the fault count is not at the predetermined maximum value, the methodology advances to block 1642 and updates the fault count. The methodology returns from blocks 1640 and 1642. Also, if all safety checks were satisfied at diamond 1626, the methodology returns.

ADAPTIVE IDLE METHOD

The present invention provides an "adaptive idle" method. Adaptive idle is a feature whereby the idle condition with the engine idling and the vehicle stopped in "OD", "D", or "L", the PRNODDL position is almost like a neutral, i.e. resulting in a turbine-free idle, in contrast to a normal turbine-stalled idle. This reduction in torque converter torque reduces engine torque, and thus improves idle fuel consumption.

A true neutral idle under these conditions is not possible, because this implies a complete release of one of the first gear friction elements (the underdrive clutch 302 in this case). Then, when the throttle is opened, the clutch apply cavity must fill, with the engine and turbine running away before the clutch can apply; a highly unsatisfactory launch will result.

In the near-neutral adaptive idle strategy, the underdrive clutch 302 is maintained at a very lightly applied condition, ready to pick up torque when the throttle is opened. This condition is inferred from a slight difference between engine $N_e$ and turbine $N_t$ speeds, and thus the strategy is to control the duty cycle of the underdrive clutch solenoid-actuated valve 630 for the underdrive clutch 302 to maintain this difference. The target turbine speed ($N_j$) is 50 r.p.m. below engine speed $N_e$ if the engine speed $N_e$ is at or below its target (AIS), then decreases as the engine speed $N_e$ increases above this. The duty cycle control is a proportional/integral/differential control based on turbine speed error (actual versus target).

If the throttle is opened or if the vehicle is rolling at more than a few miles per hour, adaptive idle exit is triggered. It may be that brake-off triggers the exit as well; this is intended as a feature to prevent a driver from leaving the car while it is in adaptive idle, by returning it to a normal creep idle condition if the driver removes their foot from the brake. The adaptive idle exit routine increases the duty cycle until turbine deceleration is detected, then goes to a proportional/integral turbine deceleration control, with desired turbine deceleration increasing with throttle opening. A direct throttle effect on duty cycle is also included in order to get earlier response and thus prevent runaway as previously described.

To allow for quick response on vehicle launch, the underdrive clutch 302 is not fully released, but is allowed to slip. The amount of slip is controlled by duty cycling the underdrive clutch 302 using a "steady state" adaptive idle equation. Upon vehicle launch (adaptive idle exit), the rate at which the underdrive clutch 302 is applied is controlled by duty cycling the underdrive clutch 302 using an "exit" adaptive idle equation to allow for smooth clutch application. Since adaptive idle unloads the engine when the vehicle is brought to a stop, the engine can be idled at a lower speed which will cause an increase in fuel economy.

Figure 18A:
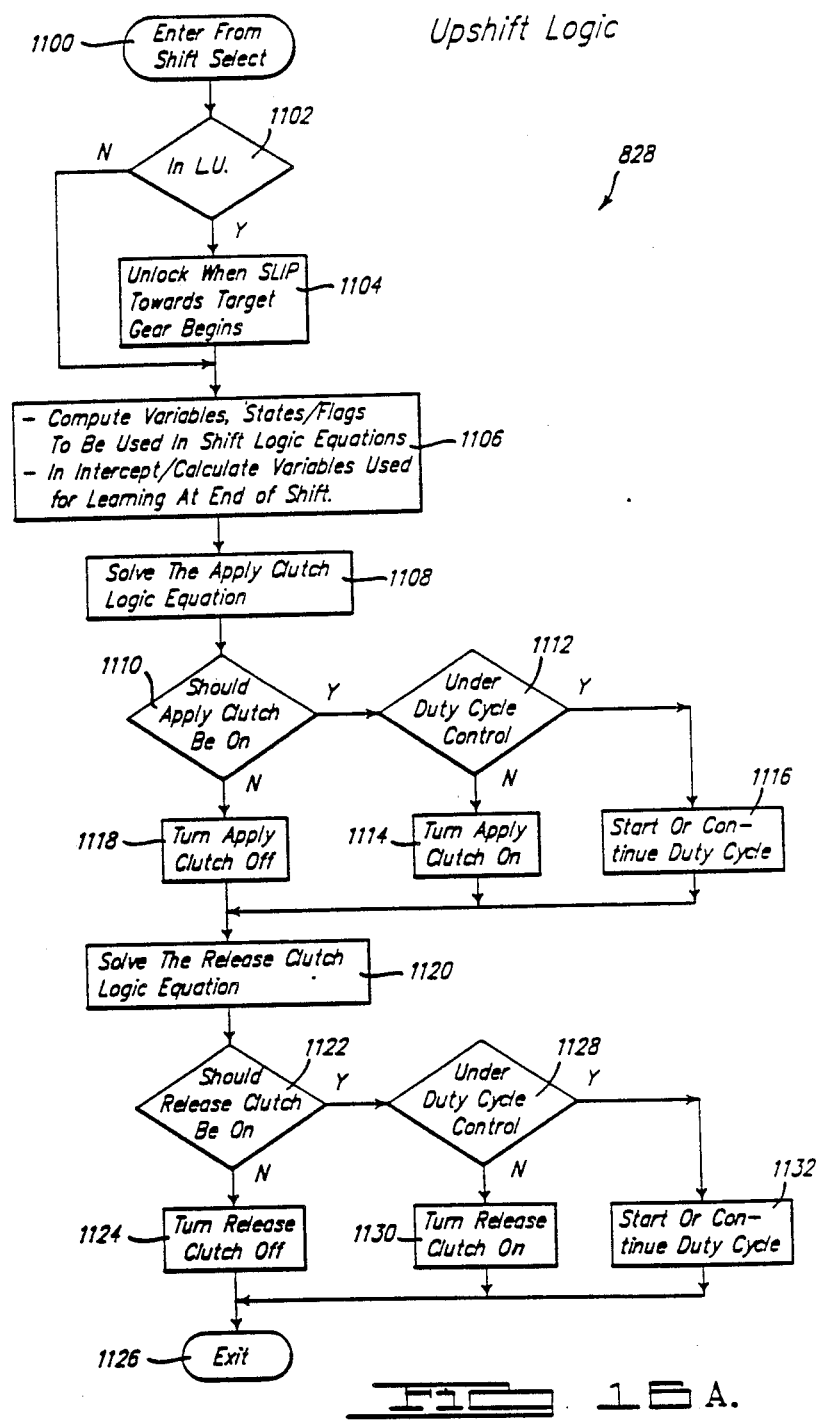

Referring to FIG. 18A, the adaptive idle methodology 1700 is shown. At the start of the adaptive idle in bubble 1702, the methodology advances to block 1704 to solve an adaptive idle conditions equation. The adaptive idle condition equations may be defined as follows:

SET: (Throttle angle less than 2°) and ($N_o$ less than 250 r.p.m.) and (BRAKE-ON)

CLEAR: (Throttle angle greater than 4°) or ($N_o$ greater than or equal to 250 r.p.m.) or BRAKE-OFF)

The above conditions have to be met to get into or out of adaptive idle. The result of the above equations is for setting or clearing a flag which is stored. The methodology advances to diamond 1706 and determines whether adaptive idle is in a "steady state" mode (FIG. 18C) by looking for a flag or performing calculations of speed for example. If adaptive idle is not in the steady state mode, the methodology advances to diamond 1708.

At diamond 1708, the transmission controller 3010 determines whether adaptive idle is in a adaptive idle "exit" mode (FIG. 18C) by looking for a flag or performing calculations of speed for example. If not, the methodology advances to diamond 1710 and determines whether the adaptive idle conditions previously described are true by looking for a flag of block 1704. If the adaptive idle conditions are not true, the methodology advances to block 1712 and turns ON or applies the underdrive clutch 302. The methodology then returns through bubble 1714.

Figure 18C:
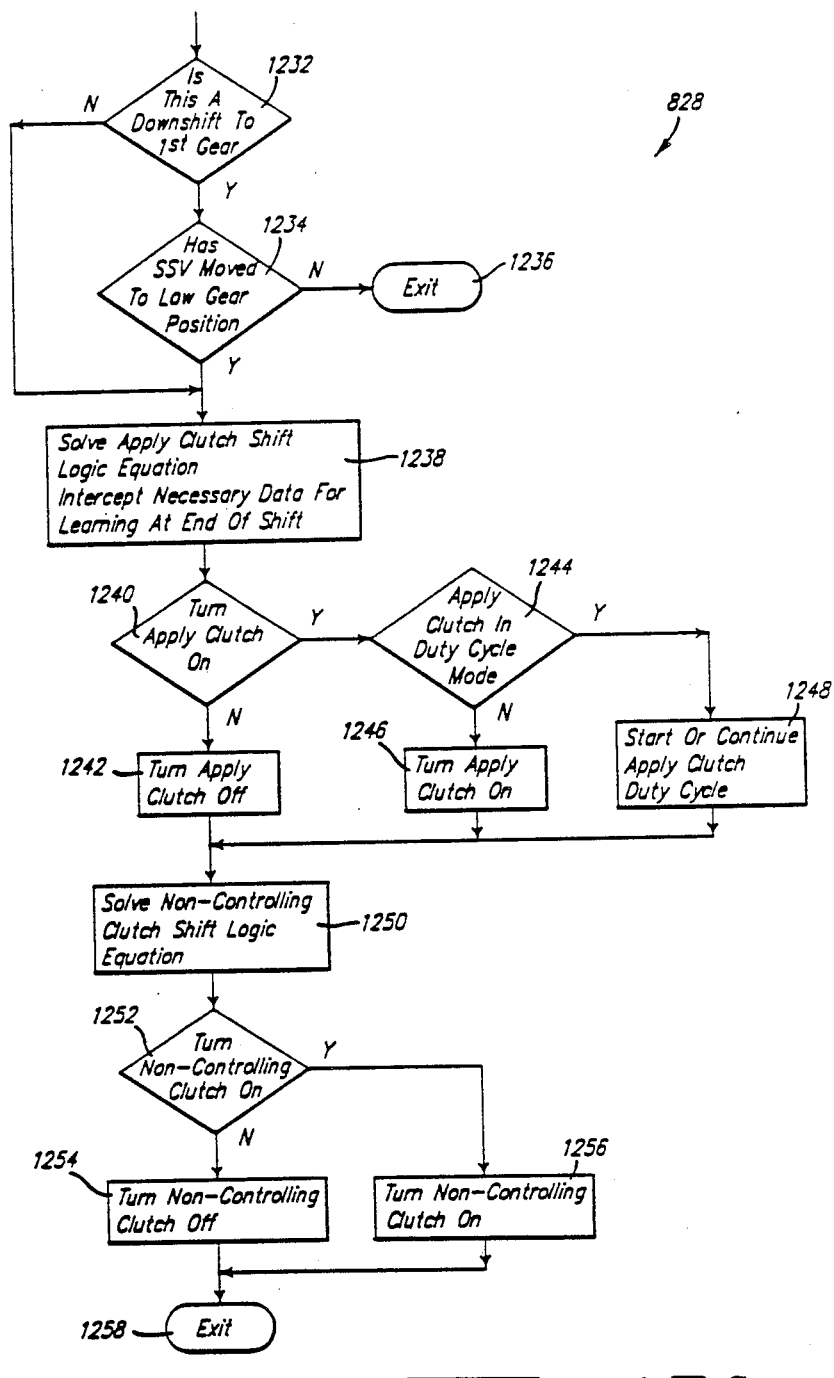
Figure 15D:
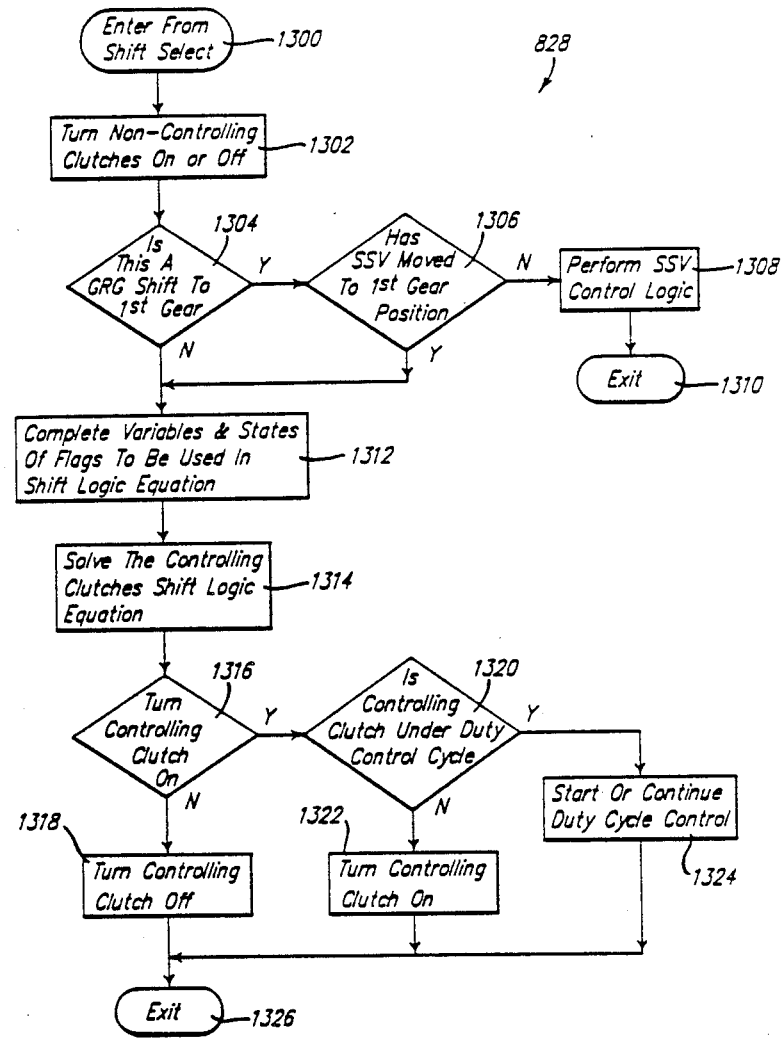

At diamond 1710, if the adaptive idle conditions are true, the methodology advances to block 1716 to solve the adaptive idle entrance equation, representing part of the curve illustrated in FIG. 18C. The adaptive idle entrance equation may be defined as follows:

$T(i) = 0$ until [$N_t(i)$ is greater than first gear $N_t$ plus 50 r.p.m.] and $N_t(i)$ is greater than 100 r.p.m.], then $T(i) = 7700$ for one cycle In the above equations, T(i) is the calculated ON time of the underdrive clutch solenoid-actuated valve 630 at the start of each cycle, and $N_t(i)$ is the current turbine speed. The underdrive clutch 302 is kept fully OFF (i.e. T(i)=0) until adaptive idle conditions are met. The methodology advances to diamond 1718 and determines whether the entrance into adaptive idle is complete by looking for a flag or performing calculations of speed for example. If the entrance is not complete, the methodology advances to block 1720 and turns OFF or disengages the underdrive clutch 302. If the entrance is complete, the methodology advances to block 1722 and initializes predetermined variables such as the percent ON time (i.e. T(i)=7700 for one cycle) for adaptive idle steady state mode. The methodology advances to block 1724 and starts the duty cycle of the solenoid-actuated valve 630 for the underdrive clutch 302. The methodology then returns through bubble 1714.

At diamond 1706, if the transmission 100 is in the adaptive idle steady state mode, the methodology advances to diamond 1726 and determines whether the adaptive idle conditions previously described in block 1704 are true by looking for a flag. If the adaptive idle conditions are true, the methodology advances to block 1728 and solves the adaptive idle steady state equation each predetermined time period of the duty cycle (See FIG. 18B). The steady state equation may be defined as follows:

$T(i) = T(i-1) + 36$
$[N_t(i) - N_t(i-1)] - 24[N_t(i-1) - N_t(i-2)] + 4[N_t(i) - N_d]$ where:

T(i−1)=previous cycle ON time for the solenoid of the solenoid-actuated valve; and $N_d$=desired turbine speed.

If the adaptive idle conditions are not true, the methodology advances to block 1730 and initializes predetermined variables previously described for the adaptive idle exit mode, representing part of the curve illustrated in FIG. 18C. The exit equation may be initialized as follows:

$T(i) = T_{AI} + 8400$ until ($a_t$ is less than −500), then $T(i) = 0.8T_{AI} + 2240$ for one cycle, where:

$T_{AI}$=last T(i) in adaptive idle before adaptive idle exit

The methodology advances from block 1728 and 1730 to block 1732 and continues the duty cycle for the underdrive clutch 302. The methodology then returns through bubble 1714.

At diamond 1708, if the transmission 100 is in the adaptive idle exit mode, the methodology advances to diamond 1734 and determines whether the adaptive idle conditions in block 1704 previously described are true by looking for a flag. If the adaptive idle conditions are true, the methodology advances to block 1716 previously described to solve the adaptive idle entrance equation. If the adaptive idle conditions are not true, the methodology advances to diamond 1736 and determines whether a predetermined adaptive idle exit time has been exceeded by looking at a timer. If the adaptive idle exit time has been exceeded, the methodology advances to block 1738 and ends adaptive idle operation. The methodology advances to block 1740 and turns ON or applies the underdrive clutch 302. The methodology then returns through bubble 1714.

At diamond 1736, if the adaptive idle exit time has not been exceeded, the methodology advances to diamond 1742 and determines whether the transmission 100 is presently in first gear by looking at speed ratios of $N_t$ to $N_o$. If the transmission 100 is presently in first gear, the methodology advances to block 1738 previously described to end adaptive idle operation. If the transmission 100 is not presently in first gear, the methodology advances to block 1744 and solves the adaptive idle exit equation each time period of the duty cycle. The exit equation may be defined as follows:

$T(i) = T(i-1) + 52[N_t(i) - N_t(i-1)] - 34[N_t(i-1) - N_t(i-2)] + 700 + 14Thr(i) + 258[Thr(i) - Thr(i-1)]$, where:

Thr(i)=current throttle angle

The methodology advances to block 1746 and continues the duty cycle of the solenoid-actuated valve 630 for the underdrive clutch 302. The methodology then returns.

PRNODDL METHOD

The PRNODDL method is used to read sensors sensing the position of the manual lever 578 to determine the driver-selected operating mode or shift lever position 606, i.e. PRNODDL. Referring to FIG. 4B, the manual shaft 591 is connected to the manual lever 578. Neutral start grounding contacts or contact switch sensors ($NS_1$ and $NS_2$) threadably engage the transmission case 102 and are in radial alignment with a pair of circumferentially spaced outwardly extending projections or metal areas 3084 (FIG. 19) when the shift lever position is park P. The metal areas 3084 extend through an insulator or cap member 578a made of plastic and disposed partially and circumferentially about the manual lever 578. The contact switch sensors $NS_1$ and $NS_2$ can only be grounded when they are in radial alignment with the metal areas 3084 on the manual lever 578. A further detailed description of the structure is found under the "ADAPTIVE CONTROL CIRCUITS" heading.

The gear selector or shift lever position (PRNODDL) is measured by the contact switch sensors $NS_1$ and $NS_2$. Reverse light contacts ($RL_1$ and $RL_2$ in FIG. 19) are connected to the backup lights of the vehicle in a known manner. $NS_1$ can only be grounded in park P and neutral N. The contact switch sensors $NS_1$ and $NS_2$ cannot be grounded with RL contacts closed. As a result, the contact switch sensors $NS_1$ and $NS_2$ make electrical contact with the RL contacts when the manual lever 578 is in the reverse position. Hence, continuity to the backup lights can only exist in reverse R.

Referring to FIG. 19, the PRNODDL method is shown schematically. The manual lever 578 and cap member 578a act as a cam and the contact switch sensors $NS_1$ and $NS_2$ act as the follower. $NS_1$ and $NS_2$ provide a binary zero input when the center terminal or spring loaded contact pin 3082 is grounded by contacting the metal areas 3084 on the manual lever in 578. $RL_1$ and $RL_2$ provide a zero whenever the manual lever 578 pushes spring loaded contact pin 3082 on the contact switch sensors $NS_1$ and $NS_2$ upward disconnecting two internal contacts 3088 of the contact switch sensors $NS_1$ and $NS_2$ with the RL contacts. For example, in P, $NS_1$, $NS_2$, and $RL_1$, $RL_2$ provide a zero input. The remaining inputs are shown in the table below:

|      | P | R     |   | N |   | OD    |    | D |    | L |
|------|---|-------|---|---|---|-------|----|---|----|---|
| $NS_1$ | 0 | 0 1 1 | 1 | 1 | 0 | 0 1   | 1  | 1 | 1  | 1 |
| $RL_1$ | 0 | 0 0 0 | 1 | 0 | 0 | 0 0   | 1  | 0 | 0  | 0 |
| $NS_2$ | 0 | 1 1 1 | 1 | 1 | 1 | 1 1   | 1  | 1 | 1  | 0 |
| $RL_2$ | 0 | 0 0 1 | 1 | 1 | 1 | 0 0   | 0  | 0 | 1  | 0 |
| CODE | P | $T_1T_2D$ | R | D | N | $T_1T_2$ | OD | $T_2$ | D | $T_2$ | L |

The PRNODDL codes are verified by pressure switch data to be described herein. If the engine of the vehicle is running ($N_e$ is less than 500 r.p.m.), the transmission controller 3010 checks its permanent memory to see if the PRNODDL code determined above corresponds with pressure switch data from the pressure switches 646, 648 and 650 (FIGS. 5A-L) at the last "Engine running" check ("PRNODDL OK"). If the data corresponds, the transmission controller 3010 displays a valid PRNODDL code. If data does not correspond, the transmission controller 3010 displays "??" and reports "PRNODDL Failures - Engine Off" to permanent memory.

If the engine is running at or above a predetermined speed ($N_e$ equal or greater than 500 r.p.m.), the transmission controller 3010 reads the PRNODDL code as above-described. If PRNODDL code is valid, the transmission controller 3010 verifies with the pressure switch data in the table below:

| PRNODDL CODE/PRESSURE SWITCH | LR | 2-4 | OD |
|---|---|---|---|
| PN | ON | OFF | OFF |
| R | OFF | OFF | OFF |
| OD, D, L | ON | ON | ON |

SHIFT LEVER POSITION METHODOLOGY

The transmission control logic relies on the Shift Lever Position (SLP) methodology to identify the mode of transmission operation selected by the driver to provide hysteresis between the PRNODDL positions, and to permit limited operation of the transmission controller 3010 without functioning PRNODDL contact switch sensors ($NS_1$, $NS_2$, $RL_1$, $RL_2$) by utilizing pressure switch data from the pressure switches 646, 648 and 650 (FIGS. 5A-L) to identify the three hydraulic modes of operation (i.e. reverse R, neutral N and drive D). In the SLP methodology, P, R, N, and OD (overdrive) PRNODDL codes are accepted as being valid without regard to pressure switch data since the corresponding hydraulic porting (part and neutral are identical) condition must occur first. Testing for SLP position (checking pressure switch input) is only done with temporary or invalid codes present since this is the area where hydraulic porting changes occur.

Figure 20A:
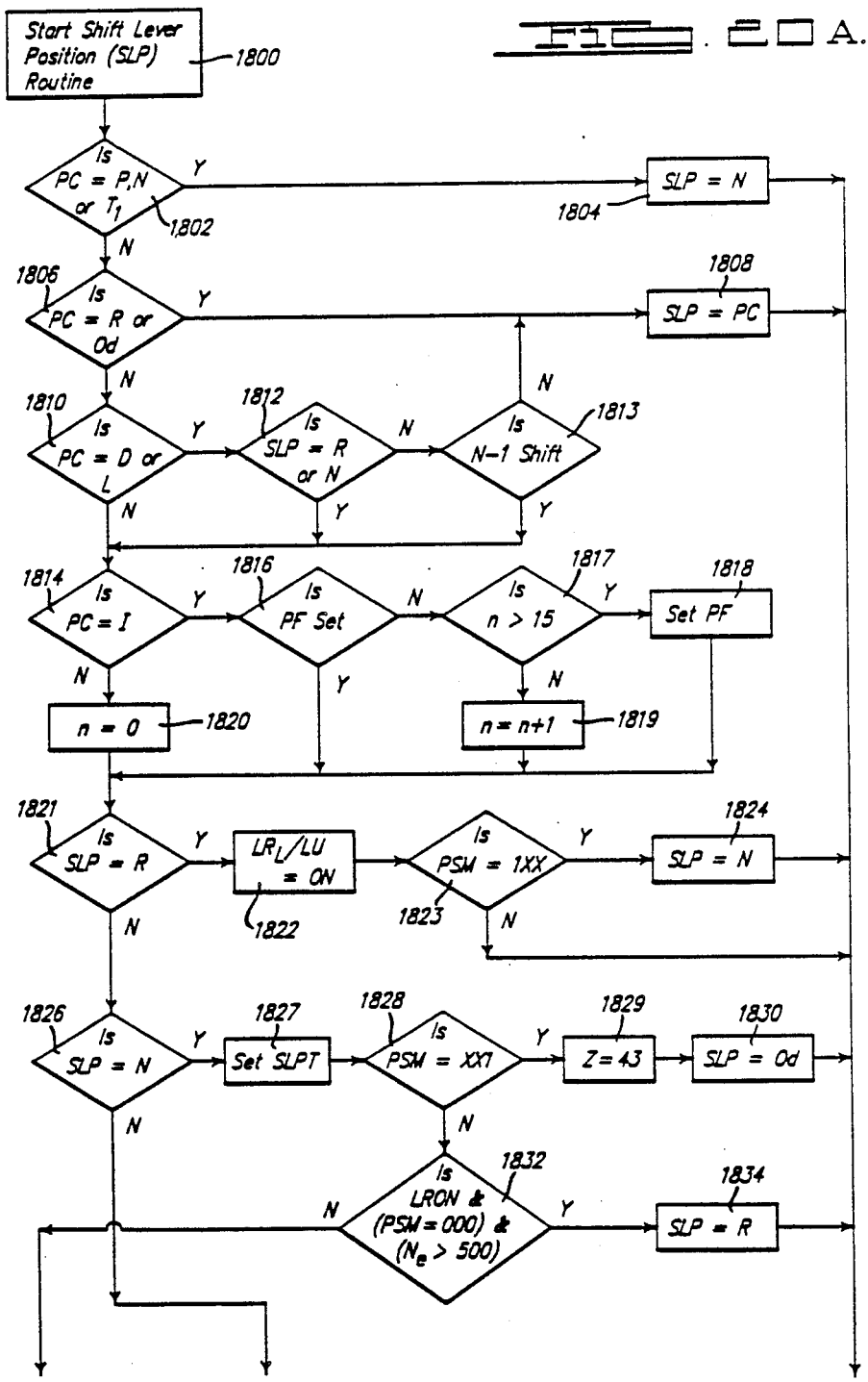
FIGS. 20A and 20B are flow charts of the shift lever position methodology according to the present invention.
Figure 20B:
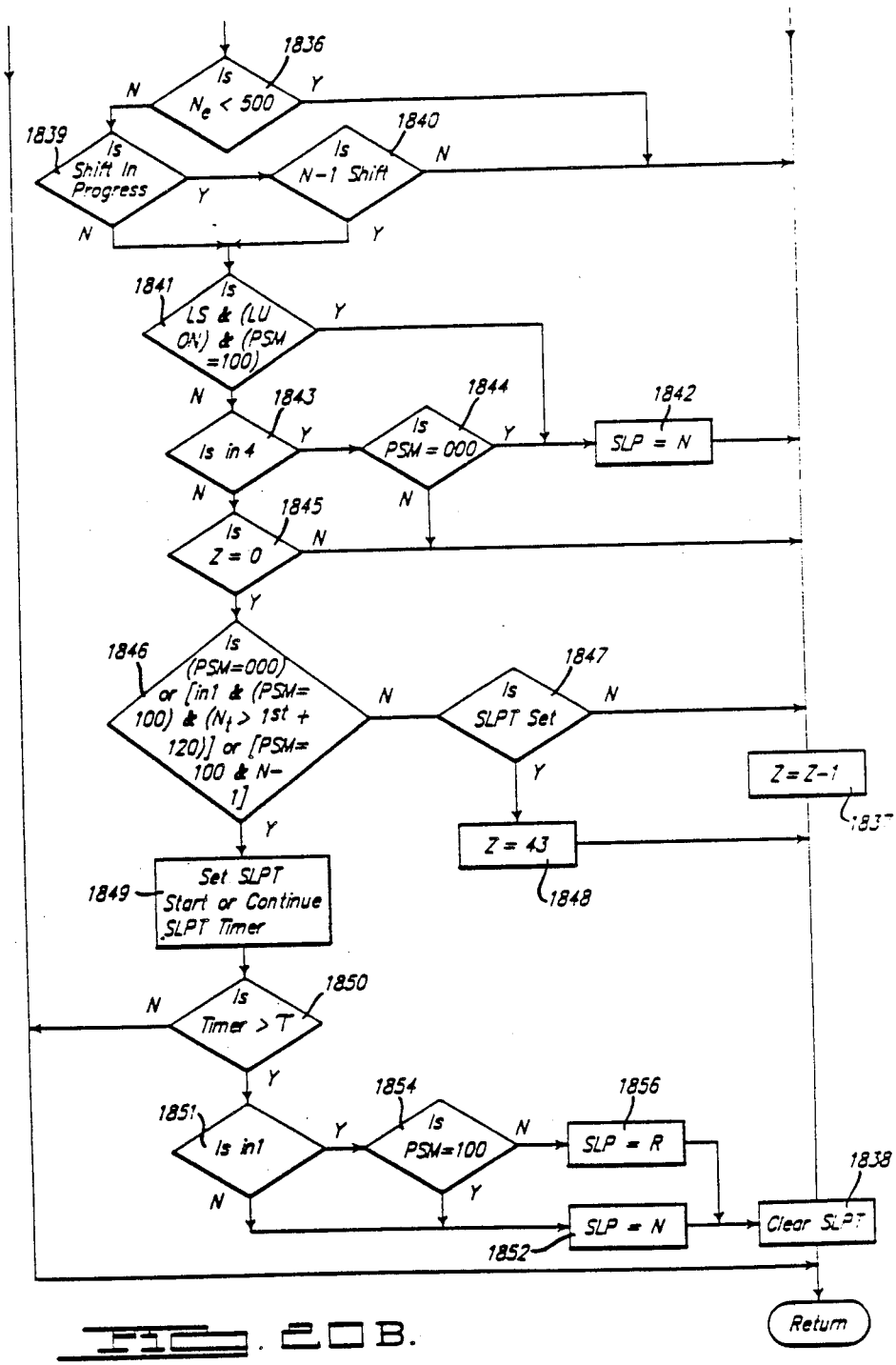

Referring to FIGS. 20A and 20B, the shift lever position (SLP) methodology is shown. At the beginning in block 1800, the methodology advances to diamond 1802 and determines whether the PRNODDL code (PC) from the sensors ($NS_1$, $NS_2$, $RL_1$, $RL_2$) is equal to a code for park P, neutral N or a temporary code ($T_1$) stored in memory in the transmission controller 3010. If PC is equal to park, reverse or a temporary code, the methodology advances to block 1804 and sets the shift lever position (SLP) 606 (FIGS. 5A-L) equal to neutral. If PC is not equal to park, neutral or a temporary code, the methodology advances to diamond 1806 and determines whether PC is equal to reverse R or overdrive OD. If PC equals reverse or overdrive, the methodology advances to block 1808 and sets the SLP 606 equal to PC. If PC is not equal to reverse or overdrive, the methodology advances to diamond 1810 and determines whether PC is in drive D or low L. If PC is drive or low, the methodology advances to diamond 1812 and determines whether SLP 606 is reverse or neutral. If SLP 606 is not reverse or neutral, the methodology advances to diamond 1813 and determines whether a neutral to first gear (N−1) shift is in progress by looking for a flag. If a neutral to first gear shift is not in progress, the methodology advances to block 1808 previously described and sets SLP 606 equal to PC.

If SLP 606 is reverse or neutral at diamond 1812, or PC does not equal drive or low at diamond 1810, or a neutral to first gear shift is in progress, the methodology advances to diamond 1814 and determines whether PC equals an invalid code (I) stored in memory. If PC is an invalid code, the methodology advances to diamond 1816 and determines whether a PRNODDL FAIL (PF) flag has been set. If PF has not been set, the methodology advances to block 1817 and determines whether a count n on a counter is greater than a predetermined value such as 15. If the count n is greater than the predetermined value, the methodology advances to block 1818 and sets PF. If the count n is not greater than the predetermined value, the methodology advances to block 1819 and increments the count n. The methodology then advances to diamond 1821. If PC is not an invalid code at diamond 1814, the methodology advances to block 1820 and sets the count n on the counter equal to a predetermined value such as zero. The methodology then advances to diamond 1821. If PF was previously set a diamond 1816 or once the PF flag has been set at diamond 1818, the methodology advances to diamond 1821 and determines whether SLP 606 is reverse. If SLP is reverse, the methodology advances to block 1822 and turns ON the low/reverse clutch solenoid-actuated valve 636. The methodology then advances to diamond 1823 and determines whether the low/reverse pressure switch 650 is equal to one or pressurized. If the low/reverse pressure switch 650 is equal to one, the methodology advances to block 1824 and sets SLP 606 equal to neutral. This occurs because the low/reverse pressure switch 650 is pressurized or producing a signal equal of one (See FIG. 5A) only when the transmission 100 is not in reverse gear and the low/reverse clutch 310 is being applied. If the low/reverse pressure switch 650 is not equal to one, the methodology advances to block 1837 to be described.

If SLP 606 is not reverse at diamond 1821, the methodology advances to diamond 1826 and determines whether SLP 606 is equal to neutral. If SLP is neutral, the methodology advances to block 1827 to set at SLP test flag. The methodology then advances to diamond 1828 and determines whether the overdrive pressure switch 646 is equal to one or pressurized. If the overdrive pressure switch 646 equals one, the methodology advances to block 1824 and sets a count Z on a counter equal to a predetermined value such as 43. The methodology then advances to block 1830 and set SLP 606 equal to overdrive OD. This occurs because the overdrive clutch 304 is being applied when the overdrive pressure switch 646 is pressurized or producing a signal equal to one (See FIG. 5H). If the overdrive pressure switch 646 does not equal one, the methodology advances to diamond 1832 and determines whether the low/reverse solenoid-actuated valve 656 is ON, the pressure switches 646, 648 and 650 are not pressurized or are equal to zero (See FIG. 5C) and $N_e$ is greater than a predetermined value, i.e. 500 r.p.m. If that criteria is true, the methodology advances to block 1834 and sets SLP 606 equal to reverse. If that criteria is not true, the methodology returns.

At diamond 1826, if SLP 606 is not neutral, the methodology advances to diamond 1836 and determines whether engine speed $N_e$ is less than a predetermined speed, i.e. 500 r.p.m. If engine speed $N_e$ is less than the predetermined speed, the methodology advances to block 1837 and decrements the count Z on the counter by a predetermined value. The methodology then advances to block 1838 an clears the SLP test flag. The methodology then returns. If engine speed $N_e$ is not less than the predetermined speed, the methodology advances to diamond 1839 and determines whether a shift is in progress or occurring by looking for a flag. If the shift is in progress, the methodology advances to diamond 1840 and determines whether a neutral to first gear shift is in progress as previously described. If a neutral to first gear shift is not in progress, the methodology advances to block 1837 previously described. If the shift is not in progress, or a neutral to first gear shift is in progress, the methodology advances to diamond 1841 and determines whether the LU switch valve 614 is being applied as a result of the low/reverse element solenoid-actuated valve 636 being energized or on and low/reverse pressure switch 650 equals one and both the two/four 648 and overdrive 646 pressure switches equal zero. If that criteria is true, the methodology advances to block 1842 and sets SLP 606 equal to neutral. If that criteria is not true, the methodology advances to diamond 1843 and determines whether the transmission 100 is presently in fourth gear by calculating speeds. If the transmission 100 is presently is fourth gear, the methodology advances to diamond 1844 and determines whether the pressure switches 646, 648 and 650 equal zero. If the pressure switches equal zero, the methodology advances to block 1842 previously described. If all the pressure switches 646, 648 and 650 do not equal zero, the methodology advances to block 1837 previously described.

If the transmission 100 is not presently in fourth gear, the methodology advances to diamond 1845 and determines whether count Z equals a predetermined value such as zero. If Z does not equal zero, the methodology advances to block 1837 previously described. If Z equals zero, the methodology advances to diamond 1846 and determines whether the transmission 100 is presently in first gear by speed calculations, the low/reverse pressure switch 650 equals one and turbine speed $N_t$ is greater than a predetermined r.p.m., or the pressure switches 646, 648 and 650 equal zero, or the low/reverse pressure switch 650 equals one and a neutral to first gear shift is in progress. If any of that criteria is not true, the methodology advances to diamond 1847 and determines whether the SLP test flag has been set. If the SLPT flag has not been set, the methodology advances to block 1837 previously described. If the SLP test flag has been set, the methodology advances to block 1848 and sets Z equal to a predetermined value such as 43. The methodology then advances to block 1838 previously described. If any of the criteria in diamond 1846 is true, the methodology advances to block 1849 and sets the SLP test flag and starts or continues a SLP timer (SLPT). The methodology then advances to diamond 1850 and determines whether the time on the SLPT timer is greater than a predetermined time period. If the time on the SLPT timer is not greater than the predetermined time period, the methodology returns. If the time on the SLPT timer is greater than the predetermined time period, the methodology advances to diamond 1851 and determines whether the transmission 100 is operating in first gear by performing speed calculations. If the transmission 100 is not operating in first gear, the methodology advances to block 1852 and sets SLP 606 equal to neutral. The methodology then advances to block 1838 previously described. If the transmission 100 is operating in first gear, the methodology advances to diamond 1854 and determines whether the low/reverse pressure switch 650 equals one. If the low/reverse pressure switch 650 does not equal one, the methodology advances to block 1856 and sets SLP 606 equal to reverse (See FIG. 5C). The methodology then advances to block 1838 previously described. If the low/reverse pressure switch 650 does equal one, the methodology advances to block 1852 and sets SLP 606 equal to neutral (See FIG. 5A). The methodology then advances to block 1838 previously described.

ACCELERATION CALCULATION

The purpose of the acceleration calculation is to control transmission operation during a shift or gear change. The acceleration calculation determines the actual acceleration of the turbine 128. This is a major factor in determining overall response of the control system.

Referring to FIG. 12, the calculated speed bubble 806 is illustrated. At most speeds, the speed calculation is made by counting the number of teeth 319, 544 during a predetermined cycle and dividing that tooth count by the actual time elapsed between the first and last tooth. Time is measured by counting clock cycles in the transmission controller 3010. The tooth center lines are determined by reading a magnetic sensor 320, 546 for the sixty-tooth input clutch retainer hub 312 for turbine speed $N_t$, and for the twenty-four-tooth second planet carrier 524 for output speed $N_o$, respectively. At lower speeds, when no tooth passes during the 7 millisecond (ms.) cycle, the update rate must be extended to more than one predetermined cycle, i.e. 14 ms., 21 ms., etc., to provide data down to the minimum speed needed.

Referring to FIG. 12, the calculated acceleration bubble 860 is illustrated. Acceleration is calculated by dividing the speed change between the last two measurements by the average of the two elapsed times.

$$N_t = n(i)/T(i)$$

$$alpha_t = \frac{N_t - n(i-1)/T(i-1)}{0.5[T(i) + T(i-1)]}$$

$$N_o = \frac{60n(i)}{24T(i)}$$

$N_t$ = calculated turbine r.p.m.
$N_o$ = calculated output r.p.m.
$alpha_t$ $a_t$ = calculated turbine acceleration, r.p.m./sec.
$n(i)$ = no. of teeth in latest count
$n(i-1)$ = no. of teeth in previous count
$T(i)$ = time required for $n(i)$ teeth, seconds
$T(i-1)$ = time required for $n(i-1)$ teeth, etc.

The turbine speed $N_t$ and acceleration $alpha_t$, the calculation range is from 40 to 6500 r.p.m. Acceleration must be calculated as soon as practical after reading turbine speed data because any time use slows the overall system response. For output speed $N_o$, the calculation range is from 40 to 6000 r.p.m. Due to problems with low speed data integrity, the maximum change for any update must be limited to plus/minus 30 r.p.m. when the previous output speed is less than 300 r.p.m.

At low speeds (below about 1500 r.p.m.), an alternate method of calculating turbine acceleration is used. At higher speeds, however, the run-out inherent in the turbine speed wheel would generate a large first-order alternating acceleration term if this approach were used, thus interfering with good control.

To overcome this, a first-order filter is employed, which calculates acceleration over an entire revolution. Speed is calculated based on each quarter-revolution, the fourth previous speed (one revolution before) is subtracted, and the difference is divided by the time for the one revolution. Because this acceleration calculation is more delayed, particularly at low speed, anticipation is necessary in order to achieve acceptable frequency response.

The following table defines the speed and acceleration calculations as functions of $\Omega$, the number of quarter revolutions times. $\Omega = 0$ represents low speed operation. As the turbine accelerates, when 11 or more teeth (out of 60) pass in 7 ms., the switch to quarter revolution is initiated and $\Omega$ begins to increment. After the fifth quarter revolution, one revolution acceleration can be calculated; and after two more quarter revolutions anticipation is effected. Low speed operation is resumed when more than 11.3 ms. is required for a quarter revolution.

| $\Omega$ | $N_t$ | $\alpha(i)$ | $\alpha_t$ |
|---|---|---|---|
| 0 | $n(i)/T(i)$ | $\dfrac{N_t - n(i-1)/T(i-1)}{.5*[T(i) + T(i-1)]}$ | $\alpha(i)$ |
| 1 | $15/T(i)$ | " | " |
| 2-4 | " | $\dfrac{N_t - 15/T(i-1)}{.5*[T(i) + T(i-1)]}$ | " |
| 5-6 | " | $\dfrac{N_t - 15/T(i-4)}{2*[T(i) + T(i-4)]}$ | " |
| 7 | " | " | $\alpha_a$ | where:
$n(i)$ = no. of teeth in latest count (assuming 60-tooth wheel)
$n(i-1)$ = no. of teeth in previous count
$T(i)$ = time required for $n(i)$ teeth, seconds
$T(i-1)$ = time required for $n(i-1)$ teeth, etc.
$N_t$ = calculated turbine r.p.m.
$\alpha^{(i)}$ = calculated turbine acceleration, r.p.m./sec.
$at$ = turbine acceleration term for use in shift logic
$aa$ = anticipated turbine acceleration, where
$aa = (\frac{1}{4})*[(36 - 3B)*\alpha^{(i)} - (52-5B)*\alpha^{(i-1)} + (20-2B)*\alpha^{(i-2)}]\pi$
$\alpha^{(i-1)}$ = calculated accel. for previous quarter revolution, etc.
$B = INT [N_t/512]$; limit $B \geq 9$

PRESSURE SWITCH TEST AND TRANSMISSION TEMPERATURE DETERMINATION METHOD

The purpose of the pressure switch test method is to verify that "OFF" element or clutch pressure switches will read high if a failure should occur. The purpose of the transmission temperature determination method is to determine when the transmission 100 has warmed up sufficiently to impose normal response requirements when the transmission controller 3010 sets the initial transmission temperature range (r) to either "warm" or "cold".

Figure 21A:
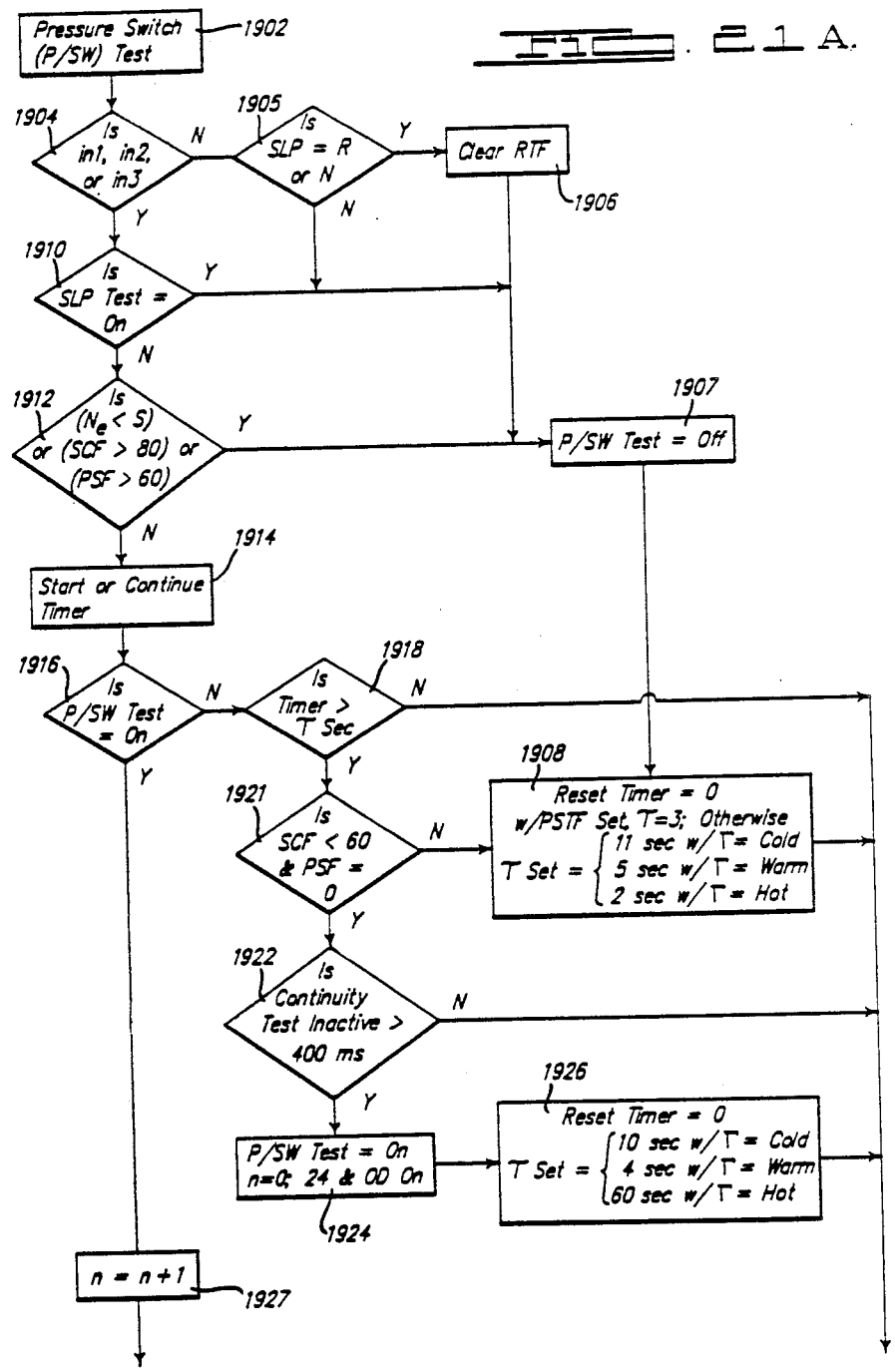
FIGS. 21A-21D illustrate the transmission temperature determination methodology according to the present invention.
Figure 21B:
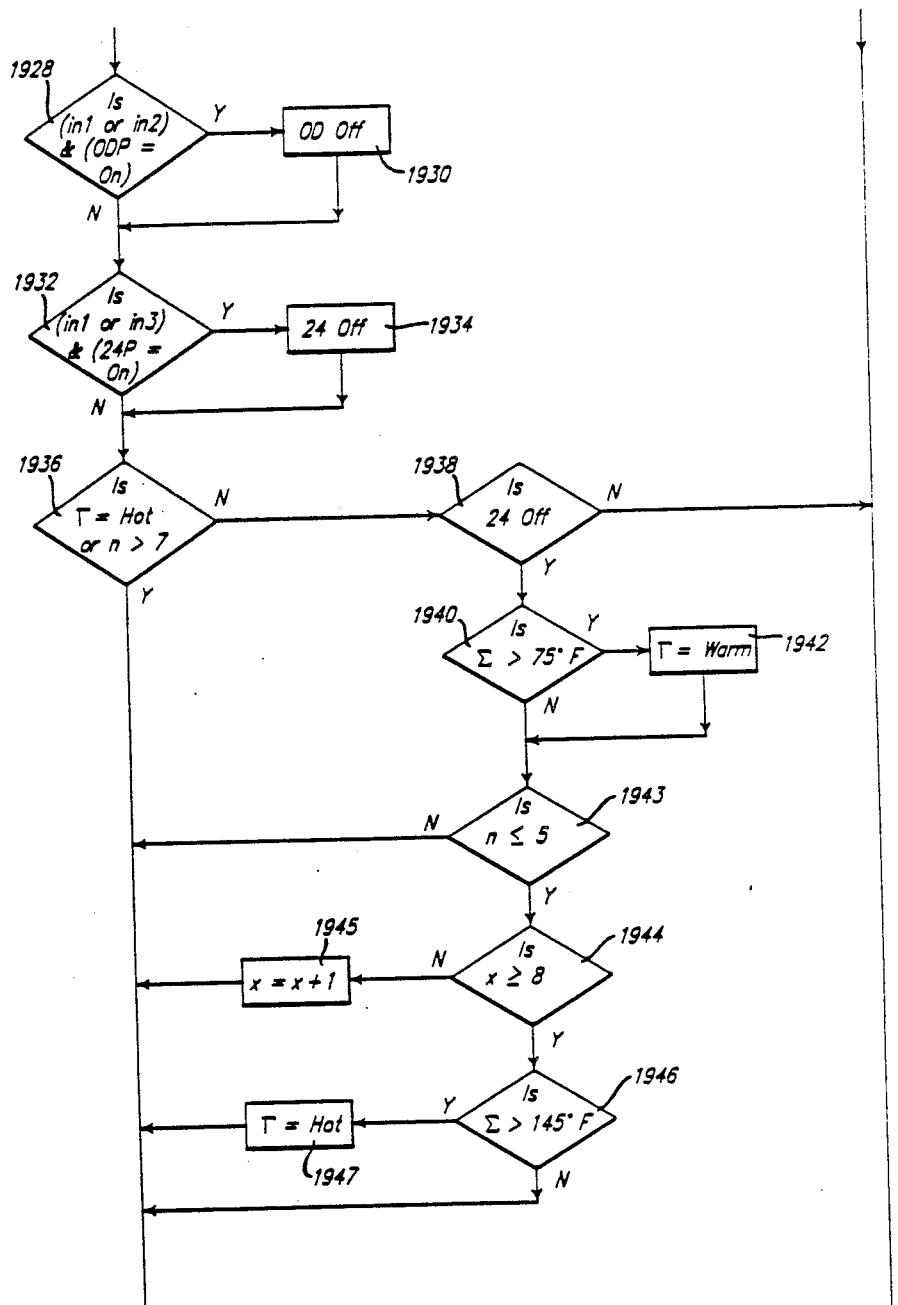
Figure 21C:
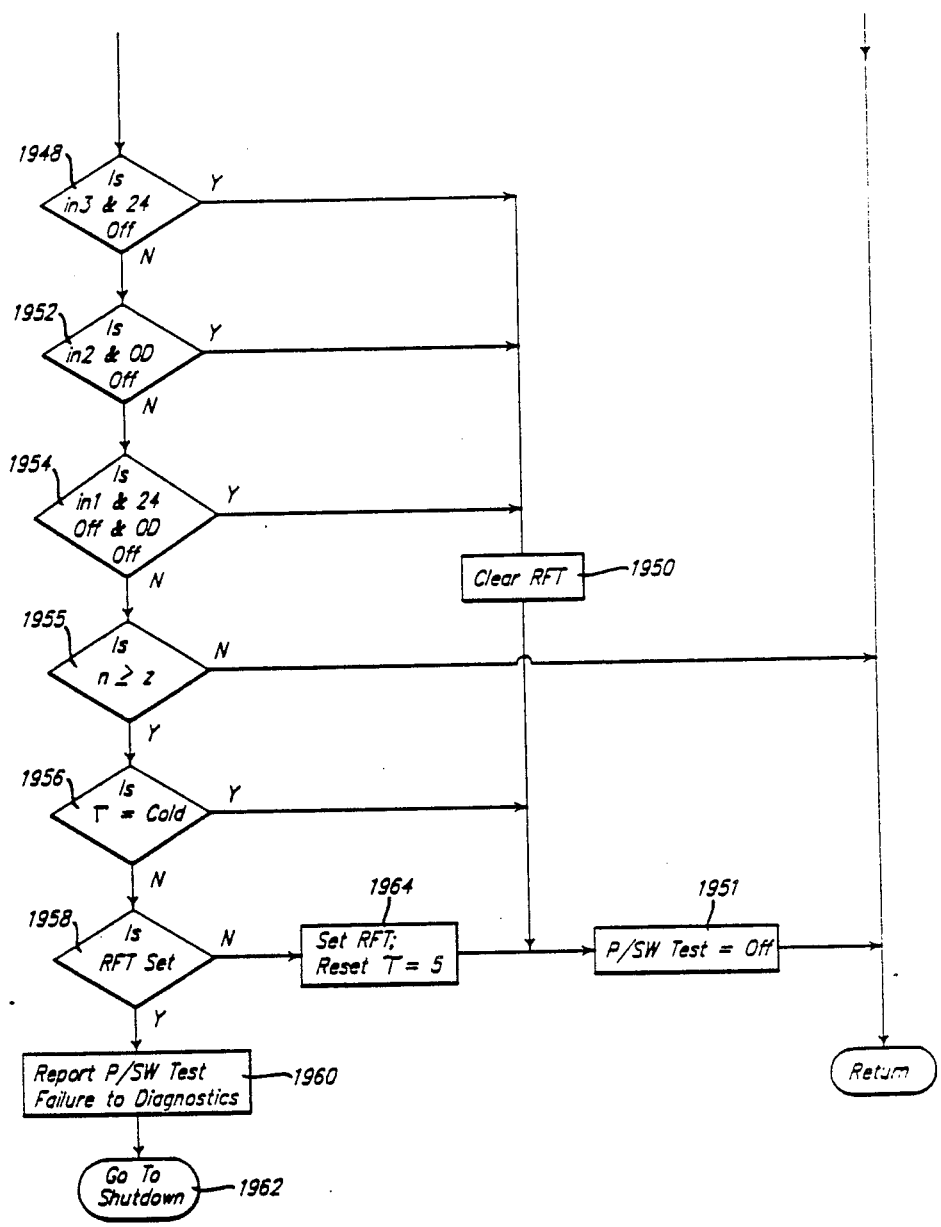

Referring to FIGS. 21A through 21C, the methodology for the pressure switch test and transmission temperature determination is shown at 1900. At the beginning or start in block 1902, the methodology advances to diamond 1904 and determines whether the transmission 100 is presently operating in first, second or third gear by performing speed calculations. If the transmission 100 is not presently operating in first, second or third gear, the methodology advances to diamond 1905 and determines whether the shift lever position (SLP) 606 is reverse R or neutral N by either the SLP or PRNODDL methods previously described. If SLP 606 is reverse or neutral, the methodology advances to block 1906 and clears a retest flag. The methodology then advances to block 1907 and turns OFF or terminates the pressure switch test. If SLP is not reverse or neutral, the methodology also advances to block 1907. The methodology then advances to block 1908. At block 1908, the transmission controller 3010 resets a timer to a predetermined value such as zero and sets a default value of time corresponding with three seconds if a pressure switch test flag (PSTF) has been set or eleven seconds with the transmission fluid temperature cold; five second with the transmission temperature fluid warm; and two seconds with the transmission fluid temperature hot. Once this has been accomplished, the methodology returns.

At diamond 1904, if the transmission 100 is operating in either first, second or third gear, the methodology advances to diamond 1910 and determines whether the shift lever position (SLP) method or test, previously described, is ON or in progress by looking for a flag. If the SLP test is ON, or in progress, the methodology advances to block 1907 previously described to terminate the pressure switch test. If the SLP test is not ON, the methodology advances to diamond 1912 and determines whether engine speed $N_e$ is less than a predetermined speed, S, i.e. 650 r.p.m. when the transmission fluid temperature is cold, or less than 1000 r.p.m. when the transmission fluid temperature is warm or hot. Also, the transmission controller 3010 determines whether a $N_o/N_t$ speed check fault count (SCF) is greater than a predetermined value or a pressure switch fault count (PSF) is greater than another predetermined value. If any of the above criteria is met in diamond 1912, the methodology advances to block 1907 previously described to terminate the pressure switch test. If all of the criteria is not met in diamond 1912, the methodology advances to block 1914 and starts or continues a timer. The methodology then advances to diamond 1916 and determines whether the pressure switch test is ON or in progress by looking for a flag. If the pressure switch test is not ON, the methodology advances to diamond 1918 and determines whether the time on the timer is greater than a predetermined time period. If the time on the timer is not greater than a predetermined time period, the methodology returns. If the time on the timer is greater than the predetermined time period, the methodology advances to diamond 1921 and determines whether SCF is less than a predetermined value such as 60 and the PSF equals zero. If that criteria is not true, the methodology advances to block 1908 previously described. If that criteria is true, the methodology advances to diamond 1922 and determines whether a solenoid continuity test, to be described under section heading "SOLENOID CONTINUITY TEST METHOD", has been inactive for a predetermined time period, i.e. greater than 400 ms, by looking for a flag. If the solenoid continuity test has not been inactive for the predetermined time period, the methodology returns. If the solenoid continuity test has been inactive for more or greater than the predetermined time period, the methodology advances to block 1924. At block 1924, the transmission controller 3010 turns ON or activates the pressure switch test, sets count n on the counter equal to a predetermined value such as zero, and turns ON both the two/four shift 634 and overdrive 632 solenoid-actuated valves. The methodology then advances to block 1926 and resets the timer equal to zero and sets a default value corresponding to ten seconds with the transmission fluid temperature cold; four seconds with the transmission fluid temperature warm; and sixty seconds with the transmission fluid temperature hot. The methodology then returns.

If the pressure switch test is ON or activated at diamond 1916, the methodology advances to block 1927 and adds a value of 1 to the count n on the counter such that n equals n plus 1. The methodology then advances to diamond 1928 (FIG. 21B) and determines whether the transmission 100 is presently operating in first or second gear by performing speed calculations and the OD pressure switch 646 is ON or pressurized. If that criteria is true, the methodology advances to block 1930 and turns OFF the overdrive solenoid-actuated valve 632. The methodology then advances to diamond 1932. If that criteria is not true, the methodology advances to diamond 1932 and determines whether the transmission 100 is operating in first or third gear as previously described and the two/four shift pressure switch 648 is ON or pressurized. If that criteria is true, the methodology advances to block 1934 and turns OFF the two/four shift solenoid-actuated valve 634. The methodology then advances to diamond 1936. If that criteria is not true, the methodology advances to diamond 1936 and determines whether the transmission temperature range is hot or the count n is greater than a predetermined value such as 7.

At diamond 1936, if the transmission fluid temperature is not hot or the count n is not greater than 7, the methodology advances to diamond 1938 and determines whether the two/four shift solenoid-actuated valve 634 has been turned OFF. If the two/four shift solenoid-actuated valve 634 is not OFF, the methodology returns. If the two/four solenoid-actuated valve 634 is OFF, the methodology advances to diamond 1940 and determines whether the engine temperature is greater than a predetermined temperature such as 75 degrees F. (Fahrenheit). If the engine temperature is greater than the predetermined temperature, the methodology advances to block 1942 and determines or concludes that the transmission temperature range is warm. If the engine temperature is not greater than the predetermined temperature, the methodology determines or concludes that the transmission temperature range is still cold. The methodology advances from block 1942 and diamond 1940 to a predetermined value such as 5. If n is greater than 5, the methodology advances to diamond 1948 to be described. If n is less than or equal to 5, the methodology advances to diamond 1944, which is initially set to zero, and determines whether a count x on a counter is greater than or equal to a predetermined value such as 8. If x is less than 8, the methodology advances to block 1945 and adds a predetermined value of 1 to x such that x equals x plus 1. The methodology then advances to diamond 1948. If x is equal to or greater than the predetermined value, the methodology advances to diamond 1946 and determines if the engine temperature is greater than a second predetermined temperature such as 145 degrees F. If the engine temperature is greater than the second predetermined temperature, the methodology advances to block 1947 and determines or concludes that the transmission fluid temperature is hot and advances to diamond 1948. If the engine temperature is not greater than the second predetermined temperature, the transmission controller 3010 maintains that the transmission fluid temperature is warm and advances to diamond 1948.

If the transmission fluid temperature is hot at diamond 1936, the methodology advances to diamond 1948 and determines whether the transmission 100 is operating in third gear and that the two/four solenoid-actuated valve 634 has been turned OFF (i.e. at block 1934). If that criteria is true, the methodology advances to block 1950 and clears the retest flag (RTF). The methodology then advances to block 1951 and turns OFF or terminates the pressure switch test and returns. If the criteria in diamond 1948 is not true, the methodology advances to diamond 1952 and determines whether the transmission 100 is operating in second gear and the overdrive solenoid-actuated valve 630 has been turned OFF. If the above criteria is met or true at diamond 1952, the methodology advances to block 1950 previously described. If the above criteria is not met at diamond 1952, the methodology advances to diamond 1954 and determines whether the transmission 100 is operating in first gear and the two/four 634 and overdrive 630 solenoid-actuated valves have been turned OFF. If that criteria is true, the methodology advances to block 1950 previously described. If that criteria is not true, the methodology advances to diamond 1955 and determines whether the value of n is greater than or equal to the value of Z. If n is less than Z, the methodology returns. If n is greater than or equal to Z, the methodology advances to diamond 1956 and determines whether the transmission fluid temperature is cold. If the transmission fluid temperature is cold, the methodology advances to block 1951 previously described to terminate the pressure switch test. If the transmission fluid temperature is not cold, the methodology advances to diamond 1958 and determines whether the retest flag (RTF) has been set. If the RTF has been set, the methodology advances to block 1960 and reports a pressure switch test failure to the diagnostics to be described under section heading "ON-BOARD DIAGNOSTICS". The methodology then advances to bubble 1962 and goes to shutdown mode. If the RTF is not set, the methodology advances to block 1964 and sets the RTF and the time on the timer equal to a predetermined value such as 5. The methodology then advances to block 1951 previously described to terminate the pressure switch test and returns.

The preferred method of determining the fluid temperature of the transmission 100 is an "accumulated run time" method. This method predicts $T_o$, transmission fluid temperature. It bases the prediction on ambient and/or engine coolant temperatures and on observed transmission and engine warm-up rates. By using ambient temperature, the engine block heaters use is accommodated. If engine temperature is lower than ambient, it will be used since it is more accurate. In the absence of any temperature sensor data, $-3°$ F. is used for ambient. The sensor data is received via the CCD link from the engine controller 3020.

Figure 21D:
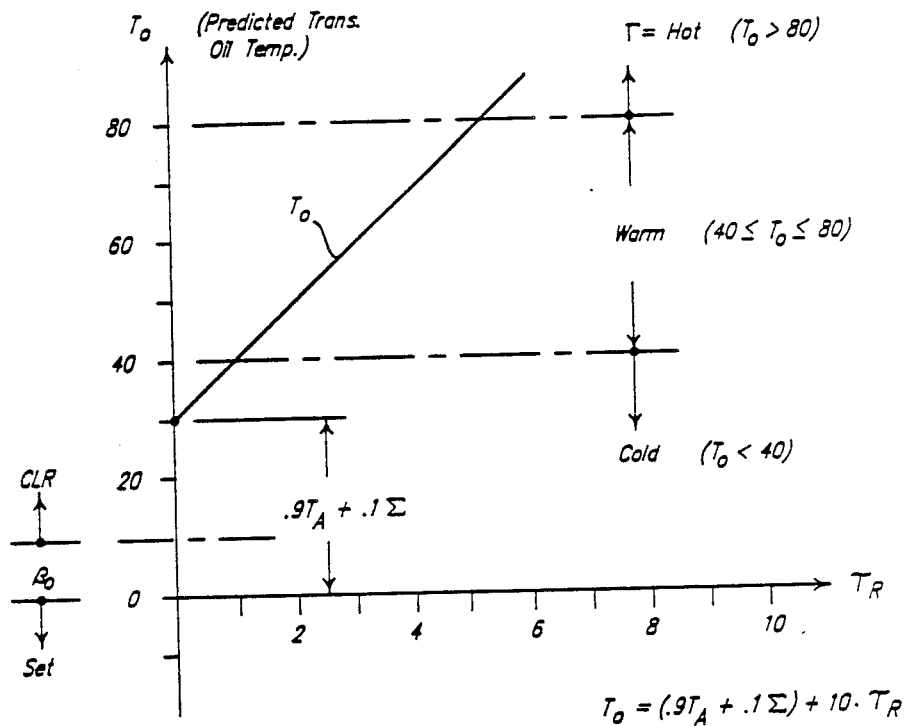

This method includes measuring the time spent in a non-neutral gear condition which represents effectively torque converter slippage. When the torque converter 110 is slipping while transmitting torque from the engine to the transmission 100, heat is generated by energy conversion. This heat elevates the temperature of the transmission fluid. The transmission controller 3010 monitors time ($T_R$)(FIG. 21D) and approximates with acceptable accuracy, the quantity of heat generated, and thereby the elevation of transmission fluid temperature. Testing can be conducted to determine the relationship between the "run time" $T_R$ and the quantity of temperature use ($\Delta T$) in the transmission sump as illustrated in FIG. 21D.

The method includes reading the temperature of the engine by an input sensor and multiplying the engine temperature by a predetermined value such as 0.1. The method also includes reading the temperature of the ambient air by an input sensor and multiplying the ambient temperature ($T_A$) by a predetermined value such as 0.9. These values are added together to obtain the temperature point on the $T_o$ ordinate. The transmission controller 3010 monitors or resumes the run time period ($T_R$) once the SLP 606 does not equal neutral N and $N_e$ is greater than a predetermined speed such as 800 r.p.m. The measured run time is multiplied by a predetermined slope value such as 10 and is added to the summed value of the multiplied engine and ambient temperature. Thus, the equation of the curve $T_o$ in FIG. 21D may be defined as follows:

$$T_o = (0.9T_A + 0.1\Sigma) + 10 * T_R$$

Accordingly, if $T_o$ is less than 40° Fahrenheit (F.), the transmission fluid temperature will be predicted or set to cold. If $T_o$ is greater than 80° F., the transmission fluid temperature will be predicted or set to hot. Otherwise, the transmission fluid temperature is predicted as or set to warm.

Additionally, a transmission temperature flag $\beta_o$ (super cold) allows for near-normal operation under sub-zero conditions. This flag is set when $T_o$ is less than 0° F. and cleared when $T_o$ is greater than 10° F. The super cold flag $\beta_o$ is used by the transmission controller 3010 to extend shift times and inhibit a third to first (3-1) shift by setting a flag. Other uses are also available.

Accordingly, this alternative, but preferred method allows the transmission controller 3010 to determine the transmission fluid temperature without a dedicated temperature sensor immersed in the transmission fluid.

SOLENOID CONTINUITY TEST METHOD

Figure 22B:
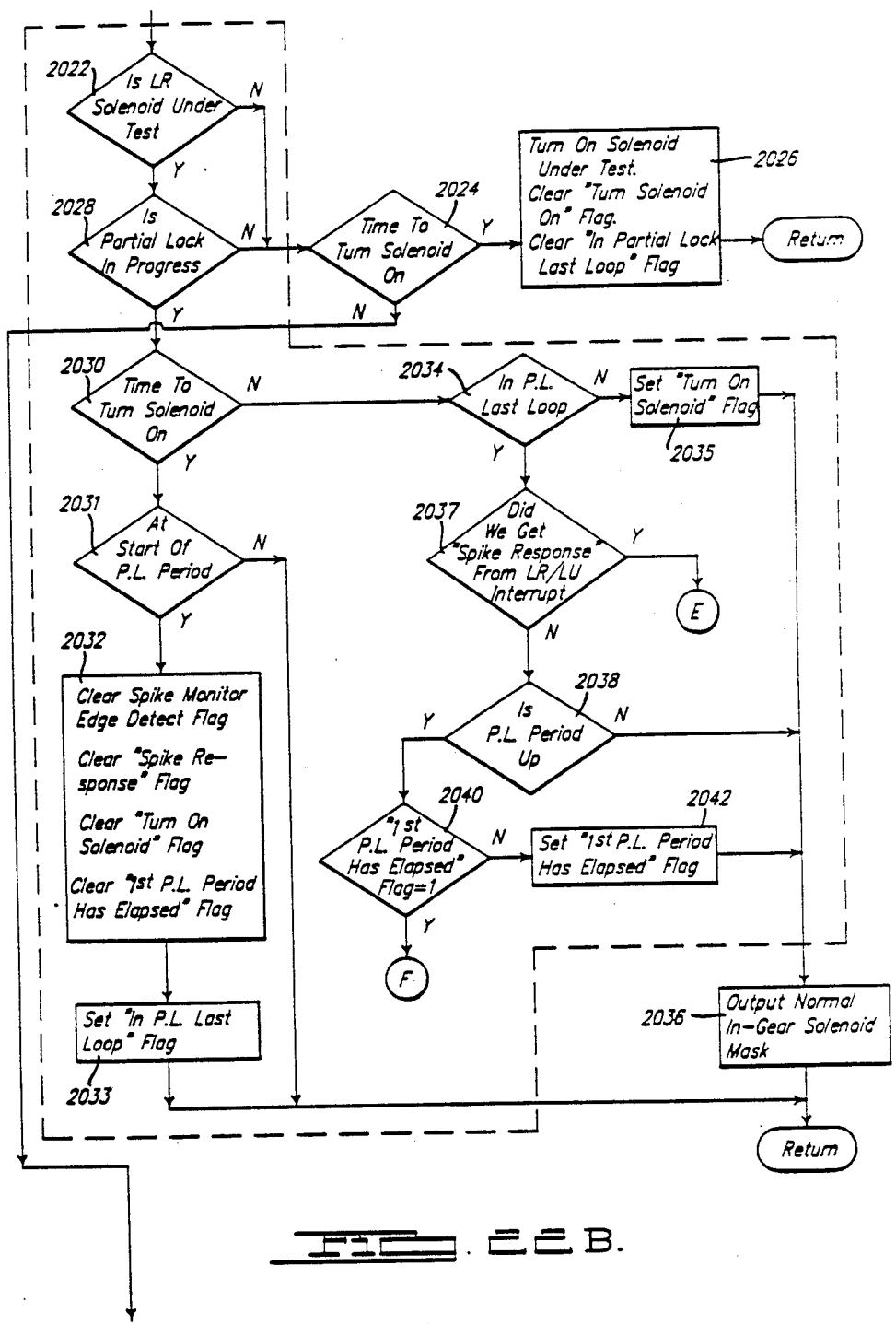
Figure 22C:
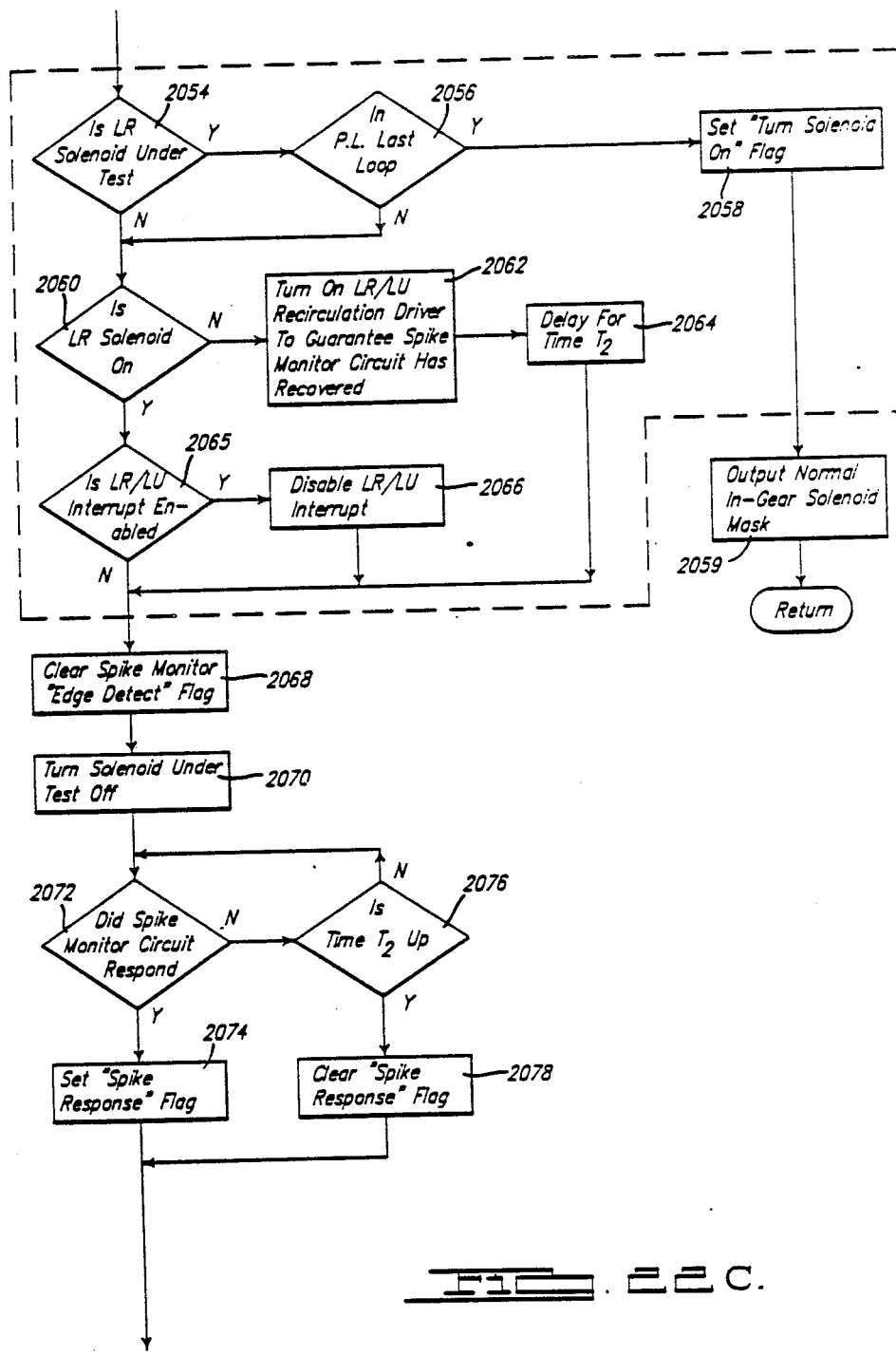
Figure 22D:
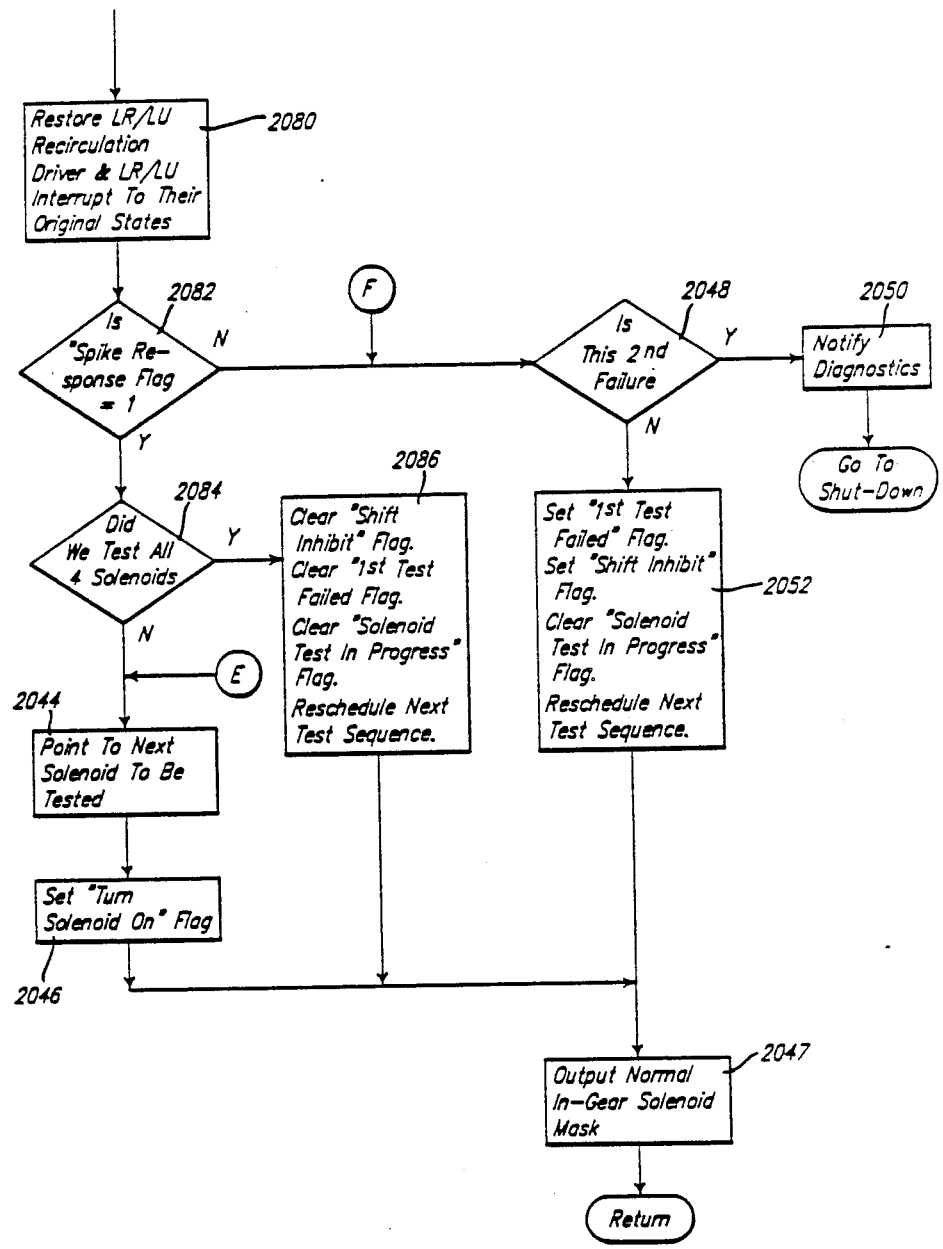
Figure 22E:
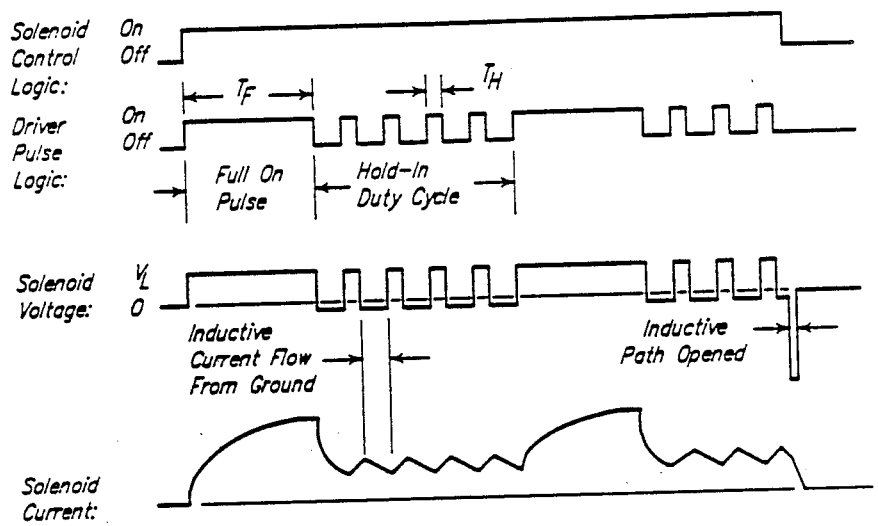

The purpose of the driver circuit continuity test is to check the solenoid circuitry for proper operation. Since the solenoid driver controls the ground side of each solenoid coil 710 (FIG. 8), a direct short to ground in the line from the solenoid of the solenoid-actuated valve 630, 632, 634 and 636 to the transmission controller 3010 would energize the solenoid coil 710 at a power level that can result in permanent coil damage from overheating. An open circuit (or direct short to supply voltage) would also prevent turning the solenoid-actuated valves "ON". Since these failures result in a loss of the normal inductive "OFF" spike (See FIG. 22E), a test which checks for the presence of this spike is used to confirm circuit continuity.

The transmission controller 3010 of the present invention uses one spike monitor circuit to test all the solenoids of the solenoid-actuated valves 630, 632, 634 and 636. The transmission controller 3010 uses a unique scheduling method or routine to ensure that the response of the spike monitor circuit is from the appropriate solenoid as shown by the blocks and diamonds enclosed by the dashed line of FIGS. 22B and 22C. When the torque converter 110 is either in unlock or pullback, no solenoids are under duty cycle control. The solenoids of the solenoid-actuated valves are tested sequentially to guarantee the spike monitor circuit response is from the appropriate solenoid.

When the torque converter 110 is in partial lock-up, the low/reverse clutch solenoid-actuated valve 636 is under duty cycle (interrupt) control. The low/reverse clutch solenoid-actuated valve 636 is tested by looking for the spike monitor circuit response caused by normal turn OFF (de-energizing) via the interrupt control. The remaining solenoids are then tested in sequence.

If the low/reverse clutch solenoid is ON (energized), a low/reverse interrupt is disabled to guarantee the spike monitor circuit response is from the solenoid under test and not from the low/reverse solenoid which is under interrupt control. If the low/reverse clutch solenoid is OFF, a low/reverse recirculation driver is turned ON to make sure the spike monitor circuit has recovered from the spike caused by the last turn OFF of the low/reverse clutch solenoid via the interrupt. This method or technique guarantees that the response of the spike monitor circuit is from the appropriate solenoid.

Referring to FIGS. 22A through 22D, the methodology for the solenoid continuity test is shown. At the beginning, in bubble 2000, the methodology advances to diamond 2002 and determines whether the solenoid continuity test is in progress by looking for a flag. If the solenoid continuity test is not in progress, the methodology advances to diamond 2004 and determines whether it is time to run the solenoid continuity test by looking for a flag for example. If it is not time to run the solenoid continuity test, the methodology returns. If it is time to run the solenoid continuity test, the methodology advances to diamond 2006 and determines whether a shift is in progress by looking for a flag. If a shift is in progress, the methodology returns. If a shift is not in progress, the methodology advances to diamond 2008 and determines whether the shift lever position (SLP) test, previously described, is in progress by looking for a flag. If the SLP test is in progress, the methodology returns. If the SLP test is not in progress, the methodology advances to diamond 2010 and determines whether the pressure switch (P/SW) test, previously described, is in progress by looking for a flag. If the P/SW test is in progress, the methodology advances to block 2012 and sets a "solenoid test in progress flag", "turn solenoid ON" flag, and a "low/reverse LR solenoid under test" flag and returns. The above methodology is used because a solenoid continuity test sequence cannot occur while a shift, shift lever position test or pressure switch is in progress.

At diamond 2002, the transmission controller 3010 determines whether the solenoid continuity test is in progress as previously described. If the solenoid continuity test is in progress, the methodology advances to diamond 2014 and determines whether a SLP test is in progress as previously described. If a shift lever position test is in progress, the methodology advances to block 2016 and aborts the test sequence by clearing the "solenoid test in progress" flag and advances to block 2018. At block 2018, the transmission controller 3010 outputs the normal in-gear solenoid mask (i.e. logical states) to the solenoid-actuated valves and returns. If the SLP test is not in progress at diamond 2014, the methodology advances to diamond 2020 and determines whether a shift is in progress as previously described. If a shift is in progress, the methodology advances to block 2016 previously described. The above methodology is used to interrupt the test sequence for a shift lever position test or a shift in progress.

If a shift is not in progress, the methodology advances to diamond 2022 and determines whether the low/reverse solenoid-actuated valve 636 is under test by looking for a flag for example. In the test sequence, each solenoid-actuated valve must be tested separately to ensure that the response is from the appropriate solenoid. Therefore, if the low/reverse solenoid-actuated valve 636 is not under test, the methodology advances to diamond 2024 and determines whether it is time to turn ON the solenoid under test by looking for a flag for example. If it is time to turn ON the solenoid under test, the methodology advances to block 2026 and turns ON the solenoid under test, clears the "turn solenoid ON" flag, and clears the "in partial lock-up (PL) last loop" flag and returns. If it is not time to turn ON the solenoid under test, the methodology advances to diamond 2054 to be described.

At diamond 2022, the transmission controller 3010 determines whether the low/reverse solenoid-actuated valve 636 is under test by looking for a flag for example. If the low/reverse solenoid-actuated valve 636 is under test, the methodology advances to diamond 2028 and determines whether partial lock-up of the torque converter 110 is in progress by looking for a flag. If partial lock-up is not in progress, the methodology advances to diamond 2024 previously described. If partial lock-up is in progress, the methodology advances to diamond 2030 and determines whether it is time to turn ON the solenoid-actuated valve under test as previously described. If it is time to turn ON the solenoid-actuated valve under test, the methodology advances to diamond 2031 and determines whether the methodology is at the start of a partial lock-up period, previously described (FIG. 18B), by looking for a flag for example. If the methodology is at the start of a partial lock-up period, the methodology returns. If the methodology is not at the start of a partial lock-up period, the methodology advances to block 2032 and clears a "spike monitor edge detect" flag, a "spike response" flag, a "turn ON solenoid" flag, and "first partial lock-up period has elapsed" flag. The methodology then advances to block 2033 and sets a "in partial lock-up last loop" flag. The methodology then returns.

At diamond 2030, if it is not time to turn ON the solenoid-actuated valve under test, the methodology advances to diamond 2034 and determines whether partial lock-up of the torque converter 110 occurred in the last loop by looking for a flag. If partial lock-up did not occur in the last loop, the methodology advances to block 2035 and sets the "turn ON solenoid" flag. The methodology then advances to block 2036 and outputs a normal in-gear solenoid mask as previously described. The methodology then returns.

If partial lock-up occurred in the last loop at diamond 2034, the methodology advances to diamond 2037 and determines whether a "spike response" previously described was received from the low/reverse interrupt. If a spike response was not received, the methodology advances to diamond 2038 and determines whether the partial lock-up period has expired by looking for a flag for example. If the period has not expired, the methodology advances to block 2036 previously described. If the period has expired, the methodology advances to diamond 2040 and determines whether the "first partial lock-up period has elapsed flag" has been set. If the flag has not been set, the methodology advances to block 2042 and sets the "first partial lock-up period has elapsed" flag. The methodology then advances to block 2036 previously described. If the flag has been set, the methodology advances to diamond 2048 to be described herein.

At diamond 2037, if a spike response was not received, the methodology advances to block 2044 and points to the next solenoid-actuated valve to be tested. The methodology then advances to block 2046 and sets the "turn solenoid ON" flag. The methodology then advances to block 2047 and outputs the normal in-gear solenoid mask for the solenoid-actuated valves as previously described. The methodology then returns.

At diamond 2040, if the "first partial lock-up period has elapsed flag" has been set, the methodology advances to diamond 2048 and determines whether a second failure has occurred by looking for a flag for example. If a second failure has occurred, the methodology advances to block 2050 and notifies the diagnostics, to be described, of the transmission controller 3010 and advances to shut down mode. If a second failure has not occurred, the methodology advances to block 2052 and sets a "first test failed" flag, sets a "shift inhibit" flag, clears the "solenoid test in progress" flag, and reschedules the next test sequence, in a predetermined time period, i.e. 2 seconds. The methodology then advances to block 2047 previously described.

At diamond 2054, the transmission controller 3010 determines whether the low/reverse solenoid-actuated valve 636 is under test as previously described. If the low/reverse solenoid-actuated valve 636 is under test, the methodology advances to diamond 2056 and determines whether partial lock-up of the torque converter 110 occurred in the last loop by looking for a flag. If partial lock-up occurred in the last loop, the methodology advances to block 2058 and sets the "turn solenoid ON" flag. The methodology advances to block 2059 and outputs the normal in-gear solenoid mask as previously described and returns.

If the low/reverse solenoid-actuated valve 636 is not under test or partial lock-up did not occur in the last loop, the methodology advances to diamond 2060 and determines whether the low/reverse solenoid-actuated valve 636 is ON as previously described. If the low/reverse solenoid-actuated valve 636 is not ON, the methodology advances to block 2062 and turns ON the LR/LU recirculation driver to guarantee that the spike monitor circuit has recovered. The methodology advances to block 2064 and delays for a predetermined time period ($T_2$). The methodology then advances to block 2068 to be described herein.

At diamond 2060, if the low/reverse solenoid-actuated valve 636 is ON, the methodology advances to diamond 2065 and determines whether the LR/LU interrupt is enabled by looking for a flag for example. If the LR/LU interrupt is enabled, the methodology advances to block 2066 and disables the LR/LU interrupt. The methodology then advances to block 2068. If the LR/LU interrupt is not enabled, the methodology advances to diamond 2068 and clears the "spike monitor edge detect" flag. The methodology then advances to block 2070 and turns OFF the solenoid-actuated valve under test. The methodology then advances to diamond 2072 and determines whether the spike monitor circuit has responded by looking for a back EMF spike when the solenoid is turned OFF. If the spike monitor circuit has responded, the methodology advances to block 2074 and sets a "spike response" flag. If the spike monitor circuit has not responded, the methodology advances to diamond 2076 and determines whether the predetermined time period ($T_2$) has expired by looking at a timer for example. If the predetermined time period has not expired, the methodology loops back to diamond 2072 previously described. If the predetermined time period has expired, the methodology advances to block 2078 and clears the "spike response" flag.

From blocks 2074 and 2078, the methodology advances to block 2080 and restores the LR/LU recirculation driver and LR/LU interrupt to their original state. The methodology then advances to diamond 2082 and determines whether the "spike response" flag has previously been set. If the spike response flag has not been set, the methodology advances to diamond 2048 previously described. If the spike response flag has been set, the methodology advances to diamond 2084 and determines whether all four solenoid-actuated valves 630, 632, 634 and 636 have been tested by looking to see if four spikes have been received. If all four solenoid-actuated valves have been tested, the methodology advances to block 2086. At block 2086, the transmission controller 3010 clears the "shift inhibit" flag, clears the "first test failed" flag, clears the "solenoid in progress" flag, and reschedules the next test sequence in a predetermined time period such as 10 seconds. The methodology advances to block 2047 previously described.

THROTTLE ANGLE COMPUTATION AND FAILURE DETECTION

The purpose of the throttle angle computation and failure detection method is to compute the throttle angle and to detect any failures of the throttle pot and associated circuitry as described in U.S. Pat. No. 4,637,361, issued Jan. 20, 1987, in the name of Killen, et. al., which is hereby incorporated by reference. The throttle angle value is used in circle 814 and 854 of FIG. 12 for the shift schedule method (FIG. 14). This parameter must be checked and upon detecting a failure, a default throttle value is used to ensure satisfactory operation.

Figure 23B:
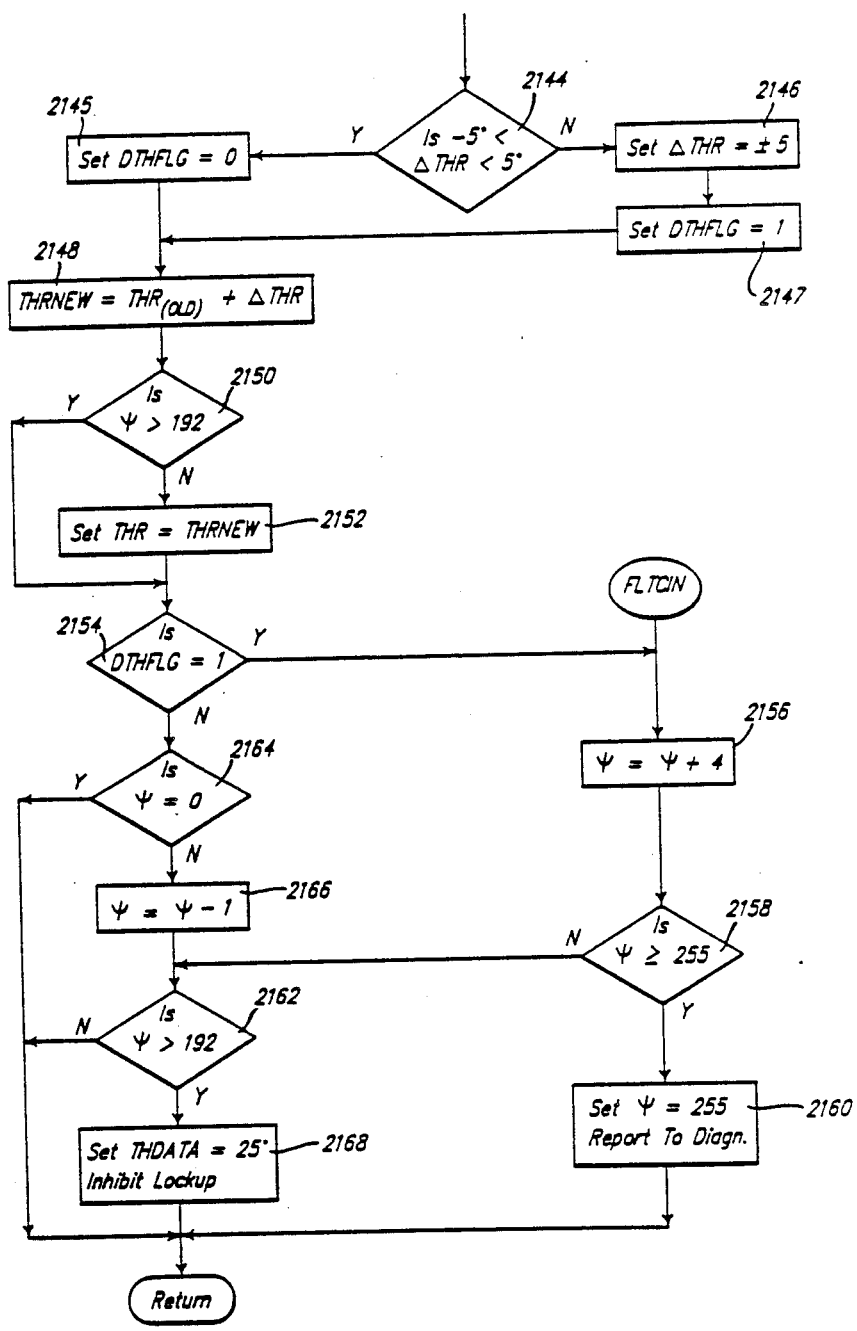

Referring to FIGS. 23A and 23B, the methodology for the throttle angle computation is shown. The methodology starts in bubble 2100 and then advances to diamond 2102. At diamond 2102, the transmission controller 3010 determines whether the raw throttle angle data ($THR_D$) from the throttle pot is greater than or equal to a predetermined value such as eight degrees (See FIG. 23C). If that criteria is not true, the methodology advances to block 2156 to be described. If that criteria is true, the methodology advances to diamond 2104 and determines whether a shift is in progress by looking for a flag which is set when the shift begins. If a shift is in progress, the methodology advances to block 2106 to be described herein.

Figure 23C:
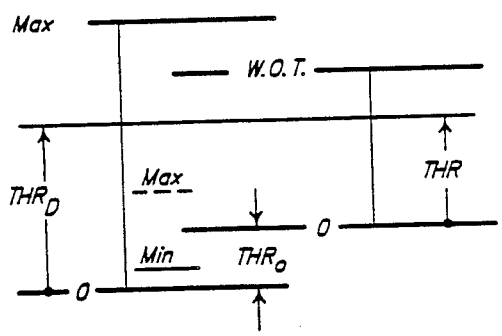

If the shift is not in progress, the methodology advances to diamond 2108 to determine whether the raw throttle angle data ($THR_D$) is less than or equal to the closed minimum throttle value ($THR_o$) of the throttle data minus a predetermined value such as $\frac{1}{2}$ (0.5) degrees (See FIG. 23C). If that criteria is true, the methodology advances to block 2110 and increments a minimum throttle counter such as a timer in the methodology. The methodology then advances to diamond 2112 to determine whether the minimum throttle counter is equal to a predetermined value such as six counts. If that criteria is not true, the methodology advances to diamond 2114 to be described herein. If that criteria is true, the methodology advances to block 2116 and decrements the closed minimum throttle value ($THR_o$) of the raw throttle angle data ($THR_D$). The methodology advances to diamond 2118 to be described herein.

At diamond 2108, if the raw throttle angle data is greater than the closed minimum throttle value minus a predetermined value such as $\frac{1}{2}$ (0.5) degrees, the methodology advances to diamond 2120. At diamond 2120, the transmission controller 3010 determines whether the throttle angle at update (THR) is greater than or equal to a predetermined value such as $\frac{1}{2}$ degree (See FIG. 23C). If that criteria is not true, the methodology advances to block 2106 to reset the minimum throttle counter. If that criteria is true, the methodology advances to diamond 2122 and determines whether output speed $N_o$ is less than a predetermined value such as 200 r.p.m. If the output speed $N_o$ is less than the predetermined value, the methodology advances to diamond 2124 and determines whether engine speed $N_e$ is greater than a predetermined value such as 400 r.p.m. but less than a maximum predetermined value such as $N_e$ (maximum engine speed) plus a value such as 50 r.p.m. If that criteria is true, the methodology advances to block 2130 to be described. If $N_o$ is not less than 200 r.p.m. or $N_e$ is not greater than 400 r.p.m., or $N_e$ is not less than $N_e$ plus 50 r.p.m., the methodology advances to diamond 2126 and determines whether the PRNODDL code from the contact switch sensors $NS_1$ and $NS_2$ equals drive. If the PRNODDL code does not equal drive, the methodology advances to block 2106 previously described. If the PRNODDL code does not equal drive, the methodology advances to diamond 2128 and determines whether engine speed $N_e$ is less than turbine speed $N_t$ minus a predetermined value such as 50 r.p.m. If that criteria is not true, the methodology advances to block 2106 previously described. If that criteria is true, the methodology advances to block 2130 and increments the minimum throttle counter. The methodology advances to diamond 2132 and determines whether the minimum throttle counter equals a predetermined value such as 28. If that criteria is not true, the methodology advances to diamond 2114 to be described herein. If that criteria is true, the methodology advances to block 2134 and increments the closed minimum throttle value of raw throttle angle data and advances to diamond 2118.

At diamond 2118, the transmission controller 3010 determines whether the closed minimum throttle value is greater than or equal to a minimum predetermined value such as eight degrees, but less than or equal to a maximum predetermined value such as forty-eight degrees. If that criteria is true, the methodology advances to block 2106 previously described. If that criteria is not true, the methodology advances to block 2136 and limits the closed minimum throttle value. The methodology then advances to block 2106 previously described to reset the minimum throttle counter. The methodology then advances to diamond 2114.

At diamond 2114, the transmission controller 3010 determines whether the raw throttle angle data is greater than the closed minimum throttle value. If that criteria is not true, the methodology advances to block 2138 and sets a new unlimited throttle angle equal to a predetermined value such as zero. The methodology then advances to block 2140 to be described herein.

At diamond 2114, if the throttle data is greater than the closed minimum throttle value, the methodology advances to diamond 2142 and determines whether the new unlimited throttle angle is less than or equal to a predetermined value such as 100 degrees. If that criteria is not true, the methodology advances to block 2156. If that criteria is true, the methodology advances to block 2140 and updates the minimum throttle angle memory location with $THR_o$ just computed. The methodology then advances to diamond 2144 (See FIG. 23B) and determines whether the change in the new unlimited throttle angle ($\Delta THR$) is between a predetermined range such as $-5$ to 5 degrees. If that criteria is not true, the methodology advances to block 2146 and sets the change in throttle angle within a predetermined limit such as $\pm 5$ degrees. The methodology then advances to block 2147 and sets the delta ($\Delta$) throttle exceeded limit flag (DTHFLG) equal to one. The methodology then advances to block 2148 to be described herein.

At diamond 2144, if the change in the new unlimited throttle angle is between the predetermined range, the methodology advances to block 2145 and clears the delta throttle exceeded limit flag (set equal to zero). From block 2145, the methodology advances to block 2148 and calculates a new throttle angle based on the old throttle angle at update plus the change in throttle angle. The methodology advances to diamond 2150 and determines whether the throttle error counter ($\psi$) is greater than a predetermined value such as 192 counts. If this criteria is true, the methodology advances to block 2154 to be described. If that criteria is not true, the methodology advances to block 2152 and sets the throttle angle at update equal to the new throttle angle because normal operation of the hardware is occurring. The methodology advances to diamond 2154 and determines whether the delta ($\Delta$) throttle exceeded limit flag has previously been set. If that criteria is true, the methodology then advances to block 2156 and increments the throttle error counter. The methodology advances to diamond 2158 and determines whether the throttle error counter is greater than or equal to a predetermined value such as 255. If that criteria is true, the methodology advances to block 2160 and sets the throttle error counter to this predetermined value and reports a failure to the diagnostics providing that engine speed $N_e$ is greater than a predetermined value such as 500 r.p.m. and the raw throttle angle data ($THR_D$) is less than a predetermined value such as $6°$ or greater than a predetermined value such as $120.5°$. The methodology then returns. If the throttle error counter is less than the predetermined value, the methodology advances to diamond 2162.

At diamond 2154, if the delta throttle exceeded limit flag has not previously been set, the methodology advances to diamond 2164 to determine whether the throttle error counter is equal to a predetermined value such as zero. If the throttle error counter equals zero, the methodology returns. If the throttle error counter does not equal zero, (i.e. an error has occurred), the methodology advances to block 2166 and decrements the throttle error counter. The methodology advances to diamond 2162 to determine whether the throttle error counter is greater than a predetermined value such as 192. If that criteria is not true, the methodology returns. If that criteria is true, the methodology advances to block 2168 and sets the throttle angle data equal to a predetermined value such as 25 degrees (default value) and inhibits lock-up operation of the torque converter, previously described, by setting a flag for example. From block 2168, the methodology returns.

SHIFT METHODOLOGY

The present invention provides fully adaptive electronic transmission controls. These adaptive controls perform their functions on real-time feedback sensor information, as is likewise performed by electronic anti-skid brake controls. Additionally, the adaptive controls "learn" particular information by monitoring data such as the value for the fill time and apply rate of the applying element such as a clutch. This information is then stored in the memory of the transmission controller 3010 for future use.

UPSHIFT METHODOLOGY

The upshift methodology uses the learned values for the fill time and apply rate (torque build-up rate) of the ON-coming or applying element such as a clutch and for the release time of the OFF-going or releasing element such as a clutch. Learning apply element fill time permits timing the beginning-of-fill so as to compensate for orifice size or clutch clearance variations, etc. Learning the apply rate and release time allows compensation for variations in orifice size, clutch capacity, solenoid response, and torque requirement (included to some extend, different engines). Although learning is restricted to the HOT mode, some temperature compensation occurs between summer and winter.

In the power-ON upshift, the methodology adjusts the apply and release events so that release element slip occurs just before the apply element begins to develop torque. Slip must be allowed to occur so that the release and apply events can be identified by speed measurements. In simplified terms, release time is measured as the interval between initial-element-vent and beginning-of-slip; fill time is from beginning-of-fill to end-of-bump-along; and apply rate is from end-of-bump-along to beginning-if-speedchange. Bump-along is a term coined to describe the bang-bang (fixed percent ON-OFF time) control period that the methodology uses to maintain a small amount of backward slip prior to the application of the apply element. The methodology delays either the beginning of the release vent or the beginning of apply fill so as to achieve approximately one cycle of bump-along.

This control methodology reduces the release element pressure to the minimum that will still support the input torque reaction, thereby establishing the optimum beginning conditions for the element exchange. The apply rate, then, is selected to develop the torque needed to begin speed change just as release element net-apply-pressure reaches zero. Thus, the duty-cycle-controlled apply rate matches the ballistic release rate of the OFF-going or releasing element. The purpose of the matched exchange, of course, is to minimize fight between the elements. Release time and apply rate are both learned relative to the throttle angle.

Once the speed change begins, the apply element pressure is controlled to provide the desired turbine acceleration alpha$_t$. This speed change control is the heart of adaptive control since it adapts to changes in engine torque, friction coefficient, etc. and provides consistent control.

The acceptability of the power-OFF upshift must be verified with the appropriate engine control methodology. With carburetors, the engine speed $N_e$ drops quickly and may pull the turbine 128 through the speed change faster than desired. This can result in both elements going or staying off, which, if the throttle is opened, will result in a runaway bump as both elements race to apply. In order to prevent this, methodology was devised which uses both elements to control the speed change and gradually accomplish the hand-off. With the electronic engine control, the engine may vary between power-ON and power-OFF. It may even provide the correct programmed rate past the target speed ($N_t = N_j$) without either element controlling, thus defeating the above approach. Methodology has been added which simply turns ON the apply element when the speed change is complete. Also, with this shift, it is desirable to release the OFF-going element quickly to avoid excessive engine braking torque.

The learned term for fill time is time remaining to nearly fill, $T_f$. Using $T_f$ minimizes the possibility of a too aggressive element application and allows the use of a duty cycle to soften the initial application. $T_f$ is actually calculated from the learned clutch fill volume, $V_f$. This term is stored in cubic inches so that different flow rates may be used to calculate $T_f$. This allows the same learned volume to be used for different shifts which may have a different line pressure. The program or methodology continually tracks the fluid volume needed to apply each element.

The learned term for release time, above, is time to nearly release, $T_r$, which is calculated as $K_s * T_s - 0.063$. $T_s$ is a table value for the nominal observed release time. $K_S$ is the learned multiplier for that individual package. Since $T_s$ varies with THR (i.e. engine torque), a multiplier provides the best data match for the variables being accommodated. The 0.063 seconds, together with the $T_f$ differential, provides a margin to ensure that fight is minimized.

KICKDOWN METHODOLOGY

For good kickdown feel, it is essential that the shift occur quickly. The use of accumulators delays the clutch or element release so every effort is made to minimize the accumulator fill/vent times. The methodology turns OFF the release element at the start of the shift and does not apply it again until turbine acceleration exceeds a desired level by a small amount. A duty cycle (DC) may then be initialized and updated to provide proportional control for the speed change. The primary element DC acceleration or proportional control ($DC_{alpha}$, i.e. variable percent ON or OFF time) initialization level is calculated for $N_e$ and $N_t$, the torque converter characteristics, and the element capacity; each $DC_{alpha}$ update is based on an anticipated turbine acceleration (alpha$_t$) error.

Figure 24A:
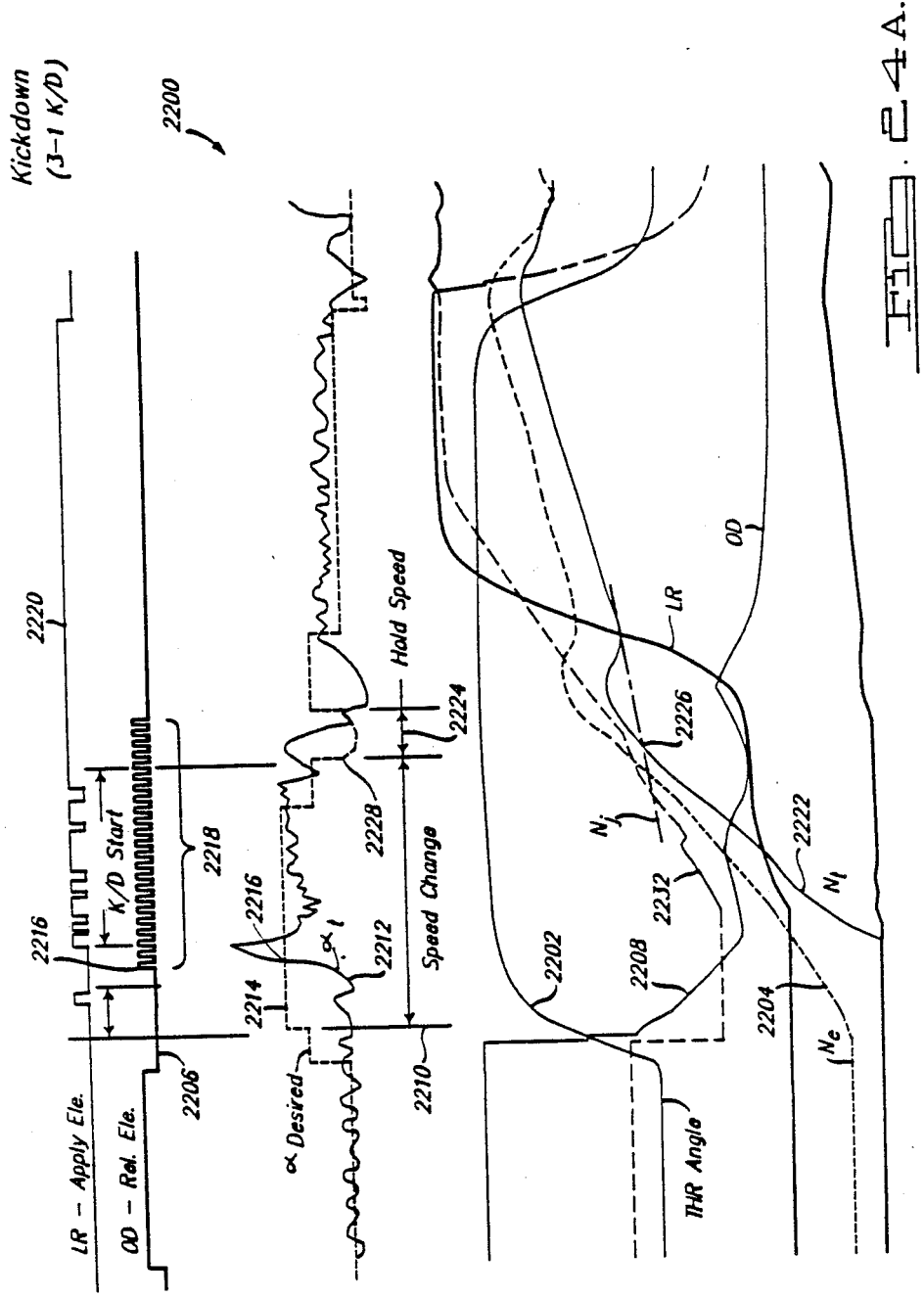

As illustrated in FIG. 24A, a shift tape of the transmission characteristics for a third to first (3-1) kickdown shift is generally shown at 2200. Curve 2202 represents throttle angle. As throttle angle increases, engine speed $N_e$ shown in curve 2204 also increases. Simultaneously, the release element is released as shown in curve 2206 to drop its torque capacity. In other words, for a third to first (3-1) gear kickdown shift, the overdrive clutch 304 is released at the start of the shift. As shown by curve 2208, the fluid pressure of the overdrive clutch 304 vents down. When the torque capacity of the overdrive clutch 304 is low enough (at the fill volume), the turbine 128 will breakaway and a speed change will start as indicated by numeral 2210.

The present invention limits the rate at which the turbine 128 accelerates. This is accomplished by calculating and comparing an instantaneous turbine acceleration (alpha$_t$) shown in curve 2212 against a desired acceleration (alpha$_{desired}$ or $\alpha^*$) level shown in curve 2214. Once the speed change beings at 2210, the controller 3010 attempts to match alpha$_t$ approximately equal with alpha$_{desired}$.

When alpha$_t$ exceeds alpha$_{desired}$, the release element is reapplied to control the rate at which the turbine 128 accelerates. The release element is reapplied under duty cycle acceleration or proportional control ($DC_{alpha}$) to provide a controlled slope of speed change on the turbine 128.

As illustrated in FIG. 24A, curve 2212 of alpha$_t$ crosses curve 2214 of alpha$_{desired}$ at point 2216. At point 2216, the overdrive clutch 304 is reapplied by duty cycling the solenoid-actuated valve 632 as shown by part 2218 of curve 2206.

Simultaneously with speed change, the kickdown methodology adaptively applies the applying element (low/reverse clutch 310) as shown by curve 2220 based on the remaining turbine speed change which has to occur. As turbine speed $N_t$ increases in curve 2222, the methodology compares the actual turbine speed $N_t$ to a target speed $N_j$ (for a 3-1 shift, first gear ratio of first gear $N_j$). Because the speed change is made at a known rate (because controlling release element at that rate), the methodology can predict how much time remains to fill the applying element. The methodology attempts to get the applying element filled after achieving the target speed $N_j$ for a predetermined time period such as 120 ms, which region 2224 of curve 2214 is called "hold-speed".

When $N_t$ exceeds the target speed $N_j$ at point 2226, i.e. enters the hold-speed region 2224, alpha$_{desired}$ is lowered again to a negative value at point 2228 on curve 2214 so that the release element will prevent further increases in $N_t$. $DC_{bb}$ is again used for improved response before reentering $DC_{alpha}$ control. The release element hold-speed continues until the apply element is filled, begins to develop torque, and pulls $N_t$ down to the target level, $N_j$. The methodology then turns OFF the release element when $N_t$ equals $N_j$.

To reduce the energy (and provide a faster shift), learning is used to limit the hold-speed period to the minimum that will accomplish the "apply" identification and improve "shift feel". To know whether to turn ON the apply element (i.e. cause the solenoid to apply), the methodology starts which a "hold-speed" time allowance and adds to that a time-to-complete-speed-change, which is calculated by $(N_j - N_t)/$alpha$_{desired}$. This "time available (from now until the element should apply)", is continuously compared to the "time required (element volume divided by fill rate)" and the solenoid-actuated valve is turned ON or OFF as required. Since the methodology tracks element volume during solenoid OFF and ON times, there is little error that can develop if alpha$_t$ is lower than alpha$_{desired}$. When alpha$_t$ is low and the actual $N_t$ becomes lower than projected, the methodology simply turns OFF the element and waits for $N_t$ to catch up to the projected level. If alpha$_t$ is higher than alpha$_{desired}$, the controls have no means to catch up, but since the initial release element vent time and the alpha$_{desired}$ "feather" control cause alpha$_t$ to be lower than alpha$_{desired}$ normal, there is no opportunity for significant "fall-behind" error to develop.

To achieve 120 ms. of hold-speed, the present invention utilizes "adaptive" kickdown start logic which is based on a "learned" fill volume of the applying element. The equation for the kickdown start logic may be defines as follows:

$$N_t > N_j - S, \text{ where } S = \text{alpha}_{desired} * t_f = \text{r.p.m.}$$

S is the kickdown start value (r.p.m. of turbine remaining) which equals $t_f$ multiplied by alpha$_{desired}$. As illustrated in FIG. 24A, curve 2232 represents the kickdown start value S. $t_f$ is the time needed to fill the applying element to the level that will provide the correct amount of bump-along time or kickdown hold-speed time (i.e. 120 ms). It is continuously updated and includes compensation for any expected duty cycle use during the remaining fill time. $t_f$ is calculated as follows:

$$t_f = \frac{[V_f - V]}{M \cdot Q_f} - .12 \cdot K_f \text{ Limit: } t_f \geq 0$$

$K_f =$ DC COMPENSATION FACTOR: Corrects for the reduced fill rate when $DC$ use is expected. $K_f = 1$ for kickdown shift $V_f =$ fill volume of the applying element $Q_f =$ flow rate of the applying element $M =$ correction factor for line pressure $V =$ instantaneous element volume Since $N_j$ is the ratio multiplied by $N_i$, $N_t$ can be controlled at a desired slope by the release element so that $N_t$ goes to $N_j$ during $t_f$, having 120 ms of hold-speed to completely fill the apply element. $t_f$ is continuously calculated to give the kickdown start value S. Whenever $N_t$ crosses S (i.e. $N_t > N_j - S$), the apply element is turned ON which reduces S because the apply element is filling. If $N_j - S > N_t$ (i.e. $N_t$ falls below S), the apply element is turned OFF. This results in an irregular or variable DC on the apply element. In other words, once the kickdown start value S is calculated, the transmission controller 3010 compares $N_t$ to S. If $N_t$ is greater than $N_j$ minus S, the methodology instructs the transmission controller 3010 to turn ON the applying element to reduce S to zero. Hence, the methodology drives S to equal zero just as $N_t$ crosses or equals $N_j$ at point 2226. This allows 120 ms. of time remaining to complete the fill (hold-speed), resulting in better shift quality. Otherwise, the shift quality would be "jerky" if the apply element were applied just as $N_t$ crossed $N_j$.

TURBINE TORQUE CALCULATION

Referring to FIG. 24A, until alpha$_t$ crosses alpha$_{desired}$ for the first time at point 2216, the release element is held completely OFF so that any initial speed change is not delayed. Once the speed change is complete at point 2228, it is desired not to overshoot alpha$_{desired}$. Therefore, a duty cycle is calculated that will hold or maintain alpha$_{desired}$. The turbine torque calculation is used to calculate the initial percent ON time, indicated at 2216, for the duty cycle (DC) of the release element.

The initial percent ON time of the release element for either a downshift or garage shift is calculated as follows:

$$\text{Initial \%ON} = DC_o + (T_t - I_t * \text{alpha}_{desired})/K_t$$

whereby, $DC_o =$ Zero torque DC estimate $I_t =$ Equivalent turbine inertia $K_t =$ Gain, DC to turbine torque $(T_t)$ In the above equation, $DC_o$ is the duty cycle needed to maintain fill pressure on the release element, which is predetermined value. $I_t \times \alpha_{desired}$ is the net torque to maintain desired acceleration which is also a predetermined value. $K_t$ is the gain from the DC to the turbine torque which is a predetermined value. $DC_o$, $I_t$ and $K_t$ vary for the shift involved, i.e. fourth to third gear, fourth to second gear, etc. The equation for turbine torque $(T_t)$ is defined below:

$$T_t = (K_1 N_e - K_2 N_t) N_e \text{ if } N_t \text{ is less than } K_3 N_e$$
$$= K_4 (N_e - N_t) N_e \text{ if } N_t \text{ is greater than or equal to } K_3 N_e$$

Figure 24B:
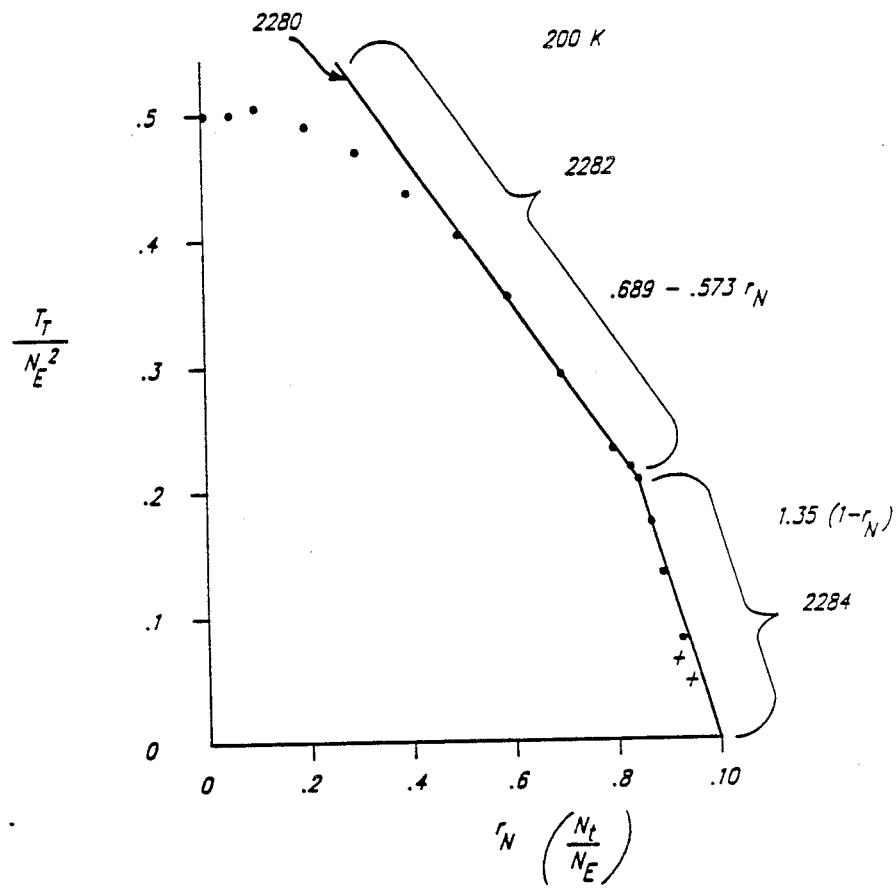

As illustrated in FIG. 24B, the equation for the turbine torque $(T_t)$ is derived by the graph of turbine torque $T_t$ divided by engine speed $N_e$ squared (which is the same as impeller speed squared) versus speed ratio of turbine speed $N_t$ divided by engine speed $N_e$ which is curve 2280. For turbine speed $N_t$ less than a predetermined constant $K_3$ times engine speed $N_e$, the equation for turbine torque $T_t$ is indicated by part 2282 of curve 2280. For turbine speed $N_t$ equal to or greater than $K_2$ multiplied by $N_e$, the equation for turbine torque $T_t$ is indicated by part 2284 of curve 2280.

FIG. 24B is based on the characteristics of a particular model of torque converter. This can be used at any time that the lockup clutch is disengaged to calculate an input torque to the transmission 100. For a particular element involved (knowing what its capacity is), the transmission controller 3010 can calculate the DC necessary to provide the appropriate level of element torque (i.e. initial DC). After the initial percent ON time for the DC, the DC adaptively adjusts to maintain alpha$_{desired}$.

LEARN METHODOLOGY

The only learned quantity used for making downshifts is the fill time of the applying element or clutch. As previously mentioned, the element volumes are actually learned and stored. Fill times are calculated by using the learned element volume and an appropriate flow rate from a look-up table and graph of flow rate characteristics for each element for example. The learned volume information for a given element is shared between different shifts, both upshifts and downshifts. The flow rate used accounts for the individual hydraulic flow rates and compensates for line pressure differences which exist between different shifts (i.e. for element fill rates, not vent rates).

With a coastdown shift, however, the pump 200 will not, under all conditions, have the capacity to maintain the regulated line pressure. To compensate for the resulting low line pressure, a learned fill rate is used for coastdown shifts only. This fill rate is set at the regulated line pressure level with each start-up (because with cold fluid, the pump 200 will maintain the regulated pressure) and it will learn any reduction in the fill rate with each subsequent shift.

Learning fill time with downshifts is similar to upshifts in that the beginning of apply (end of fill time for the apply element) is identified by the ending of a "hold-speed" control maintained by the release element in power-ON shifts. Implicit with this is the necessity of establishing some "hold-speed" control rather than timing an exact application to be described herein. It is also necessary to handle OFF and ON times correctly since the fill event is seldom a continuous ON; the flow rates, mentioned above, provide this capability.

The learn logic for kickdown shifts tracts the instantaneous volume of the apply element and compares that value with the current fill volume such that the apply element is completely filled at the end of the hold-speed region.

Figure 24C:
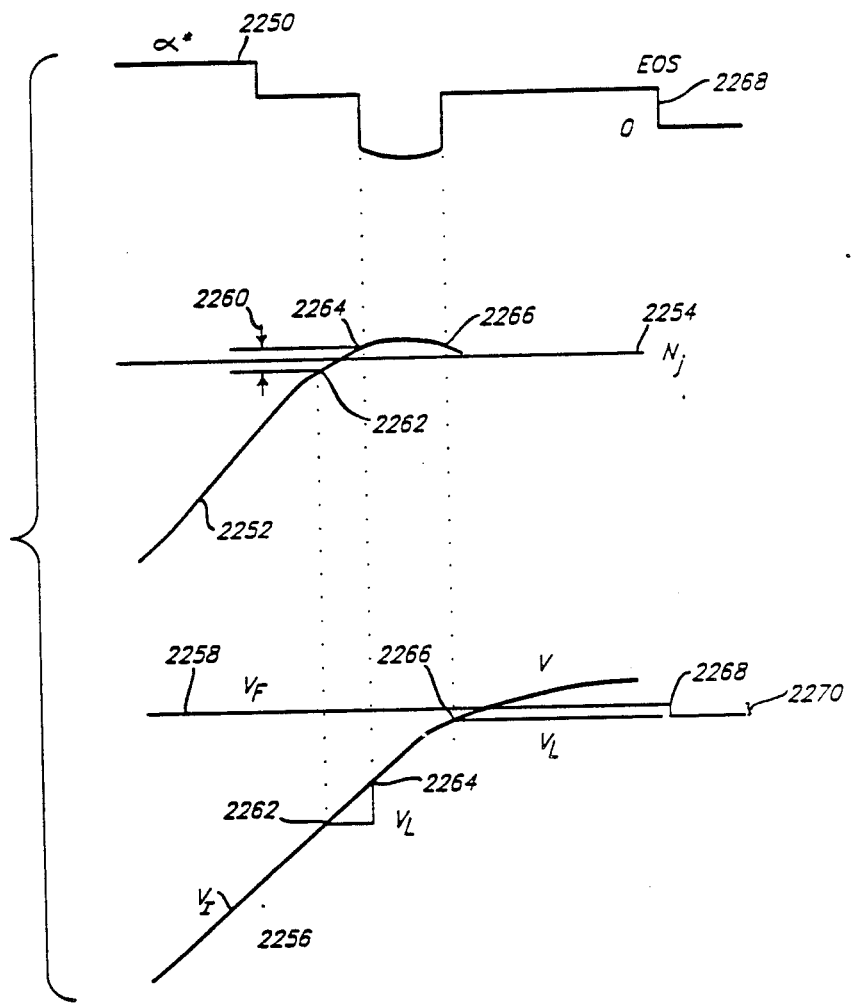

As illustrated in FIG. 24C, curve 2250 represents a desired acceleration ($\alpha^*$) of the turbine 128. Curve 2252 represents turbine speed $N_t$ and curve 2254 represents a target speed $(N_j)$ of the turbine 128. Curve 2256 represents an instantaneous fill volume $(V_I)$ of the apply element and curve 2258 represents the current fill volume $(V_f)$ of the apply element. As $N_t$ approaches $N_j$, $N_t$ comes within a predetermined range 2260 of $N_j$. At point 2263 when $N_t$ reaches the lower limit of the predetermined range 2260, the learned volume $(V_L)$ of the apply element is latched at that volume of the instantaneous fill volume $(V_I)$. Once $N_t$ leaves the upper limit of the predetermined range 2260 at point 2264, the learned volume again tracks the instantaneous fill volume until $N_t$ enters the predetermined region 2260 at point 2266. At point 2266, the learned volume of the apply element is latched at that value of the instantaneous fill volume. At the end of the shift (EOS), the transmission controller 3010 takes a step out of current fill volume $(V_f)$ which is a percentage of the difference between $V_f$ and $V_L$ at point 2266.

Figure 24D:
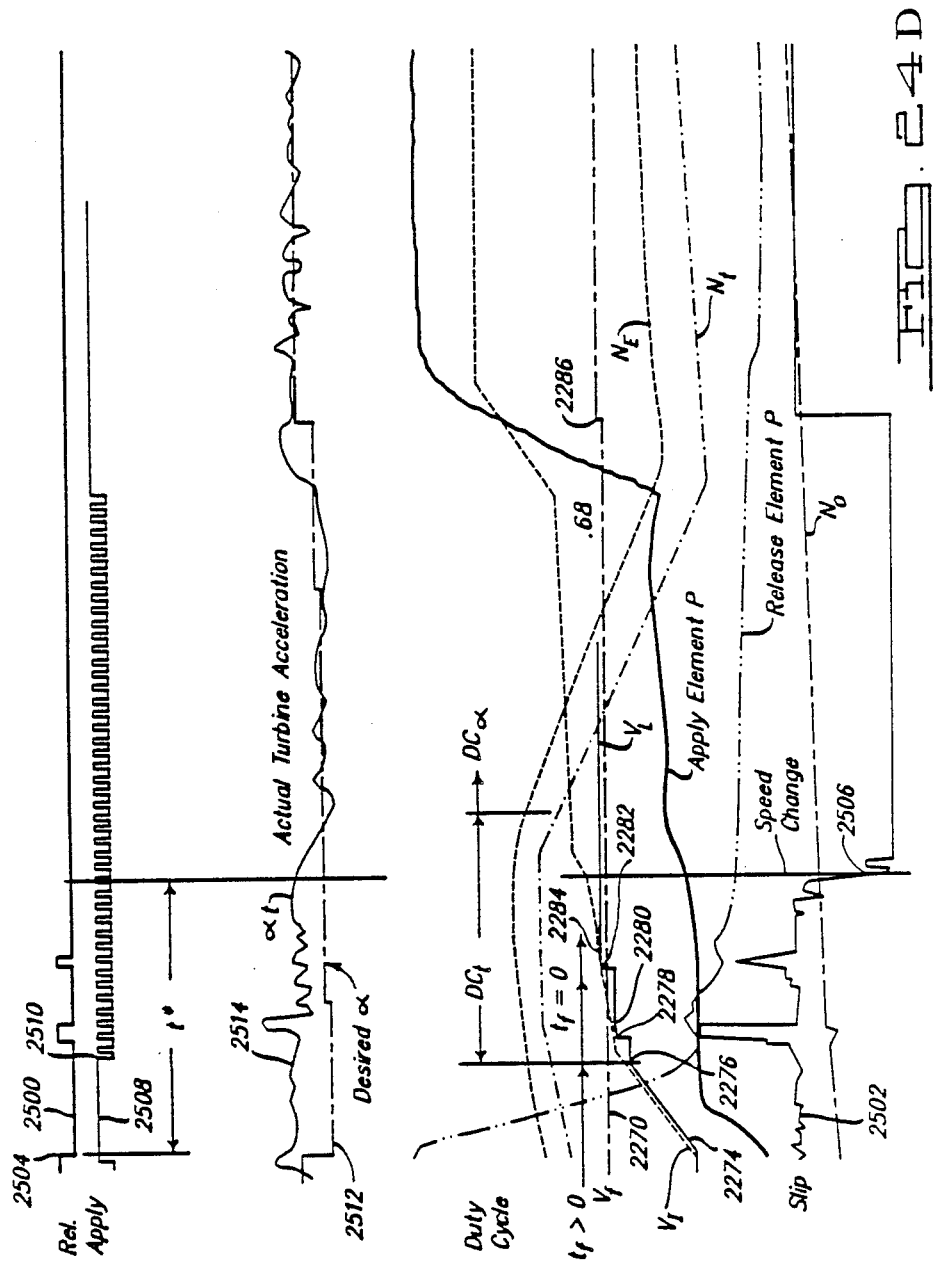

The fill volume $(V_f)$ of the apply element is also "learned" and adaptively adjusted based on bump-along (i.e. element slip). As illustrated in FIG. 24D, a shift tape of the transmission characteristics is shown for a first to second (1-2) upshift. Curve 2270 represents the stored or previously learned current fill volume $(V_f)$ of the apply element. Curve 2272 represents the instantaneous volume $(V_I)$ of the apply element (i.e. two/four shift clutch 308). Curve 2274 represents the learned volume $(V_L)$.

While a shift is in progress, the learned volume $(V_L)$ is set equal to the instantaneous fill volume $(V_I)$ whenever $(t_f>0)$ or $(t_f \neq 0$ and $N_f > N_j + 30)$. As shown in FIG. 24D, $V_L$ tracts $V_I$ until point 2274 because $t_f$ was greater than 0. At point 2276, $t_f$ equals zero and $V_L$ stops tracking V and is set equal to the value of $V_I$ at point 2276. When $t_f = 0$, the apply element is filling in the hold-speed region. If $N_t$ is greater than $N_i$ plus a predetermined value such as 30 (i.e. slip occurs), called bump-along, $V_L$ is updated to the value of $V_I$ at point 2278. At point 2278, $V_L$ again tracks $V_I$ until $N_t$ is not greater than $N_i$ plus the predetermined value at point 2280. At point 2280, $V_L$ is set equal to the value of $V_I$ and stops tracking. This methodology is repeated whenever $N_t$ is greater than $N_i$ plus the predetermined value. At the end of the shift, the transmission controller 3010 compares $V_L$ to $V_f$. If $V_L$ is greater than $V_f$, as shown in FIG. 24D, $V_f$ is adjusted or increased a percentage of difference between $V_L$ and $V_f$. If $V_L$ equals $V_f$, no adjustment is made. Otherwise, if $V_L$ is less than $V_f$, $V_f$ is decreased.

Figure 24E:
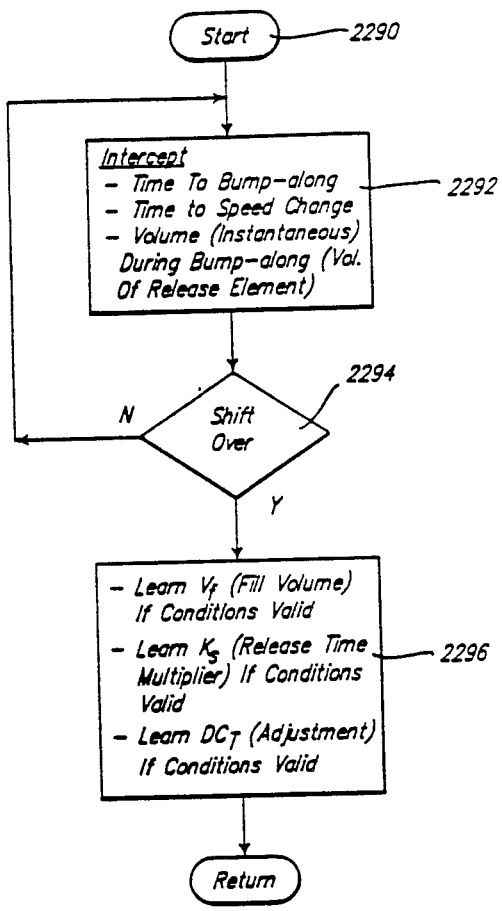

Referring to FIG. 24E, a flow chart of the learn methodology is shown. At the start of the methodology in bubble 2290, the methodology advances to block 2292. At block 2292, the methodology intercepts or determines the time to bump-along, time to speed change, and instantaneous volume during bump-along of the element. The methodology then advances to diamond 2294 and determines whether the shift has been completed. If no, the methodology loops back to block 2292. If the shift has been completed, the methodology advances to block 2296 and learns the fill volume if the conditions are valid, learns $K_s$ (release time multiplier), if conditions are valid and learns $DC_t$ (adjustment) if conditions are valid. From block 2186, the methodology returns.

COASTDOWN METHODOLOGY

The shift schedule (bubble 810 of FIG. 12) has logic which compares engine speed $N_e$ and target speed $N_j$ and delays any coastdown shift that would go from power-ON to power-OFF since these shifts involve crossing drivetrain backlash and may result in a "clunk". The 3-1 and 2-1 shifts are power-ON coastdowns (a 3-2 power-ON coastdown shift is not made); the 4-3 is typically a power-OFF shift (it may be power- ON if the shift is inhibited by the below "backlash" logic).

Figure 24F:
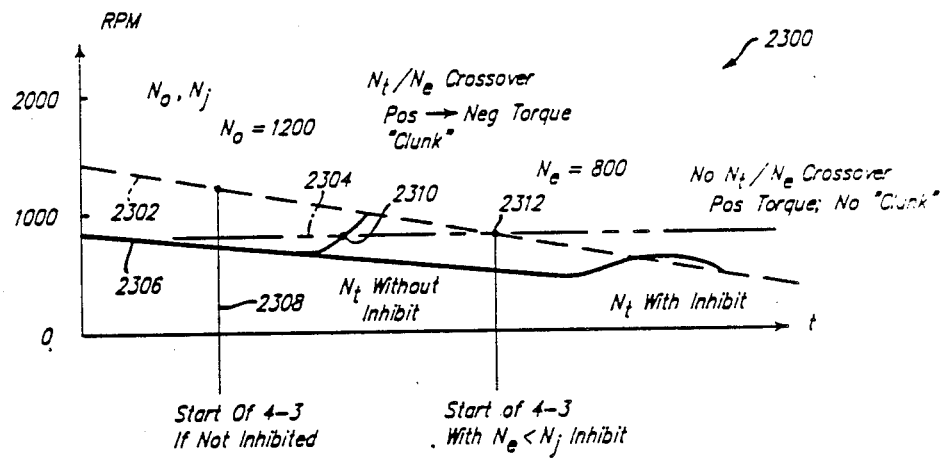

As illustrated in FIG. 24F, a graph of speed (r.p.m.) versus time is shown at 2300 for an adaptive fourth to third (4-3) gear coastdown shift. Curve 2302 represents the output speed $N_o$ or target speed $N_j$ for third gear. Curve 2302 represents the engine speed $N_e$. Curve 2306 represents turbine speed $N_t$.

If a shift is scheduled by the transmission controller 3010 when $N_e$ is less than $N_j$, the start of the 4-3 shift will occur at point 2308. As the shift occurs, $N_t$ will increase and cross over $N_e$, as indicated by point 2310, from positive to negative torque, resulting in a "clunk" of the drivetrain.

The present invention provides the feature of delaying or inhibiting the start of the shift by the transmission controller 3010 until $N_e$ is at least equal to or greater than $N_j$, as indicated by point 2312. This is accomplished by delaying the actuation and/or deactuation (i.e. turning ON and/or OFF) of the appropriate solenoid-actuated valves. By inhibiting the shift, $N_t$ will remain less than $N_e$ during the entire shift, resulting in only positive torque and preventing any "clunk" of the drivetrain.

Figure 24G:
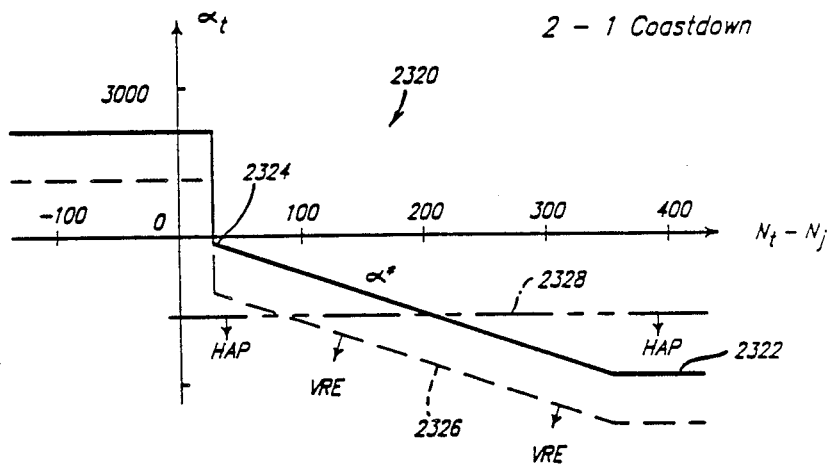

As illustrated in FIG. 24G, a phase plane graph of turbine acceleration (alpha$_t$) versus turbine speed $N_t$ minus target $N_j$ (first gear) for a second to first (2-1) gear coastdown shift is shown at 2320. The solid line curve 2322 represents the desired acceleration (alpha$_{desired}$ or $\alpha^*$) which is a function of slip. Alpha$_{desired}$ goes to a negative value in the hold-speed region of the downshift.

The present invention provides methodology for controlling alpha$_t$ at point 2324 which is approximately 25 r.p.m. This is accomplished by using proportional control (DC$_{alpha}$ or DC$\alpha$). DC$_{alpha}$ is used during coastdown shifts because real tight control hold-speed is needed and is lacking otherwise.

Referring to FIG. 24G, curve 2326 represent the vent release element (VRE) which is identified during a coastdown shift by alpha$_{desired}$ minus a predetermined value such as 1000. VRE is used where the applying element may be ON, or it is desired to vent the release element faster than normal DC$_{alpha}$ would (rather than backing off the release element's duty cycle by DC$_{alpha}$, which would eventually release the element). If actual alpha$_t$ is below VRE curve 2326, as indicated by the arrow, the release element is turned OFF. This would result in actual alpha$_t$ coming back above the VRE curve 2326 if the apply element was not ON. Once alpha$_t$ was above the VRE curve 2326, the methodology would instruct the transmission controller 3010 to turn the release element ON. If the apply element was ON, alpha$_t$ would not come back above the VRE curve 2326.

Referring to FIG. 24G, curve 2328 represents hold the apply pressure (HAP). HAP is used where there is too much negative alpha$_t$. In other words, HAP is used where alpha$_t$ is less than a predetermined value such as −1700. HAP prevents the apply element from applying hard quickly by duty cycling the apply element to maintain it at a predetermined pressure. This prevents the apply element from building up torque any faster in the hold-speed region, causing alpha$_t$ to come back above the HAP curve 2328.

Figure 24H:
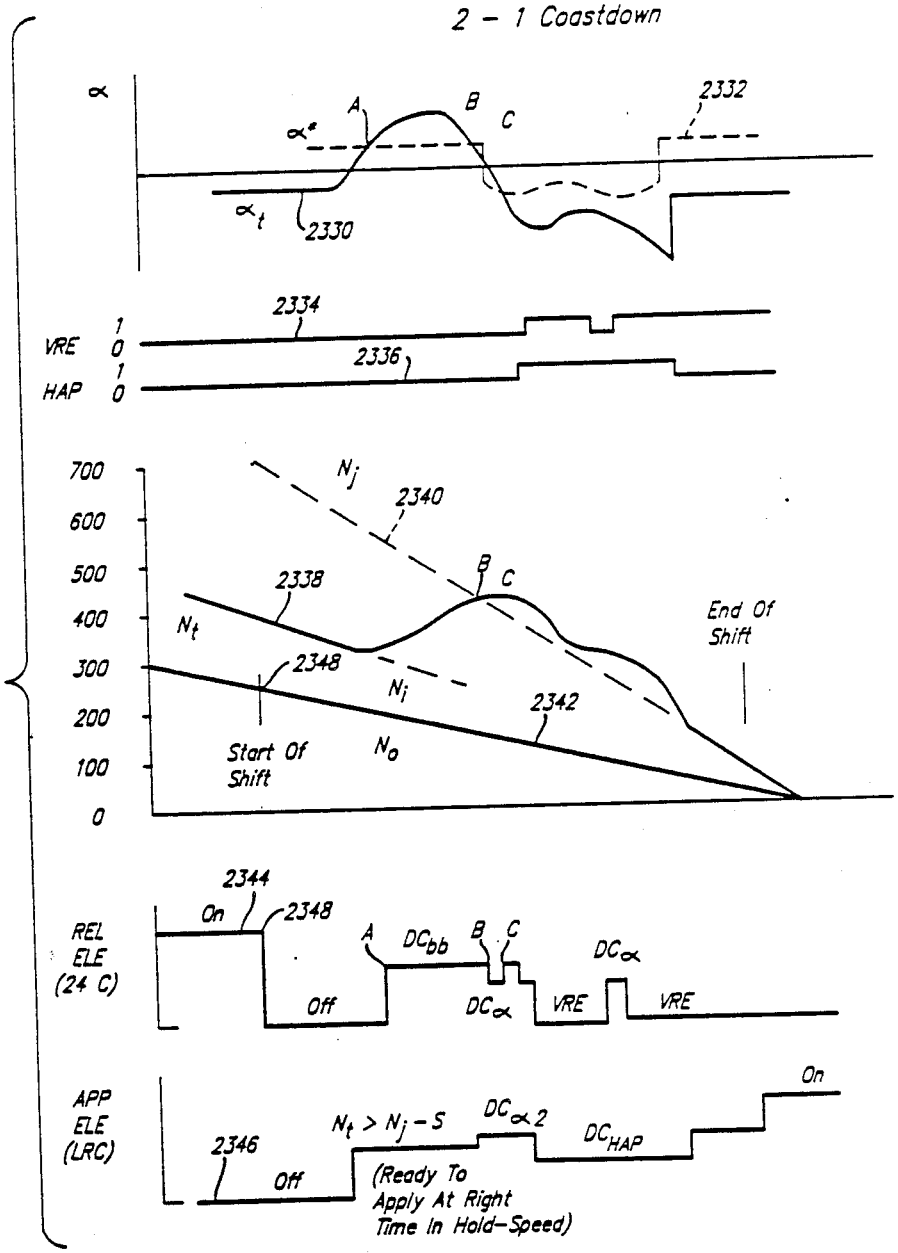

As illustrated in FIG. 24H, a plot of actual turbine acceleration (alpha$_t$) represented by curve 2330 and desired acceleration (alpha$_{desired}$ or $\alpha^*$) represented by curve 2332 is shown for a second to first (2-1) gear coastdown shift. A logic curve 2234 represents VRE and logic curve 2236 represents HAP. A plot of turbine speed $N_t$ represented by curve 2338, target speed $N_j$ represented by curve 2340, and output speed $N_o$ represented by curve 2342 is shown from the start to the end of the second to first gear coastdown shift. Logic curves 2344 and 2346 show the element logic for the release element (two/four shift clutch 308) and the apply element (low/reverse clutch 310), respectively.

Referring to FIG. 24H, the release element is ON until the start of shift at point 2348. At that time, the methodology turns the release element OFF. Simultaneously, the apply element which has been previously OFF is maintained OFF. Also, curve 2338 of $N_t$ is less than curve 2340 of $N_j$.

After the start of shift at point 2348, alpha$_t$ starts to rise or increase. When alpha$_t$ crosses alpha$_{desired}$ at point A (wait until slip), the release element is turned ON or reapplied using duty cycle bang-bang (DC$_{bb}$). DC$_{bb}$ is used until alpha$_t$ again crosses alpha$_{desired}$ at point B. Also, $N_t$ crosses $N_j$ at point B. At point B, the release element switches from DC$_{bb}$ to proportional control (DC$_{alpha}$ or DC$\alpha$).

Referring to FIG. 24H, the apply element comes on before point B to be ready at the right time into hold-speed region (starts at point C). At point C, alpha$_{desired}$ enters the hold-speed region. The release element against switches to DC$_{bb}$ while the apply element is under DC$_{alpha}$. If alpha$_t$ goes too far below alpha$_{desired}$, VRE is applied as previously described. Alternatively, if alpha$_t$ is below the HAP value, HAP will be applied as previously described. Thus, $N_t$ is matched to $N_j$ and alpha$_t$ is matched to alpha$_{desired}$ at the end of the shift by using DC$_{bb}$, DC$_{alpha}$, VRE and/or HAP.

Figure 24I:
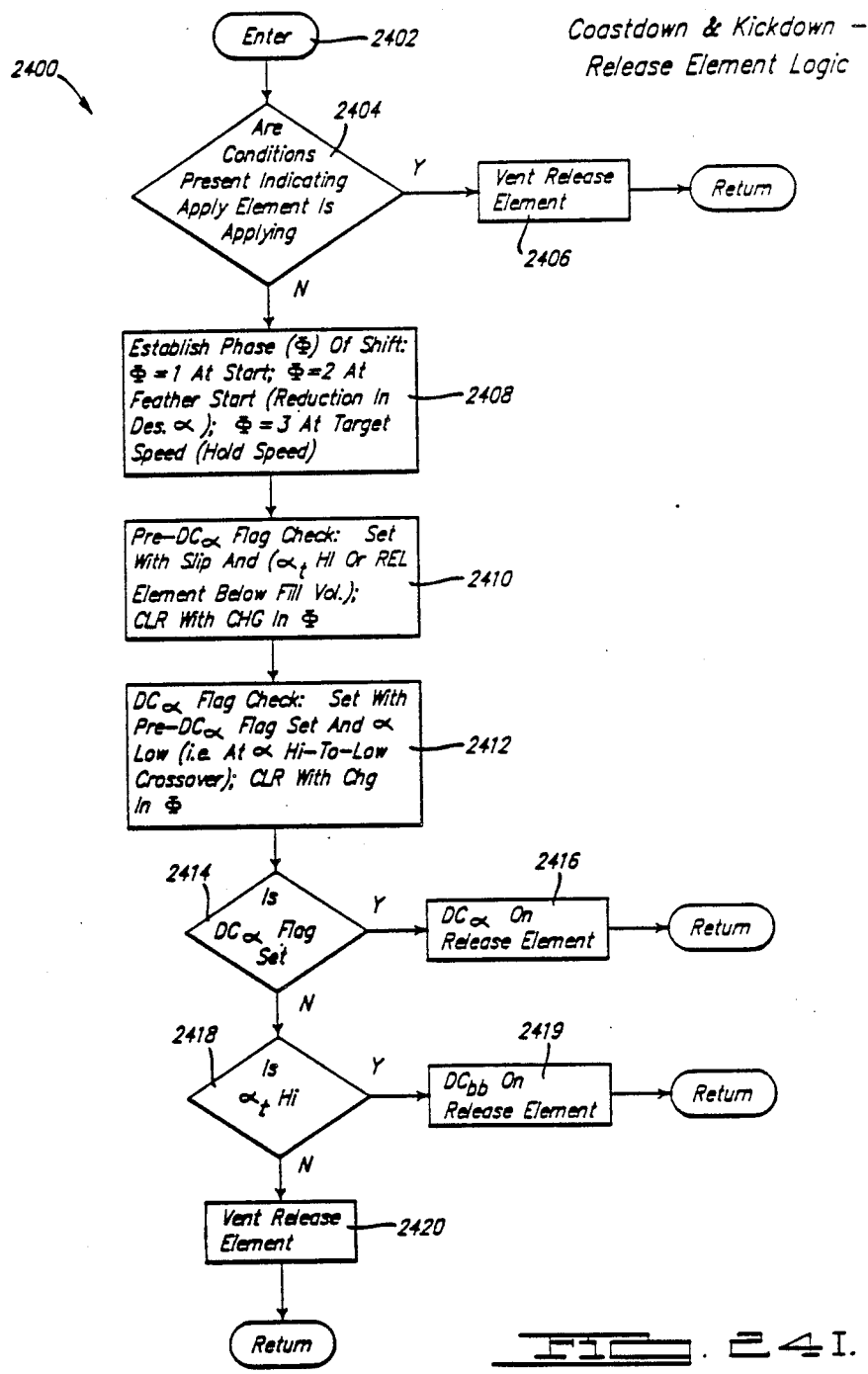

Referring to FIG. 24I, the methodology for the release element used during a coastdown or kickdown shift is generally shown at 2400. The methodology enters through bubble 2402 and advances to diamond 2404. At diamond 2404, the methodology determines whether the conditions are present indicating that the apply element is applying. In other words, are conditions present for VRE (i.e. THR < 5° and alpha$_t$ < alpha$_{desired}$ − 1000). If that criteria is not true, the methodology advances to block 2406 and vents the release element (applies VRE). The methodology then returns. If that criteria is not true, the methodology advances to block 2408 and establishes the phase of the shift: phase 1 equals the start; phase 2 equals the feather start (reduction in desired acceleration); and phase 3 equals target speed (hold-speed). This is accomplished by performing speed calculations and setting a flag for each phase of the shift. The methodology then advances to block 2410 and performs a pre-DC$_{alpha}$ flag check by setting the flag with slip and alpha$_t$ is HI or the release element is below fill volume, and clearing the flag with a change in the phase of the shift. The methodology then advances to block 2412 and performs a duty cycle$_{alpha}$ flag check. The methodology sets the DC$_{alpha}$ flag when the pre-DC$_{alpha}$ flag has been set and alpha is LOW (i.e. alpha$_t$, high-to-low crossover) and it cleared with the change in phase of the shift. The methodology then advances to diamond 2414 and determines whether the DC$_{alpha}$ flag has been set. If the flag has been set, the methodology advances to block 2416 and uses DC$_{alpha}$ control or DC$_{alpha}$ on release element. DC$_{alpha}$ control is when the total period is fixed and the ON and OFF time is calculated and adjusted (i.e. variable ON and OFF time). The methodology then returns. If the flag has not been set, the methodology advances to diamond 2418 and determines whether alpha$_t$ is HI. If that criteria is true, the methodology advances to block 2418 and performs $DC_{bang-bang}$ control or $DC_{bb}$ on the release element and returns. $DC_{bb}$ control is when the total period is fixed and the ON and OFF time is fixed (e.g. at 60% ON). If that criteria is not true, the methodology advances to block 2420 and vents the release element and returns.

Figure 24J:
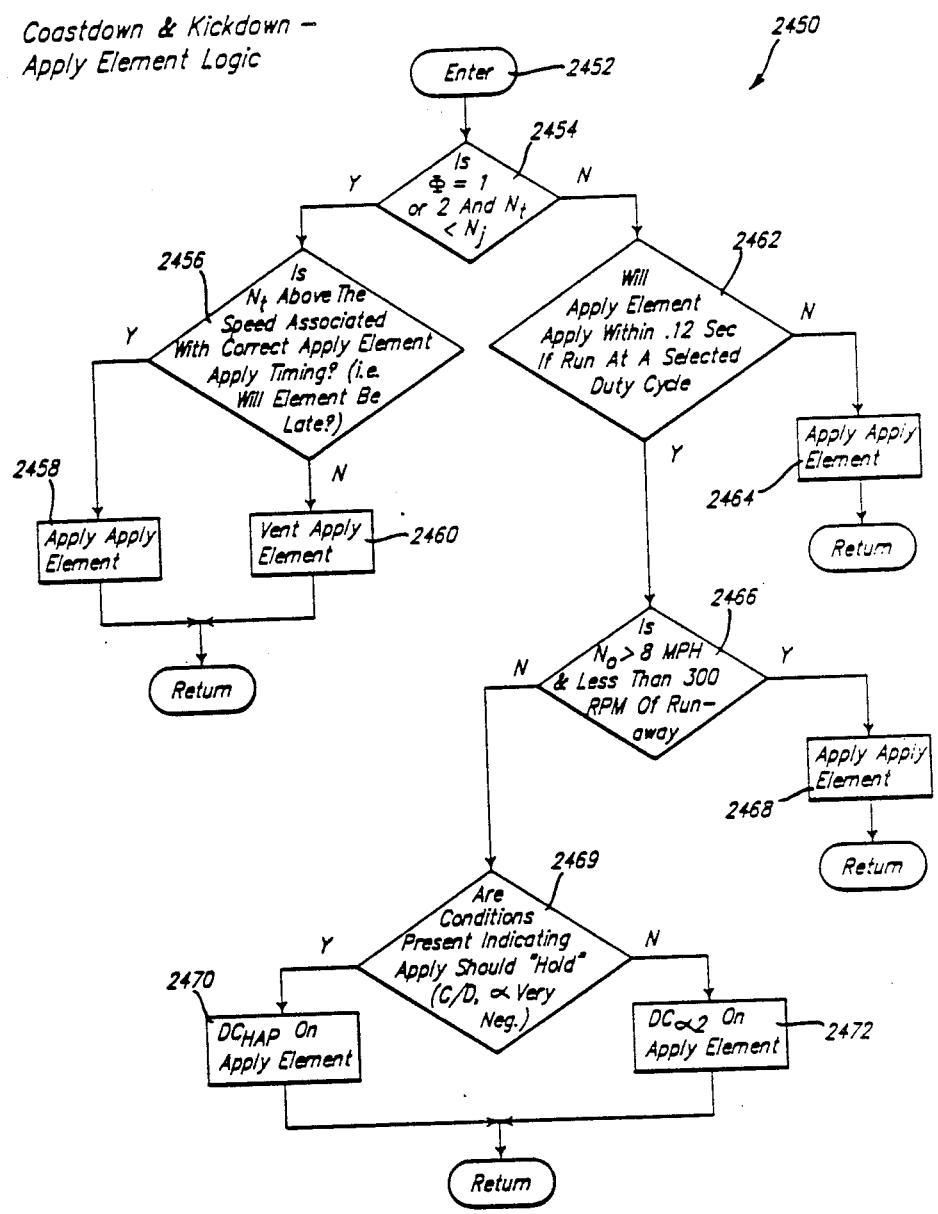

Referring to FIG. 24J, the methodology for the apply element is generally shown at 2450 for coastdown or kickdown shift. The methodology enters through bubble 2452 and advances to diamond 2454. At diamond 2454, the methodology determines whether the phase of the shift is equal to one or two and $N_t$ is less than $N_j$. If any of this criteria is true, the methodology advances to diamond 2456 and determines whether $N_t$ is above the speed associated with the correct apply timing (i.e. will element be late). In other words, the methodology determines whether $N_t$ is greater than S (kickdown start valve previously described). If that criteria is true, the methodology advances to block 2458 and applies the apply element and returns. If that criteria is not true, the methodology advances to block 2460 and vents the apply element and returns.

At diamond 2454, if any of that criteria is not true, the methodology advances to diamond 2462 and determines whether the apply element will apply within 120 ms if run at a predetermined duty cycle by looking at the fill volume ($V_f$). If that criteria is not true, the methodology advances to block 2464 and applies the apply element and returns. If that criteria is true, the methodology advances to diamond 2466 and determines whether vehicle speed or $N_o$ is greater than a predetermined speed such as 8 mph and less than 300 r.p.m. of run away for the turbine 128. If that criteria is true, the methodology advances to block 2468 and applies the apply element and returns. If that criteria is not true, the methodology advances to diamond 2468 and determines whether conditions are present indicating apply element should "hold" (for a coastdown, alpha$_t$ very negative). In other words, the methodology determines whether the conditions are present to apply HAP (i.e. THR<5° and $\alpha_t < -1700$). If that criteria is true, the methodology advances to block 2470 and performs $DC_{HAP}$ on the apply element and returns. If that criteria is not true, the methodology advances to block 2472 and performs $DC_{alpha2}$ (secondary element DC acceleration control) on the apply element and returns.

Another feature of the present invention used during a coastdown shift is a methodology called "wait-for-slip". At the beginning of the coastdown shift, the release element is vented. Whenever slip is present (i.e. $N_t \neq N_j$) and $V_I < V_f$ for the release element and $V < V_f$ for the apply element, and THR≧5° or 2-1 or 3-2 or 3-1 shift is occurring, the methodology controls the release element at a low limit percent ON for its $DC_{alpha}$. The methodology attempts to keep the release element from further venting because the release element may be needed to apply again. Once, the above conditions are no longer present, the release element continues to vent.

ACCUMULATOR CONTROL

As illustrated in FIGS. 5A–L, the hydraulic system 600 includes accumulators 630, 640, 642, 644 for the clutch assemblies 302, 304, 308 and 310, respectively. The accumulators provide mechanical cushion so that extreme changes in pressure are not realized as the solenoid-actuated valves are turned ON or OFF. These accumulators help reduce the axial length of the transmission 100 and give more flexibility to the hydraulic system. This is advantageous over prior systems which used large cushion springs built in the clutch packs, increasing the axial length of the transmission.

As illustrated in FIG. 24K, a curve 2480 of pressure versus time for applying and venting (releasing) of an element or clutch is shown. The accumulator control zone, represented by part 2482 of the curve 2480, provides compliance or softness so that it takes time to develop a large change in pressure. Otherwise, if no accumulator was used, the slope of this part of the curve would be steeper and a small change is ON time would result in a large change in pressure, making torque capacity and shift quality unbearable.

In other words, control is performed in the accumulator control zone to prevent large excursions in the output torque ($T_o$) which would create jerkiness or harshness in shift quality. For example, turning the release element ON during slip or bump-along without an accumulator would produce a steeper slope in the output torque, resulting in an inability to limit slip without harsh control.

TORQUE PHASE SHIFT CONTROL METHODOLOGY

The learned term for apply rate is torque phase duty cycle, $DC_t$. The purpose of the torque phase duty cycle is to make the hand-off smooth between the release element letting go of torque and the apply element taking over torque. This is accomplished by timing the apply element to have sufficient capacity to start the speed change just as the release element capacity reaches zero. In other words, the methodology attempts to build-up apply element torque capacity to match torque fall-off capacity of the release element.

The torque phase duty cycle is adaptively adjusted to match torque build-up of the apply element to torque fall-off of the release element according to the following equation:

$$DC_t = DC_{tt} + DC_{ta} + \text{delta} +$$

$$10\% \begin{cases} 10\% \text{ with } N_t < N_j - B \text{ \& } THR > 10° \\ 0\% \text{ with } N_t \geq N_j - B \text{ or } THR \leq 10° \end{cases}$$

Where:  THR = throttle angle
 B = slip (40 r.p.m.)

The above equation is based on a table value, $DC_{tt}$ or nominal $DC_t$ values (fixed % ON time) based on throttle angle, plus a learned adjustment, $DC_{ta}$. Since the intent is to have the speed change begin as the release element net-apply-pressure reaches zero, the methodology selects a $DC_t$ which will achieve the start of speed change at an interval after the start of venting of the release clutch. This interval is equal to the learned time to release at zero degrees throttle angle plus an allowance for one bump-along cycle. The transmission controller 3010 does this by achieving and maintaining $t_f$ equal to zero until slip occurs, then $DC_t$ is allowed to proceed.

Referring to FIG. 24D, curve 2500 represents the logic state of the release element. Curve 2502 represents slip in the transmission 100. At point 2504 on curve 2500, the release element is turned OFF or starts to vent. The interval between the start of vent at point 2504 until the start of speed change, which is point 2506 on curve 2502, is known as t* which is a predetermined value different for each upshift. Curve 2508 represents the logic state of the apply element. At point 2510 on curve 2508, the apply element is initially turned OFF or vented. At point 2510, $t_f$ is equal to zero and $DC_t$ starts for the apply element.

The slope of $DC_t$ is tailored so that it matches the build-up in apply element torque capacity. For throttle angles greater than 10°, the apply element is given a 10% boost in its duty cycle so that the actual turbine acceleration (alpha$_t$ or $\alpha_t$) will achieve the desired acceleration (alpha$_{desired}$ or $\alpha^*$).

As illustrated in FIG. 24D, curve 2512 represents the desired acceleration (alpha$_{desired}$) and curve 2514 represents the actual turbine acceleration (alpha$_t$). At point 2506 on curve 2502, the speed change begins. Alpha$_t$ is greater than alpha$_{desired}$. Therefore, $DC_{ta}$ adds 10% boost in ON time to $DC_t$ for the apply element such that alpha$_t$ will be momentarily equal to alpha$_{desired}$ at or near the end of $DC_t$.

As shown and described above, $DC_{ta}$ is the learned adjustment to $DC_t$. $DC_{ta}$ is used so that the start of the speed change from the initial release occurs within a predetermined time period called time to start speed change ($t_n$). This time is when it is desired to have the speed change begin because the release element pressure will have decayed down to the fill pressure such that no torque capacity is on the element. Otherwise, if the speed change begins earlier or prior to this time, fight will occur because both the apply and release element have capacity. $t_n$ is defined as follows:

$t_n = t_t - t_v$ at the end of shift, where:
$t_t$ = value of time 't' with $N_t \geq N_i -$ $B$ or previous value of $t_t$ with $N_t < N_i - B$ $t_v$ = value of time 't' at initial venting of rlease element or last occurrence of $V \geq V_f + V_a$ for release element Initially, $DC_{ta}$ is equal to zero (i.e. battery disconnect). Then, $DC_{ta}$ is defined as follows:

$DC_{ta} = DC_{ta} + 1.2\%$, with $t_n > t^{*a} + .028$ $DC_{ta} - 1.2\%$, with $t_n < t^{*a} + .028$ In the above equation, $t^{*a}$ is an adjusted value of t* (a predetermined table value) based on a learned value of $K_s$. $K_s$ is used to predict where the first cycle of bump-along occurs because of changes in temperature. $K_s$ is used to adjust t* based on temperature so that start of $DC_t$ for the apply element occurs just prior to the first bump-along cycle.

Referring to the equation for $DC_t$, a delta term is used when the transmission system has not learned out properly the above variables. If t* is less than the start of speed change at point 2506 on curve 2502, the % ON time for $DC_t$ is increased or incremented until the start of speed change begins at the end of t*. Thus, the delta term provides added protection by reacting immediately.

GARAGE SHIFT METHODOLOGY

Figure 24L:
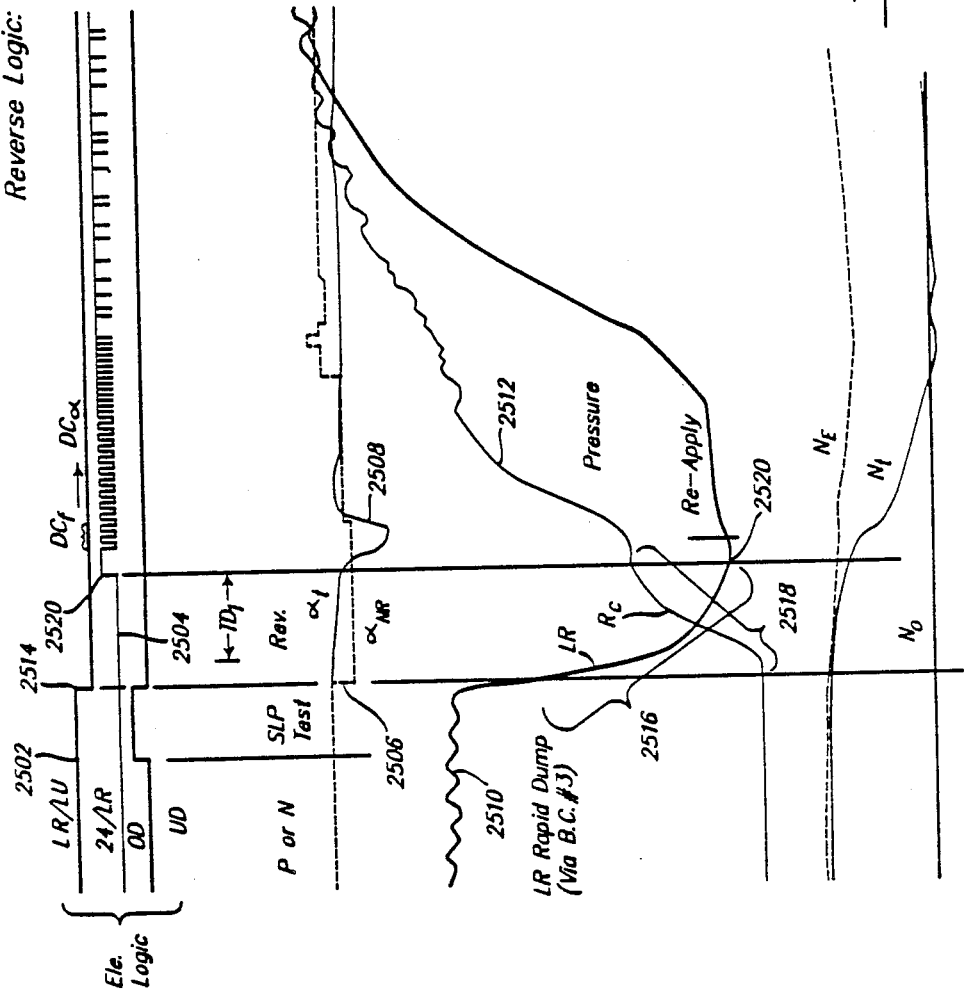

Referring to FIG. 24L, a shift tape representation of various characteristics of the transmission 100 is shown. Curve 2502 represents the logic state of the apply element and curve 2504 represents the logic state of the release element. Curve 2506 represents the desired acceleration (alpha$_{desired}$) and curve 2508 represents the actual turbine acceleration (alpha$_t$). Curve 2510 represents the pressure of low/reverse element and curve 2512 represents the pressure of the reverse element.

When the manual valve 604 is shifted to reverse R, the low/reverse element starts to vent. The low/reverse clutch solenoid-actuated valve 636 is turned OFF as indicated by point 2514 on curve 2502. The pressure in the low/reverse element starts to decrease or decay as shown by part 2516 of curve 2510. During this time, the reverse element is filling and the pressure starts to increase as shown by part 2518 of curve 2512. When the pressure in the low/reverse element has decayed to a fairly low level as indicated by point 2520 on curve 2510, the low/reverse element is reapplied under DC control at point 2520 on curve 2504.

ON-BOARD DIAGNOSTICS

The on-board diagnostics provide diagnostic test routines to quickly identify control problems. An example of such diagnostics is found in U.S. Pat. No. 4,612,638, issued Sept. 16, 1986, in the name of Kissel, which is hereby incorporated by reference. The transmission controller 3010 also includes a set of diagnostics to isolate transmission problems.

Figure 25A:
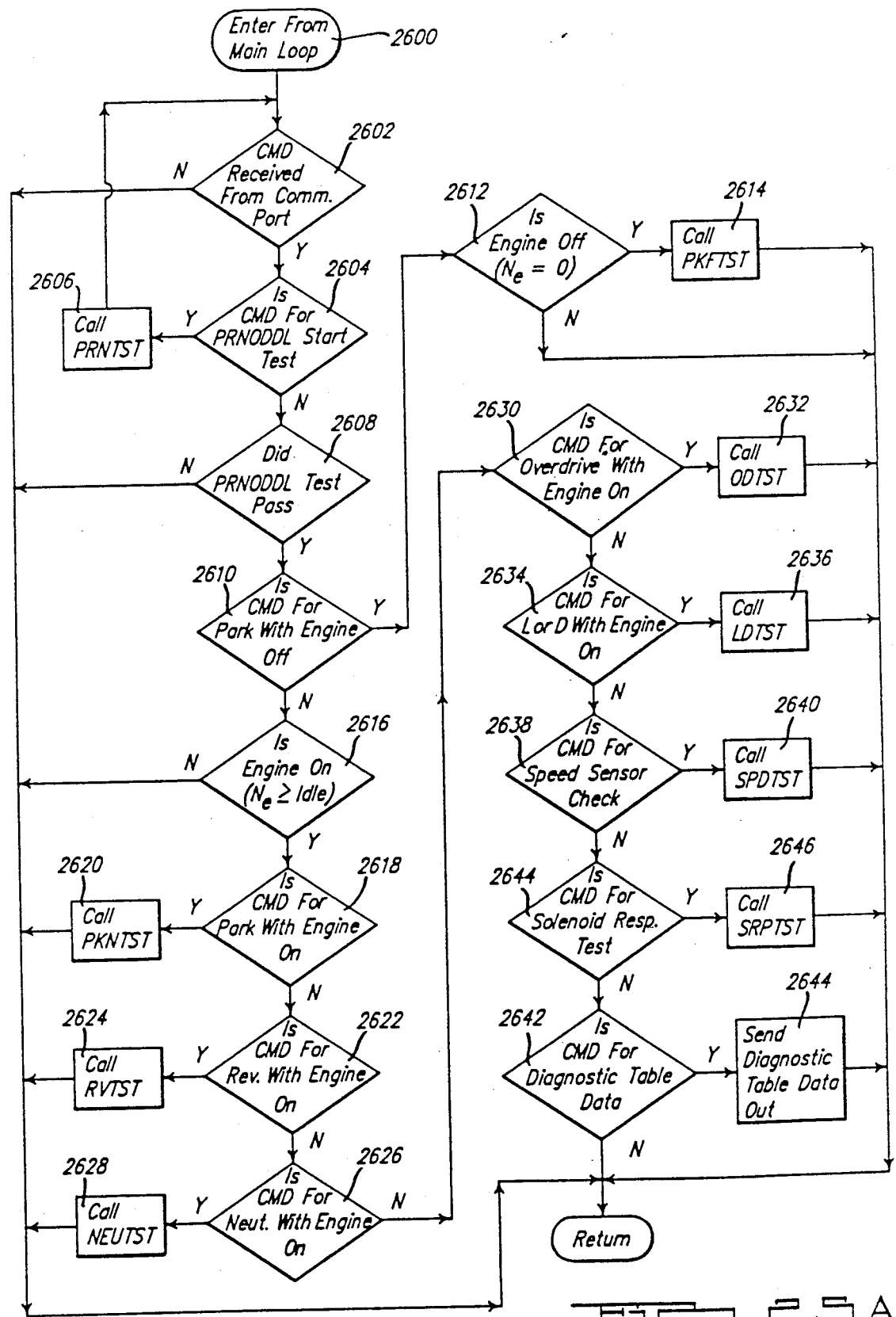

Referring to FIG. 25A, the methodology for the on-board diagnostics is shown. At the start of the methodology in bubble 2600, the methodology advances to diamond 2602 and determines whether a command (CMD) was received by looking for a string of bytes from a communications port on the transmission controller 3010. If a command was not received, the methodology advances to block 2642 to be described herein. If a command was received, the methodology advances to diamond 2604 and determines whether the command received was for a PRNODDL start test. If the command received was for a PRNODDL start test, the methodology advances to block 2606 and calls the PRNODDL test routine or methodology to be described (See FIG. 25B). The methodology then returns to diamond 2602.

At diamond 2604, if the command received was not for a PRNODDL start test, the methodology advances to diamond 2608 and determines whether the PRNODDL test passed by looking for a flag for example. If the PRNODDL test did not pass, the methodology advances to block 2642. If the PRNODDL test did pass, the methodology advances to diamond 2610 and determines whether the command received is for a solenoid/pressure switch test routine based on the transmission 100 operating in park P with the engine of the vehicle off by looking for a coded output or a flag for example. If the command was received, the methodology advances to diamond 2612 and determines whether the engine is off ($N_e=0$). If the engine is not off, the methodology advances to block 2642. If the engine is off, the methodology advances to block 2614 and calls the park engine-off test to be described (See FIG. 25C).

At diamond 2610, if the command received was not for the park with the engine off solenoid/pressure switch test, the methodology advances to diamond 2616 and determines whether the engine is on ($N_e$ is greater than or equal to a predetermined value such as idle speed). If that criteria is not true, the methodology advances to block 2642. If that criteria is true, the methodology advances to diamond 2618 and determines whether the command received was for a solenoid/pressure switch test routine based on the transmission 100 operating in park with the engine on ($N_e$ greater than or equal to the engine idle speed). If the command was received, the methodology advances to block 2620 and calls the park engine test to be described (See FIG. 25D). The methodology then advances to block 2642.

At diamond 2618, if the command received was not for park with the engine on solenoid/pressure switch test, the methodology advances to diamond 2622 and determines whether the command received was for a solenoid/pressure switch test routine based on the transmission 100 operating in reverse with the engine on. If that criteria is true, the methodology advances to block 2624 and calls the reverse test to be described (See FIG. 25E). The methodology then advances to block 2642.

At diamond 2622, if the command received was not for reverse with the engine on, solenoid/pressure switch test, the methodology advances to diamond 2626 and determines whether the command received was for a solenoid/pressure switch test routine based on the transmission 100 operating in neutral with the engine on. If that criteria is true, the methodology advances to block 2628 and calls the neutral test to be described (See FIG. 25F). The methodology then advances to block 2642.

At diamond 2626, if the command received was not for neutral with the engine on solenoid/pressure switch test, the methodology advances to diamond 2630 and determines whether the command received was for a solenoid/pressure switch test routine based on the transmission 100 operating in overdrive with the engine on. If that criteria is true, the methodology advances to block 2632 and calls the overdrive test to be described (See FIGS. 25G and 25H). The methodology then advances to block 2642.

At diamond 2630, if the command received was not for overdrive with the engine on solenoid/pressure switch test, the methodology advances to diamond 2634 and determines whether the command received was for a solenoid/pressure switch test routine based on the transmission 100 operating in low or drive with the engine on. If that criteria is true, the methodology advances to block 2636 and calls the low/drive test to be described (See FIG. 25I). The methodology then advances to block 2642.

At diamond 2634, if the command received was not for low or drive with engine on solenoid/pressure switch test, the methodology advances to diamond 2638 and determines whether the command received was for a speed sensor test made with the engine on. If that criteria is true, the methodology advances to block 2640 and calls the speed sensor test to be described (See FIG. 25J). The methodology then advances to block 2642.

At diamond 2638, if the command received was not for a speed sensor test, the methodology advances to diamond 2644 and determines whether the command received was for a solenoid response test. If the command received was for a solenoid response test, the methodology advances to block 2646 and calls the solenoid response test to be described (See FIG. 25K). Once this has been completed, or the command received was not for a solenoid response test, the methodology advances to diamond 2262. At diamond 2262, the transmission controller 3010 determines whether the command received was for diagnostic table data. If yes, the methodology advances to block 2644 and sends out diagnostic table data such as $N_e$, $N_t$ and $N_o$ from the transmission controller 3010 to another electronic device. The methodology then returns. If the command was not for diagnostic table data, the methodology returns.

Figure 25B:
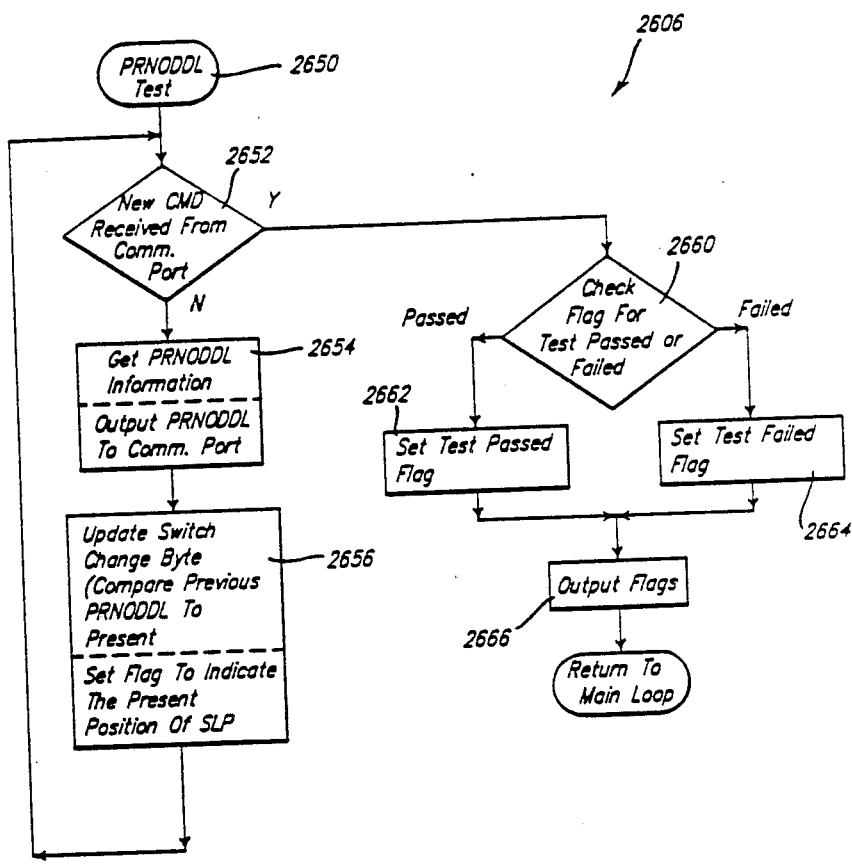

Referring to FIG. 25B, the methodology for the PRNODDL test routine or methodology in block 2606 of FIG. 25A is shown. This methodology checks the operation of the PRNODDL contact switch sensors ($NS_1$, $NS_2$, $RL_1$, $RL_2$) previously described. At the start of the test in bubble 2650, the methodology advances to diamond 2652 and determines whether a new command was received from the communications port as previously described. If a new command was not received, the methodology advances to block 2654 and gets the information as to the position of the manual lever 578 (i.e. park P) (See FIG. 19) as previously described. The methodology then advances to block 2656 and updates the memory of the transmission controller 3010 and compares the previous position of the manual lever 578 to the present position to determine a match. The methodology also sets a flag in the PRNODDL start test to indicate the present position of the shift lever (SLP) or manual lever 578. The methodology then returns to diamond 2652.

At diamond 2652, if a new command was received, the methodology advances to diamond 2660 and checks the PRNODDL status for whether the test was passed or failed. If the test passed, the methodology advances to block 2662 and sets a test passed bit or flag. If the test failed, the methodology advances to block 2664 and sets a test failed flag. The methodology advances from blocks 2662 and 2664 to block 2666 and outputs the flags to a diagnostic readout box (DRB) or the like. The methodology then returns to the main loop.

Figure 25C:
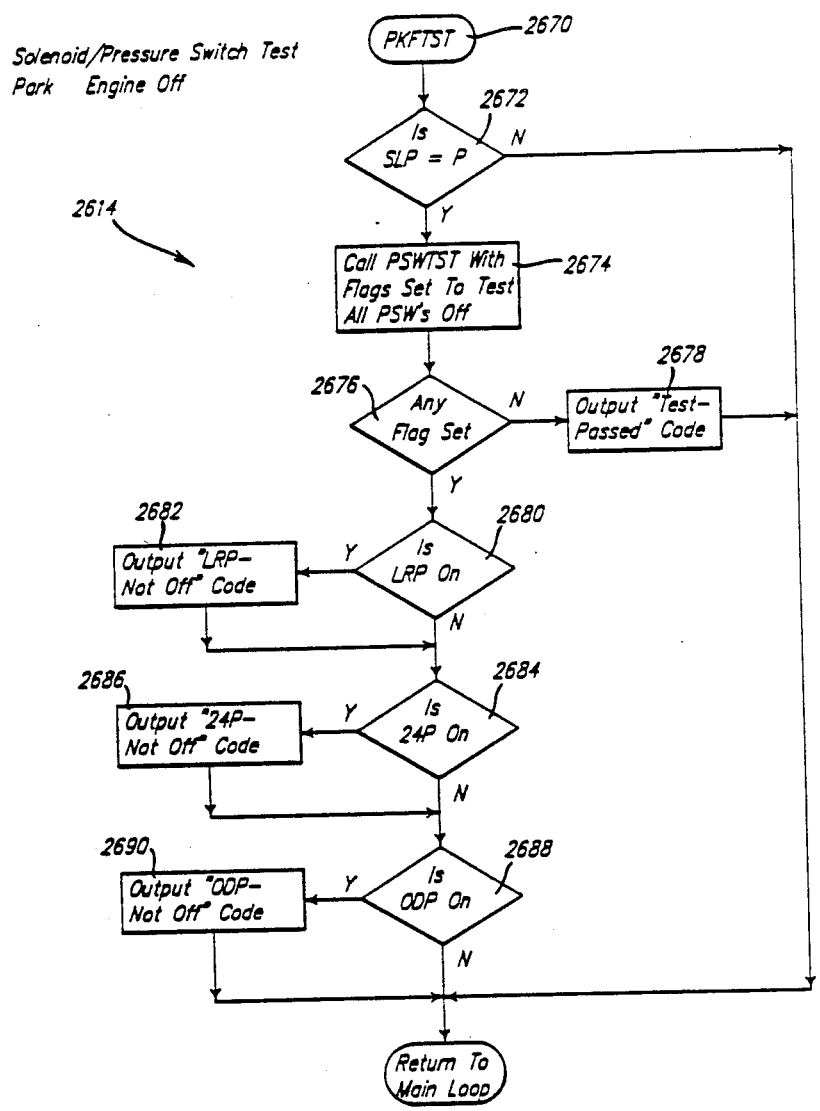

Referring to FIG. 25C, the solenoid/pressure switch test for the transmission 100 operating in park with engine off routine or methodology in block 2614 of FIG. 25A is shown. The methodology is used to check the operation of the solenoid-actuated valves 630, 632, 634 and 636 and pressure switches 646, 648 and 650 (FIGS. 5A–L). At the beginning of the methodology in bubble 2670, the methodology advances to diamond 2672 and determines whether the shift lever position (SLP) 606 is park P as previously described. If the SLP 606 is not park, the methodology returns to the main loop. If the SLP 606 is park, the methodology advances to block 2674 and calls the pressure switch test routine or methodology, previously described in connection with FIGS. 21A and 21B, to test all pressure switches 646, 648 and 650. The methodology then advances to diamond 2676 and determines whether any flags were set. If no flags were set, the methodology advances to block 2678 and outputs a "test-passed" code to the DRB. The methodology then returns to the main loop.

At diamond 2676, if any of the flags are set, the methodology advances to diamond 2680 and determines whether the low/reverse pressure switch 650 is on or pressurized by checking on input port to see if ON or OFF. If that criteria is true, the methodology advances to block 2682 and outputs a code that the "low/reverse pressure switch not off" to the DRB. The methodology advances from block 2682 to diamond 2684. At diamond 2684, the methodology determines whether the two/four pressure switch 648 is on or pressurized as previously described. If that criteria is true, the methodology advances to block 2686 and outputs a code that "two/four pressure switch is not off". The methodology then advances to diamond 2688 and determines whether the overdrive pressure switch 646 is on or pressurized as previously described. If that criteria is not true, the methodology returns to the main loop. If that criteria is true, the methodology advances to block 2690 and outputs a code that the "overdrive pressure switch is not off". The methodology then returns to the main loop.

Figure 25D:
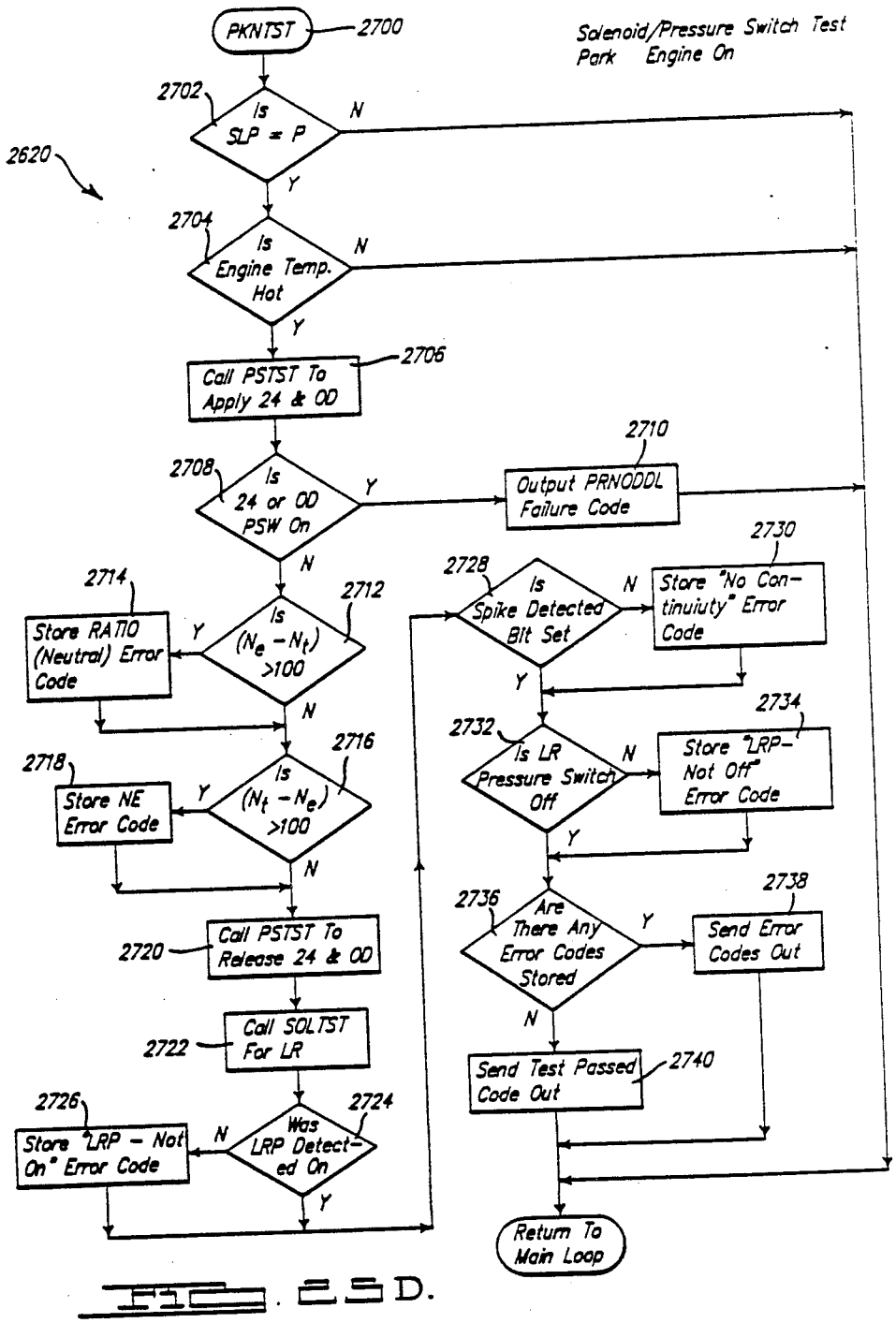

Referring to FIG. 25D, the methodology for the solenoid/pressure switch test for the transmission 100 operating in park with engine on (i.e. $N_e$ greater than a predetermined value) of block 2620 of FIG. 25A is shown. At the beginning of the methodology in bubble 2700, the methodology advances to diamond 2702 and determines whether the SLP 606 is park P as previously described. If the SLP 606 is not park, the methodology returns to the main loop. If the SLP 606 is park, the methodology advances to diamond 2704 and determines whether the engine temperature is hot, from the transmission temperature routine as previously described, by looking for a flag for example. If the engine temperature is not hot, the methodology returns to the main loop. If the engine temperature is hot, the methodology advances to block 2706 and calls the pressure switch test previously described to apply the two/four 648 and overdrive 646 pressure switches. The methodology then advances to diamond 2708 and determines whether the two/four 648 or overdrive 646 pressure switch is on or pressurized as previously described. If either pressure switch is on, the methodology advances to block 2710 and outputs "PRNODDL failure" code to the DRB. The methodology then returns to the main loop.

At diamond 2708, if the two/four 648 or overdrive 646 pressure switch is not on or pressurized, the methodology advances to diamond 2712 and determines whether the difference between $N_e$ and $N_t$ is greater than a predetermined value such as 100 r.p.m. If that criteria is true, the methodology advances to block 2714 and stores in memory the ratio "neutral" error code. Once this has been accomplished or the difference is not greater at diamond 2712, the methodology advances to diamond 2716 and determines whether the difference between $N_t$ and $N_e$ is greater than a predetermined value such as 100 r.p.m. If that criteria is true, the methodology advances to block 2718 and stores in memory an engine speed "$N_e$" error code. Once this has been accomplished or the difference is not greater at diamond 2716, the methodology advances to block 2720 and calls the pressure switch test to release the two/four 648 and overdrive 646 pressure switches. The methodology then advances to block 2722 and calls a solenoid test for the low/reverse solenoid-actuated valve 636. The solenoid test in an internal routine which turns the solenoid ON or OFF to check for pressure and spike response. The methodology then advances to diamond 2724 and determines whether the low/reverse pressure switch 650 was on or pressurized. If the pressure switch 650 is not on, the methodology advances to block 2726 and stores in memory an error code that the "low/reverse pressure switch not on". The methodology then advances to diamond 2728. At diamond 2728, the transmission controller 3010 determines whether a spike detected bit or flag (i.e. flyback voltage) was set. If the spike detected bit or flag was not set, the methodology advances to block 2730 and stores in memory a "no continuity" error code. The methodology then advances to diamond 2732.

At diamond 2732, the transmission controller 3010 determines whether the low/reverse pressure switch 650 is off or not pressurized. If that criteria is not true, the methodology advances to block 2734 and stores in memory an error code that the "low/reverse pressure switch not off". The methodology then advances to diamond 2736.

At diamond 2736, the transmission controller 3010 determines whether any error codes are stored. If any error codes are stored, the methodology advances to block 2338 and sends out the error codes to the DRB. The methodology then returns to the main loop. If there are no error codes stored, the methodology advances to block 2740 and sends out a "test-passed" code. The methodology then returns to the main loop.

Figure 25E:
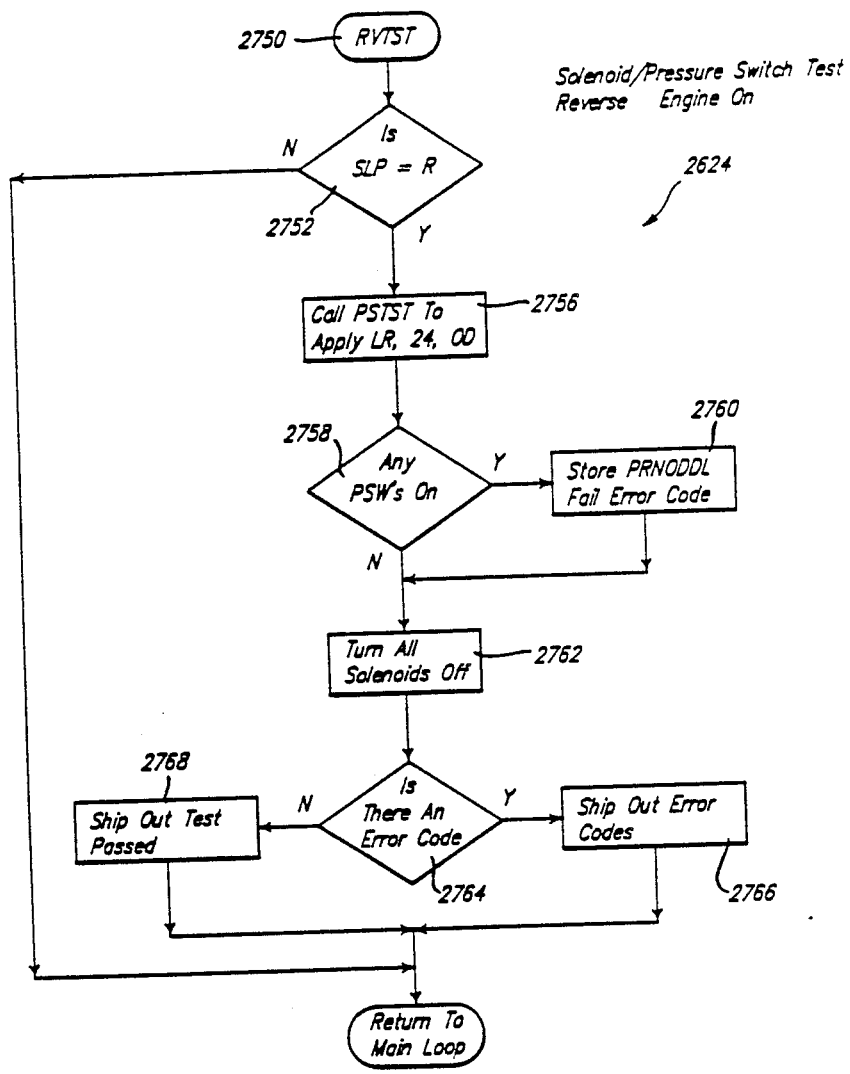

Referring to FIG. 25E, the methodology for the solenoid/pressure switch test for the transmission 100 operating in reverse gear with the engine on of block 2624 of FIG. 25A is shown. At the start of the methodology in bubble 2750, the methodology advances to diamond 2752 and determines whether the SLP 606 is reverse R. If the SLP 606 is not reverse, the methodology returns to the main loop. If the SLP 606 is reverse, the methodology advances to block 2756 and calls the pressure switch test routine previously described to apply the low/reverse 650, two/four 648 and overdrive 646 pressure switches. The methodology then advances to diamond 2758 and determines whether any of the pressure switches 646, 648 and 650 are on or pressurized. If any pressure switches are on, the methodology advances to block 2760 and stores in memory a "PRNODDL" fail error code. The methodology then advances to block 2762 and turns off or de-energize all solenoids of the solenoid-actuated valves 630, 632, 634 and 636. The methodology then advances to diamond 2764 and determines whether there are any error codes. If there are any error codes, the methodology advances to block 2766 and ships out the error codes. The methodology then returns to the main loop.

At diamond 2764, if there are no error codes, the methodology advances to block 2768 and ships out a test passed signal. The methodology then returns to the main loop.

Figure 25F:
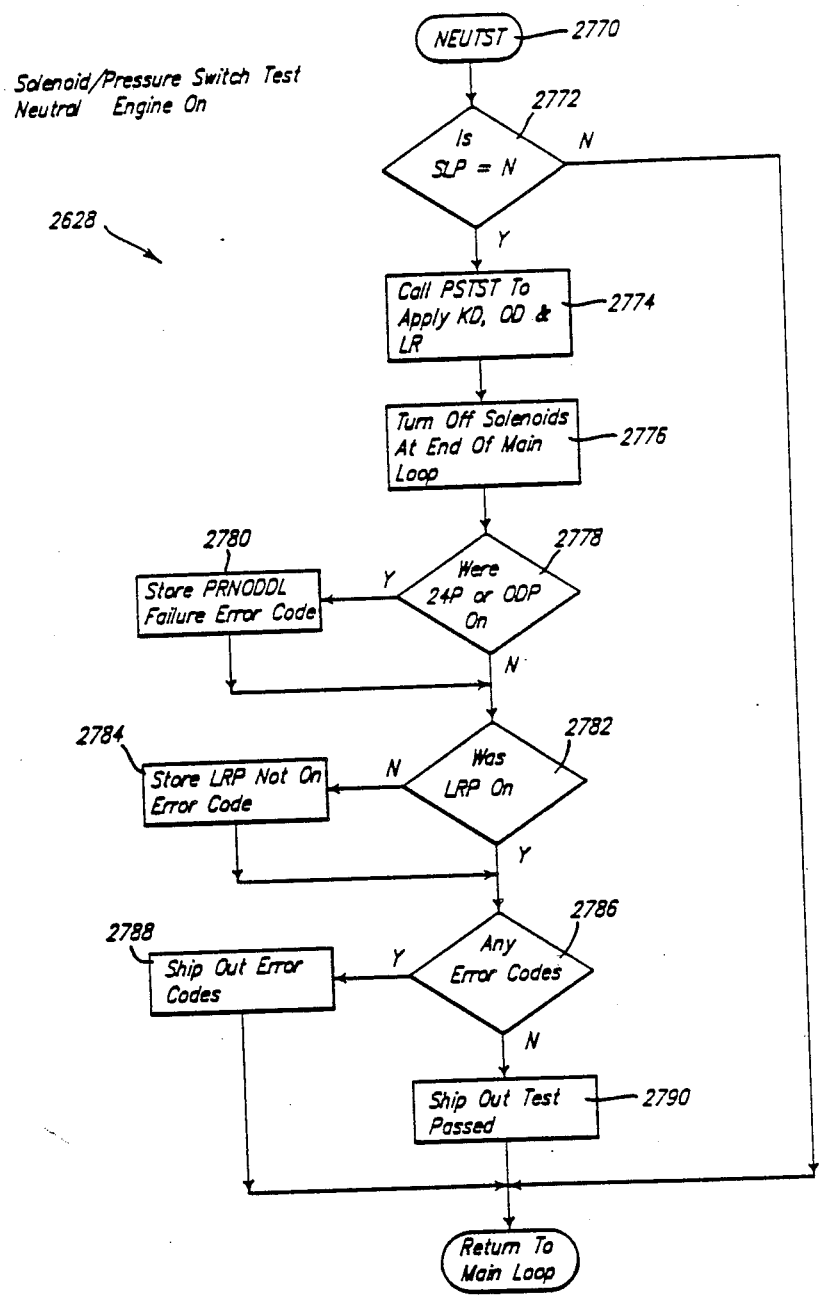
Figure 28G:
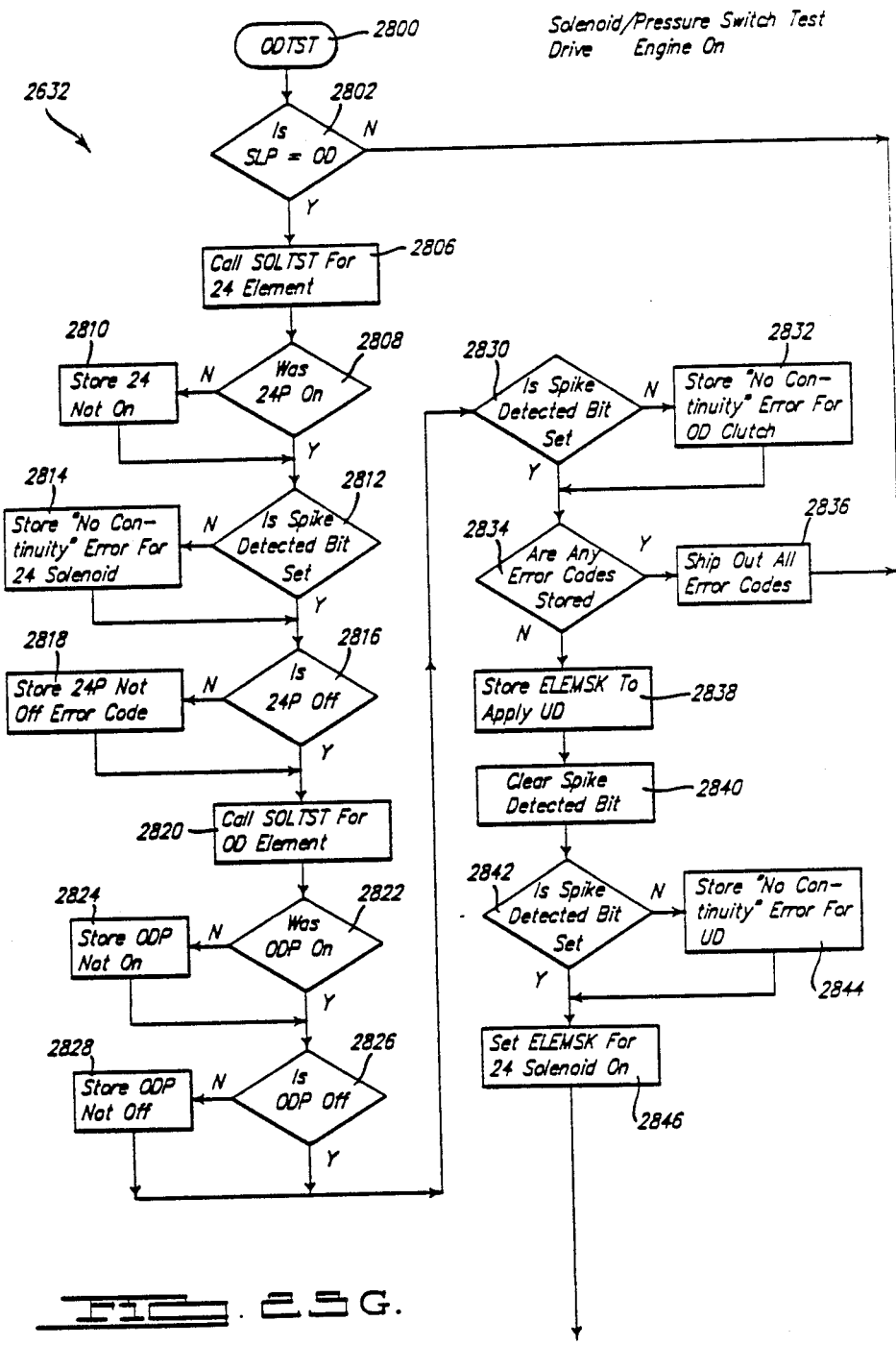
Figure 2S:
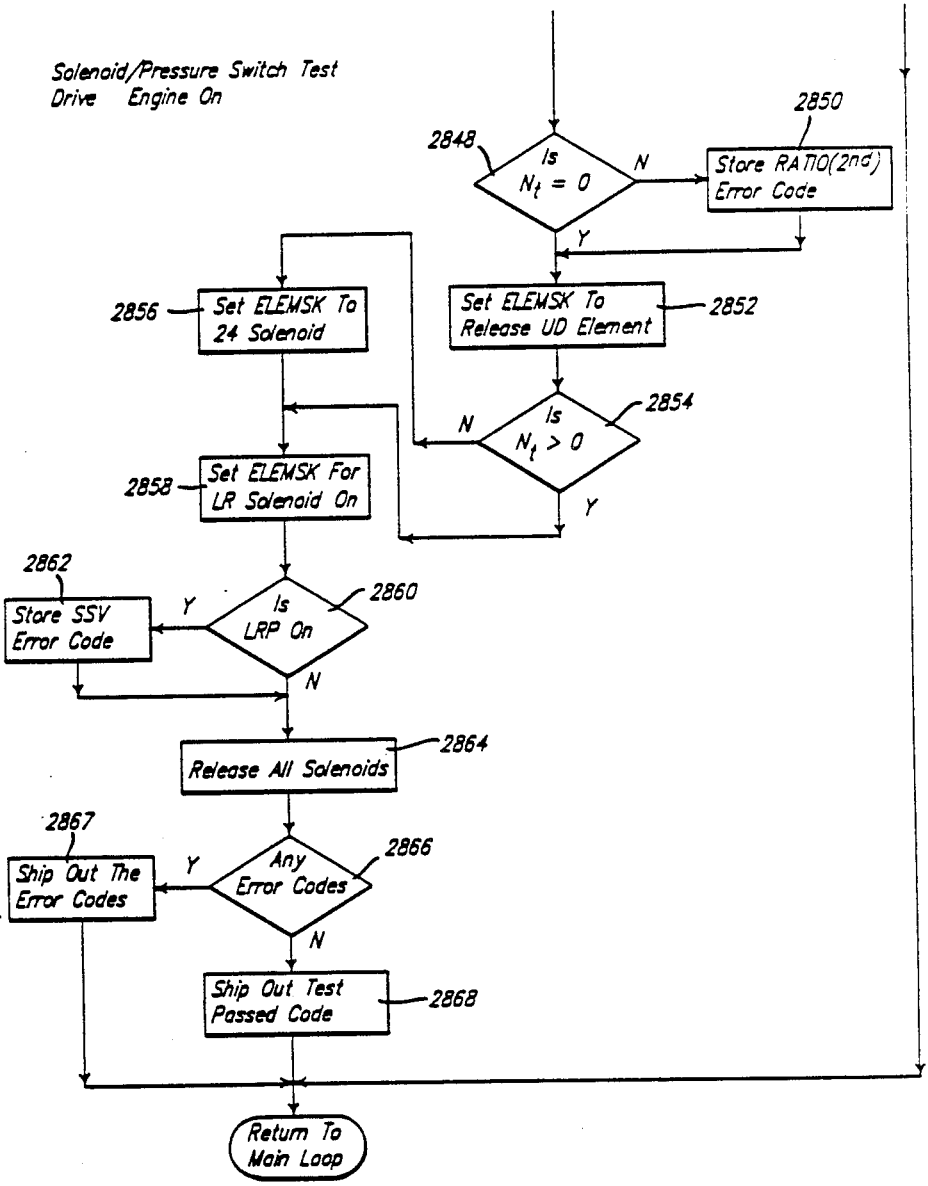

Referring to FIG. 25F, the methodology for the solenoid pressure switch test routine for the transmission 100 operating in neutral gear with the engine on of block 2628 of FIG. 25A is shown. At the start of the methodology in bubble 2770, the methodology advances to diamond 2772 and determines whether the SLP 606 is neutral as previously described. If the SLP 606 is not neutral, the methodology returns to the main loop. If the shift lever position is neutral, the methodology advances to block 2774 and calls the pressure switch routine previously described to apply or turn on the two/four 648, overdrive 646 and low/reverse 650 pressure switches. The methodology then advances to block 2776 and turns OFF the solenoids of the solenoid-actuated valves 630, 632, 634 and 636 at the end of the main loop. The methodology then advances to diamond 2778 and determines whether the two/four 648 or overdrive 646 pressure switches were on or pressurized. If either pressure switch 646 or 648 was on, the methodology advances to block 2780 and stores in memory a "PRNODDL failure" error code. The methodology then advances to diamond 2782.

At diamond 2782, the transmission controller 3010 determines whether the low/reverse pressure switch 650 was on or pressurized. If the pressure switch 650 was not on, the methodology advances to block 2784 and stores in memory an error code that the "low/reverse pressure switch not on". The methodology then advances to diamond 2786.

At diamond 2786, the transmission controller 3010 determines whether there are any error codes. If there are error codes, the methodology advances to block 2788 and ships out the error codes. The methodology then returns to the main loop. If there are no error codes, the methodology advances to block 2790 and ships out a test passed signal. The methodology then returns to the main loop.

Referring to FIGS. 25G and 25H, the methodology for the solenoid pressure switch test routine for the transmission operating in overdrive with the engine on of block 2632 of FIG. 25A is shown. At the start of the methodology in bubble 2800, the methodology advances to diamond 2802 and determines whether the SLP 606 is overdrive OD as previously described. If the SLP 606 is not overdrive, the methodology returns to the main loop. If the SLP 606 is overdrive, the methodology advances to 2806 and calls the solenoid test for the two/four shift solenoid-actuated valve 634. The methodology then advances to diamond 2808 and determines whether the two/four pressure switch 648 was on or pressurized. If the pressure switch 648 was not on, the methodology advances to block 2810 and stores in memory an error code that the "two/four pressure switch 648 was not on". The methodology then advances to diamond 2812 and determines whether a spike detected bit was set as previously described. If the bit was not set, the methodology advances to block 2814 and stores a "no continuity" error code for the two/four shift solenoid-actuated valve 634. The methodology then advances to diamond 2816 and determines whether the two/four pressure switch 648 was off or not pressurized. If the pressure switch 648 was not off, the methodology advances to block 2818 and stores an error code that the "two/four pressures switch not off". The methodology then advances to block 2820.

At block 2820, the methodology calls the solenoid test for the overdrive solenoid-actuated valve 632. The methodology then advances to diamond 2822 and determines whether the overdrive pressure switch 646 was on or pressurized. If the pressure switch 646 was not on, the methodology advances to block 2824 and stores an error code that the "overdrive pressure switch was not on". The methodology then advances to diamond 2826 and determines whether the overdrive pressure switch 646 was off or not pressurized. If the pressure switch 646 was not off, the methodology advances to block 2828 and stores an error code that the "overdrive pressures switch not off". The methodology then advances to diamond 2830 and determines whether a spike detected bit is set. If a spike detected bit was not set, the methodology advances to block 2832 and stores a "no continuity" error code for the overdrive solenoid-actuated valve 632. The methodology then advances to diamond 2834 and determines whether any error codes were stored. If there are error codes stored, the methodology advances to block 2836 and ships out all error codes. The methodology then returns.

At diamond 2834, if no error codes are stored, the methodology advances to block 2838 and stores in memory a solenoid mask (i.e. logical states) to turn ON the underdrive solenoid-actuated valve 630. The methodology then advances to block 2840 and clears any spike detected bit. The methodology then advances to diamond 2842 and determines whether a spike detected bit was set. If a spike detected bit was not set, the methodology advances to block 2844 and stores a "no continuity" error code for the underdrive solenoid-actuated valve 630. The methodology then advances to block 2846 and sets a solenoid mask to turn ON the two/four solenoid-actuated valve 634. The methodology then advances to diamond 2848 and determines whether turbine speed $N_t$ is equal to zero. If $N_t$ is not equal to zero, the methodology advances to block 2850 and stores in memory a ratio (2nd) error code. The methodology then advances to block 2852 and turns OFF or releases the underdrive solenoid-actuated valve 630. The methodology then advances to diamond 2854 and determines whether $N_t$ is greater than zero. If $N_t$ is not greater than zero, the methodology advances to block 2856 and releases the two/four shift solenoid-actuated valve 634. The methodology then advances to block 2858.

If $N_t$ is greater than zero, the methodology advances to block 2858 and sets a solenoid mask to turn ON the low/reverse solenoid-actuated valve 636. The methodology then advances to diamond 2860 and determines whether the low/reverse pressure switch 650 is on or pressurized. If the pressure switch 650 is on, the methodology advances to block 2862 and stores in memory a "solenoid switch valve" (SSV) error code. The methodology then advances to block 2864 and releases all solenoid-actuated valves 630, 632, 634 and 636. The methodology then advances to diamond 2866 and determines whether there were any error codes. If there are any error codes, the methodology advances to block 2867 and ships out the error codes. The methodology then returns to the main loop. At diamond 2866, if there were no error codes, the methodology advances to block 2868 and ships out a test passed code. The methodology then returns to the main loop.

Referring to FIG. 25I, the methodology for the solenoid pressure switch test routine for the transmission 100 operating in low or drive with the engine on of block 2636 of FIG. 25A is shown. At the start of the methodology in bubble 2870, the methodology advances to diamond 2871 and determines whether the SLP 606 is low L or drive D as previously described. If the SLP 606 is not low or drive, the methodology returns to the main loop. If the SLP 606 is low or drive, the methodology advances to block 2872 and calls the pressure switch test previously described to turn ON the two/four clutch solenoid-actuated valve 634. The methodology advances to diamond 2873 and determines whether the two/four pressure switch 648 is on or pressurized as previously described. If the pressure switch 648 is not on, the methodology advances to block 2874 and stores in memory an error code that the "two/four pressure switch not on". The methodology then advances to block 2875 turns OFF the two/four shift solenoid-actuated valve 634. The methodology then advances to diamond 2876 and determines whether there are any error codes. If there are error codes, the methodology advances to block 2877 and ships out the error codes. The methodology then returns to the main loop.

At diamond 2876, if there are no error codes, the methodology advances to block 2878 and ships out a test passed code. The methodology then returns to the main loop.

Referring to FIG. 25J, the speed sensor test mode for the engine on of block 2640 of FIG. 25A is shown. At the beginning of the methodology in bubble 2880, the methodology advances to diamond 2881 and determines whether the SLP 606 is reverse R as previously described. If the SLP 606 is not reverse, the methodology returns to the main loop. If the SLP 606 is reverse, the methodology advances to block 2882 and verifies the in-gear ratio of output speed $N_o$. The methodology then advances to diamond 2884 and determines whether the transmission 100 is in reverse based on the in-gear ratio of block 2882. If the transmission 100 is not in reverse, the methodology advances to block 2885 and sets the ratio (reverse) error code. The methodology then advances to block 2886 and gets the present value of $N_o$ and $N_t$ and saves these values in memory as Past $N_o$ and Past $N_t$, respectively. The methodology then advances to diamond 2887 and determines whether $N_o$ equals a predetermined value such as zero. If $N_o$ is not zero, the methodology advances to block 2888 and sets Past $N_o$, the stored value of $N_o$, as $N_o$. The methodology then advances to diamond 2889 and determines whether $N_t$ equals zero. If $N_t$ is not zero, the methodology advances to block 2890 and sets Past $N_t$, the stored value of $N_t$, as $N_t$. The methodology then advances to diamond 2891 and determines whether both $N_t$ and $N_o$ are zero. If that criteria is not true, the methodology then loops back to diamond 2887.

At diamond 2891, if both $N_t$ and $N_o$ equal zero, the methodology advances to diamond 2892 and determines whether Past $N_t$, the previously stated value of $N_t$, equals a predetermined value, i.e. a minimum value of $N_t \pm 20$ r.p.m. If that criteria is not true, the methodology advances to block 2893 and stores a ratio (neutral) error code. The methodology then advances to diamond 2894 and determines whether the Past $N_o$, the previously stored value of $N_o$, equals a predetermined value, i.e. minimum $N_o \pm 20$ r.p.m. If that criteria is not true, the methodology advances to block 2895 and stores "$N_o$" error code. The methodology then advances to diamond 2896 and determines whether any error codes exist. If there are error codes, the methodology advances to block 2897 and ships out a test passed code. The methodology then returns to the main loop.

At diamond 2896, if there are no error codes, the methodology advances to block 2898 and ships out the error codes. The methodology then returns to the main loop.

Figure 25K:
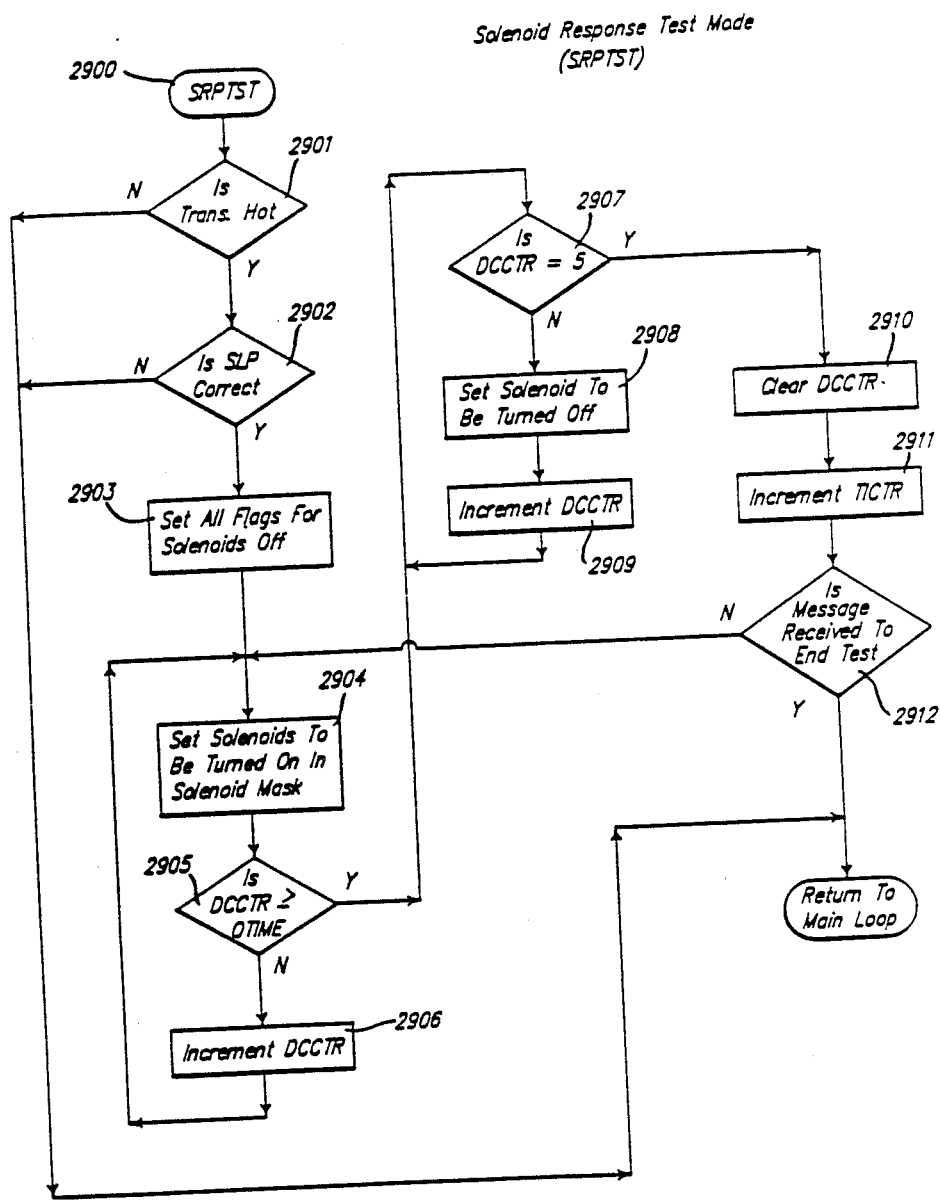

Referring to FIG. 25K, the methodology for the solenoid response test mode of block 2646 of FIG. 25A is shown. At the beginning of the methodology in bubble 2900, the methodology advances to diamond 2901 and determines whether the transmission fluid temperature is hot as previously described. If the fluid temperature is not hot, the methodology returns to the main loop. If the fluid temperature is hot, the methodology advances to diamond 2902 and determines whether the SLP 606 is correct. If the SLP 606 is not correct, the methodology returns to the main loop. If the SLP 606 is correct, the methodology advances to block 2903 and sets all bits or flags to turn OFF the solenoid-actuated valves 630, 632, 634 and 636. The methodology then advances to block 2904 and sets all flags to turn ON the solenoid-actuated valves 630, 632, 634 and 636. The methodology then advances to diamond 2905 and determines whether the duty cycle (DC) counter is greater than a predetermined value such as zero. If that criteria is not true, the methodology advances to block 2906 and increments the DC counter. The methodology then loops back to block 2904.

At diamond 2905, if the DC counter is greater than zero counts, the methodology advances to diamond 2907 and determines whether the DC counter is equal to a predetermined value such as 5. If that criteria is not true, the methodology advances to block 2908 and sets flags for the solenoid-actuated valves to be turned OFF. The methodology then advances to block 2909 and increments the DC counter. The methodology then loops back to diamond 2907.

At diamond 2907, if the DC counter is equal to 5, the methodology advances to block 2910 and clears the DC counter. The methodology then advances to diamond 2912 and determines whether a message has been received from the DRB to end the test. If a message has not been received to end the test, the methodology advances to block 2904 previously described. If a message has been received to end the test, the methodology returns to the main diagnostic loop.

The present invention has been described in an illustrative manner. It is to be understood that the terminology which has been used is intended to be in the nature of words of description rather than of limitation.

Obviously, many modifications and variations are possible in light of the above teachings. Therefore, the subject invention may be practiced otherwise then as specifically described.

What is claimed is:

1. In a vehicle having an engine with throttle means and a transmission system including an input member having a plurality of teeth, an output member, a gear assembly for changing the ratio of torque between the input member and output member, a plurality of friction elements for shifting the gear assembly, a fluid actuating device being moveable to engage and disengage at least one friction element, at least one solenoid-actuated valve being moveable in response to the presence or absence of electrical power for directing fluid-flow between a fluid source and the fluid actuating device, a plurality of sensors providing signals indicative of measurement data for predetermined conditions, a controller having memory for processing and storing the signals and predetermined values and providing signals to control the actuation of the solenoid-actuated valve, a method of controlling the transmission system for the vehicle, said method comprising the steps of:

reading a sensor by the controller to determine the tooth count of the input member in a predetermined time period;

calculating an input speed of the input member by the controller based on the tooth count of the input member for the predetermined time period;

reading a sensor by the controller to determine the shift lever position of the driver-selected operating mode of the transmission;

reading a sensor by the controller to determine the position of the throttle means in the engine of the vehicle;

determining the gear the transmission should be operating in by the controller based on the calculated input speed and shift lever position and throttle position;

comparing the determined gear to the gear the transmission is presently operating in by the controller to determine whether a gear change is required;

identifying and executing the proper gear change by the controller if a gear change is required;

selecting by the controller a desired acceleration of the input member;

calculating by the controller the actual speed and acceleration of the input member based on a tooth count of the input member;

comparing by the controller the calculated acceleration and desired acceleration of the input member to each other;

outputting signals by the controller to the solenoid-actuated valves and controlling the friction elements such that the calculated acceleration approximates the desired acceleration for completing the gear change; and checking by the controller for shift completion requirements such as the gear ratio being equal to the destination ratio for a predetermined length of time.

2. A method as set forth in claim 1 wherein at the end of a shift, perform the necessary update of the "learned parameters" if predetermined set of conditions are valid.

3. In a vehicle having an engine with throttle means and a transmission system including an input member with a plurality of teeth, a torque converter assembly for transmitting torque between the engine and the input member, the torque converter assembly having a turbine, an output member, a gear assembly for changing the ratio of torque between the input member and output member, a plurality of friction elements for shifting the gear assembly, a fluid actuating device being moveable to engage and disengage at least one friction element, at least one solenoid-actuated valve being moveable in response to the presence or absence of electrical power for directing fluid-flow between a fluid source and the fluid actuating device, a plurality of sensors providing signals indicative of measurement data for predetermined conditions, a controller having memory for processing and storing the signals and predetermined values and providing signals to control the actuation of the solenoid-actuated valve, a method of controlling the transmission system for the vehicle, said method comprising the steps of:

powering and initializing the controller;

reading a sensor by the controller to determine the tooth count of the input member in a predetermined time period;

calculating an input speed based on the tooth count of the input member for the predetermined time period;

reading a sensor by the controller to determine the shift lever position of the driver-selected operating mode of the transmission;

reading a sensor by the controller to determine the position of the throttle means in the engine of the vehicle;

determining the gear the transmission should be operating in by the controller based on the calculated input speed and shift lever position and throttle position;

comparing the determined gear to the gear the transmission is presently operating in by the controller to determine whether a gear change is required;

executing predetermined monitoring routines by the controller to determine if a failure of the transmission system has occurred;

determining by the controller whether a gear change is required;

identifying and executing the proper gear change by the controller if a gear change is required;

determining by the controller whether a lock-up of the torque converter assembly is required;

determining by the controller whether the torque converter assembly is presently in lock-up if lock-up is required;

executing a predetermined mode of lock-up by the controller if the torque converter assembly is not presently in lock-up;

determining by the controller the desired acceleration of the input member;

calculating by the controller the actual speed and acceleration of the input member;

comparing by the controller the calculated acceleration and the desired acceleration of the input member to each other; and outputting signals by the controller to the solenoid-actuated valves and controlling the friction elements such that the calculated acceleration approximates the desired acceleration for completing the gear change.

* * * * *